(12) United States Patent
Shibutani et al.

(10) Patent No.: US 10,341,090 B2
(45) Date of Patent: Jul. 2, 2019

(54) CIPHER PROCESSING APPARATUS AND CIPHER PROCESSING METHOD

(71) Applicant: SONY CORPORATION, Tokyo (JP)

(72) Inventors: Kyoji Shibutani, Kanagawa (JP); Takanori Isobe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 91 days.

(21) Appl. No.: 15/512,764

(22) PCT Filed: Aug. 20, 2015

(86) PCT No.: PCT/JP2015/073309
§ 371 (c)(1),
(2) Date: Mar. 20, 2017

(87) PCT Pub. No.: WO2016/059870
PCT Pub. Date: Apr. 21, 2016

(65) Prior Publication Data
US 2017/0295010 A1    Oct. 12, 2017

(30) Foreign Application Priority Data

Oct. 14, 2014 (JP) ................................. 2014-210296

(51) Int. Cl.
*H04L 29/06* (2006.01)
*H04L 9/06* (2006.01)
(Continued)

(52) U.S. Cl.
CPC .............. *H04L 9/0631* (2013.01); *G09C 1/00* (2013.01); *G09C 1/04* (2013.01); *H04L 9/0637* (2013.01); *H04L 9/0625* (2013.01)

(58) Field of Classification Search
CPC ... H04L 9/0625; H04L 9/0631; H04L 9/0618; H04L 9/0637; G09C 1/00; G09C 1/04
(Continued)

(56) References Cited

U.S. PATENT DOCUMENTS 6,314,186 B1 * 11/2001 Lee ..................... H04L 9/002
380/28
8,005,209 B2 * 8/2011 Joshi ..................... H04L 9/0631
380/255
(Continued)

FOREIGN PATENT DOCUMENTS

SG           194203 A1    11/2013
WO      2012/154129 A1    11/2012

OTHER PUBLICATIONS

Schneier, Bruce. "Description of a new variable-length key, 64-bit block cipher (Blowfish)." International Workshop on Fast Software Encryption. Springer, Berlin, Heidelberg, 1993. (Year: 1993).*

(Continued)

*Primary Examiner* — Syed A Zaidi
(74) *Attorney, Agent, or Firm* — Chip Law Group

(57) ABSTRACT

A cipher processing configuration, of which the resistance against various attacks is improved, having a high security level is realized. In a cipher processing configuration in which a nonlinear transformation process and a linear transformation process are repeatedly performed for state data formed from a plurality of elements, a linear transformation unit performs a matrix operation applying a quasi-MDS matrix and a substitution process. As the substitution process, a substitution process is performed which satisfies the following (Condition 1) and (Condition A). (Condition 1) According to the substitution process of the substitution unit for the input X, each column element of the output Y is configured by elements of four mutually-different columns of the input X (Condition A) In a case where the substitution process performed by the substitution unit for the input X is repeatedly performed continuously twice, each column element of the output Y is configured by elements of three or more mutually-different columns of the input X.

16 Claims, 46 Drawing Sheets

(51) Int. Cl.
*G09C 1/00* (2006.01)
*G09C 1/04* (2006.01)

(58) Field of Classification Search
USPC .......................................................... 380/28
See application file for complete search history.

(56) References Cited

U.S. PATENT DOCUMENTS

| | | | | |
|---|---|---|---|---|
| 8,340,282 B2* | 12/2012 | Shirai | ................... | H04L 9/0618 380/29 |
| 2005/0232414 A1* | 10/2005 | Oofuji | ................... | H04L 9/0631 380/28 |
| 2006/0147040 A1* | 7/2006 | Lee | ...................... | H04L 9/0631 380/28 |
| 2009/0010425 A1* | 1/2009 | Shibutani | ................ | H04L 9/002 380/28 |
| 2010/0014659 A1* | 1/2010 | Shibutani | ................ | H04L 9/002 380/28 |
| 2010/0014664 A1* | 1/2010 | Shirai | ..................... | H04L 9/003 380/44 |
| 2010/0061548 A1* | 3/2010 | Shirai | ..................... | H04L 9/002 380/28 |
| 2010/0091991 A1* | 4/2010 | Shibutani | ................ | H04L 9/002 380/259 |
| 2013/0236005 A1* | 9/2013 | Ikeda | ...................... | H04L 9/003 380/28 |
| 2013/0251144 A1* | 9/2013 | Hiwatari | ................ | H04L 9/0625 380/28 |
| 2014/0328482 A1* | 11/2014 | Saito | ........................ | H04L 9/002 380/28 |
| 2016/0373210 A1* | 12/2016 | Gligoroski | ............ | H04L 1/0041 |

OTHER PUBLICATIONS

Song, et al, "Differential Fault Attack on the Prince Block Cipher", Jan. 2013.
Bilgin, et al., "Fides: Lightweight Authenticated Cipher with Side-Channel Resistance for Constrained Hardware", Lecture Notes in Computer Science, vol. 8086, 2013, pp. 142-158.
Khoo, et al., "FOAM: Searching for Hardware Optimal SPN Structures and Components with a Fair Comparison", Sep. 2014.
International Search Report and Written Opinion of PCT Application No. PCT/JP2015/073309, dated Oct. 27, 2015, 10 pages of English Translation and 04 pages of ISRWO.
International Preliminary Report on Patentability of PCT Application No. PCT/JP2015/073309, dated Apr. 27, 2017, 08 pages of English Translation and 04 pages of IPRP.

* cited by examiner

FIG. 11

INPUT A — mns-BIT DATA

WHEN INPUT A AND OUTPUT B ARE ASSUMED TO BE VECTORS,
INPUT A AND OUTPUT B CAN BE REPRESENTED AS BELOW $$(a_0 \ a_1 \ a_2 \cdots a_{mn-2} \ a_{mn-1}) \in GF(2^s)^{mn}$$

$$(b_0 \ b_1 \ b_2 \cdots b_{mn-2} \ b_{mn-1}) \in GF(2^s)^{mn}$$

HERE, $a_0$ and $b_0$ EACH REPRESENT MSB,
and $a_{mn-1}$ and $b_{mn-1}$ EACH REPRESENT LSB INPUT A AND OUTPUT B CAN BE REPRESENTED AS BELOW BY USING
m×n ARRAY $$A = \begin{array}{|c|c|c|c|c|} \hline a_0 & a_m & a_{2m} & \cdots & a_{(n-1)m} \\ \hline a_1 & a_{m+1} & a_{2m+1} & \cdots & a_{(n-1)m+1} \\ \hline a_2 & a_{m+2} & a_{2m+2} & \cdots & a_{(n-1)m+2} \\ \hline \vdots & \vdots & \vdots & \ddots & \vdots \\ \hline a_{m-1} & a_{2m-1} & a_{3m-1} & \cdots & a_{nm-1} \\ \hline \end{array}$$

$$B = \begin{array}{|c|c|c|c|c|} \hline b_0 & b_m & b_{2m} & \cdots & b_{(n-1)m} \\ \hline b_1 & b_{m+1} & b_{2m+1} & \cdots & b_{(n-1)m+1} \\ \hline b_2 & b_{m+2} & b_{2m+2} & \cdots & b_{(n-1)m+2} \\ \hline \vdots & \vdots & \vdots & \ddots & \vdots \\ \hline b_{m-1} & b_{2m-1} & b_{3m-1} & \cdots & b_{nm-1} \\ \hline \end{array}$$

OUTPUT B

FIG. 12

INPUT A
↓ 64-BIT DATA

WHEN INPUT A AND OUTPUT B ARE ASSUMED TO BE VECTORS, INPUT A AND OUTPUT B CAN BE REPRESENTED AS BELOW $$(a_0 \ a_1 \ a_2 \cdots a_{14} \ a_{15}) \in GF(2^4)^{16}$$

$$(b_0 \ b_1 \ b_2 \cdots b_{14} \ b_{15}) \in GF(2^4)^{16}$$

HERE, $a_0$ and $b_0$ EACH REPRESENT MSB, and $a_{15}$ and $b_{15}$ EACH REPRESENT LSB INPUT A AND OUTPUT B CAN BE REPRESENTED AS BELOW BY USING m×n ARRAY $$A = \begin{array}{|c|c|c|c|} \hline a_0 & a_4 & a_8 & a_{12} \\ \hline a_1 & a_5 & a_9 & a_{13} \\ \hline a_2 & a_6 & a_{10} & a_{14} \\ \hline a_3 & a_7 & a_{11} & a_{15} \\ \hline \end{array}$$

$$B = \begin{array}{|c|c|c|c|} \hline b_0 & b_4 & b_8 & b_{12} \\ \hline b_1 & b_5 & b_9 & b_{13} \\ \hline b_2 & b_6 & b_{10} & b_{14} \\ \hline b_3 & b_7 & b_{11} & b_{15} \\ \hline \end{array}$$

↓
OUTPUT B

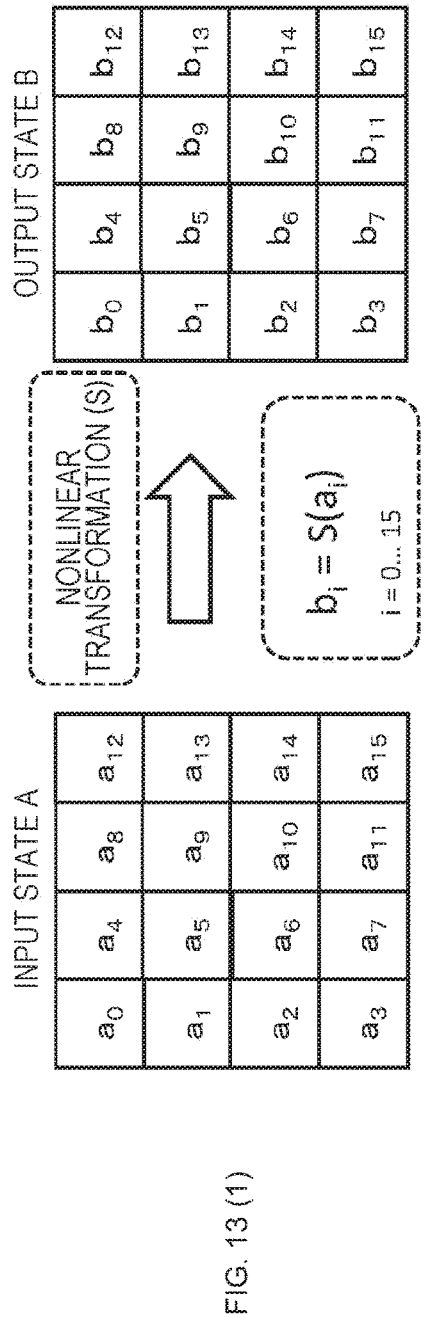
FIG. 13 (1)
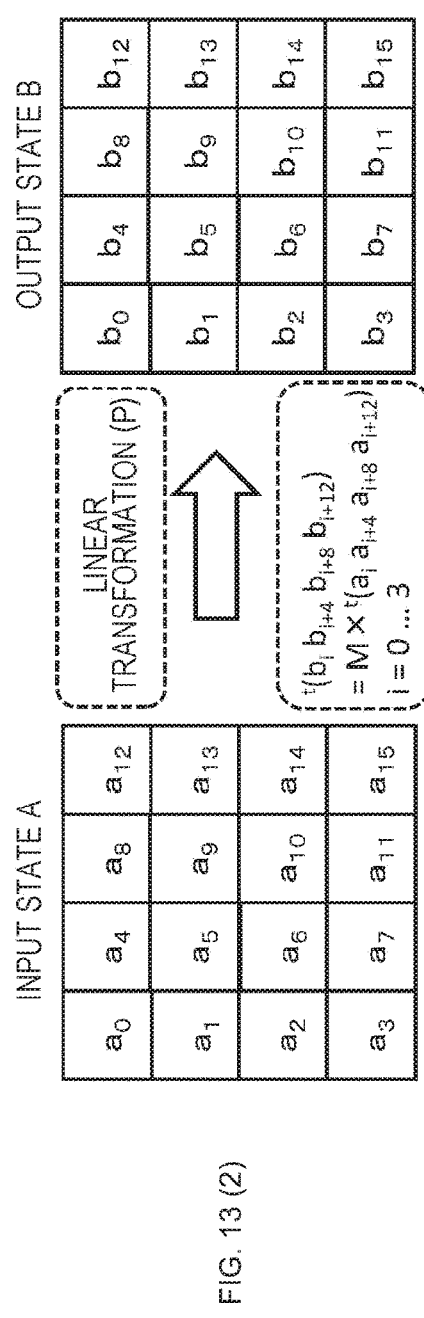
FIG. 13 (2)

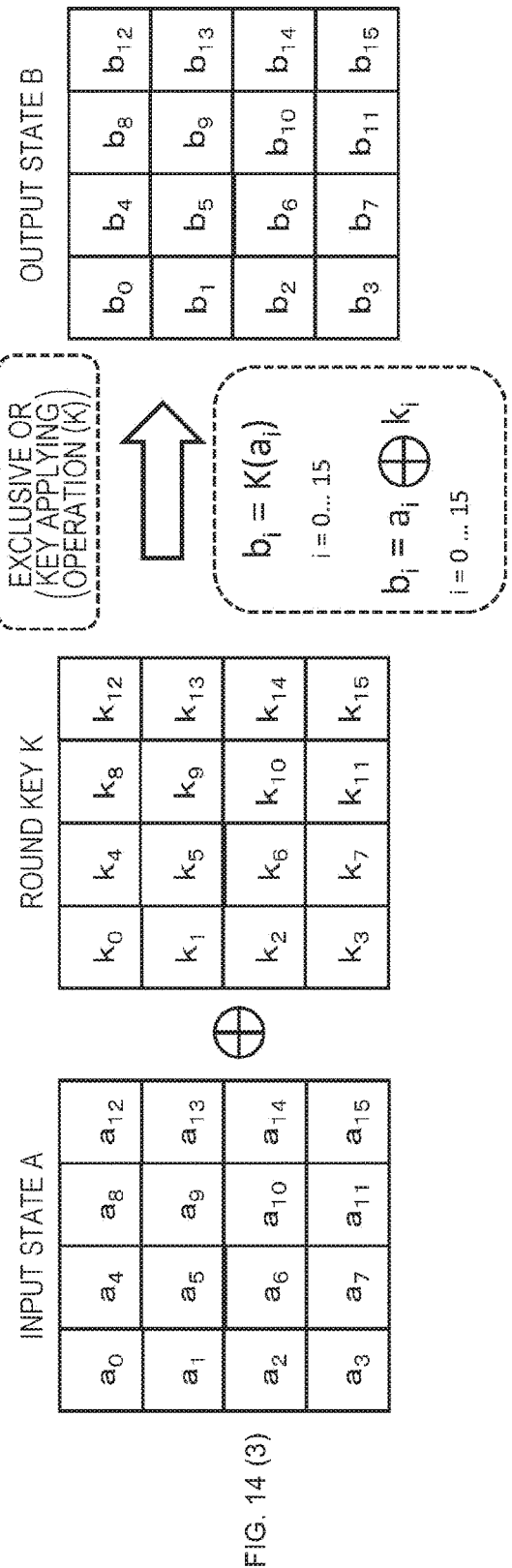
FIG. 14 (3)

FIG. 15

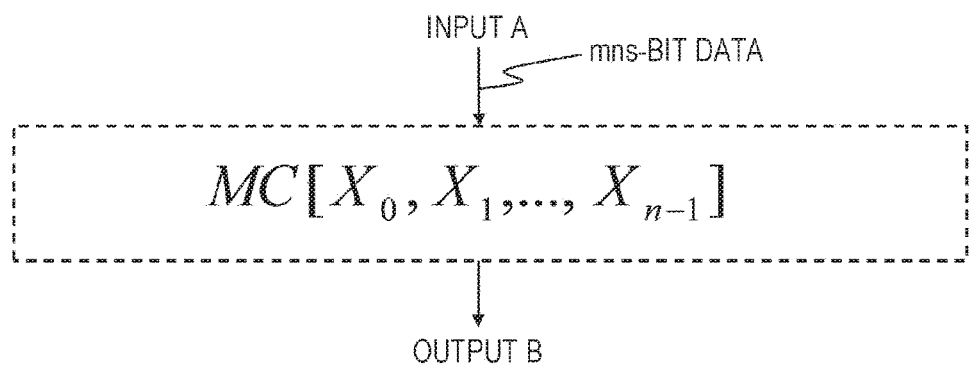

INPUT A — mns-BIT DATA $$MC[X_0, X_1, ..., X_{n-1}]$$

OUTPUT B $$A = \begin{array}{|c|c|c|c|c|} \hline a_0 & a_m & a_{2m} & \cdots & a_{(n-1)m} \\ \hline a_1 & a_{m+1} & a_{2m+1} & \cdots & a_{(n-1)m+1} \\ \hline a_2 & a_{m+2} & a_{2m+2} & \cdots & a_{(n-1)m+2} \\ \hline \vdots & \vdots & \vdots & \ddots & \vdots \\ \hline a_{m-1} & a_{2m-1} & a_{3m-1} & \cdots & a_{nm-1} \\ \hline \end{array}$$

$$B = \begin{array}{|c|c|c|c|c|} \hline b_0 & b_m & b_{2m} & \cdots & b_{(n-1)m} \\ \hline b_1 & b_{m+1} & b_{2m+1} & \cdots & b_{(n-1)m+1} \\ \hline b_2 & b_{m+2} & b_{2m+2} & \cdots & b_{(n-1)m+2} \\ \hline \vdots & \vdots & \vdots & \ddots & \vdots \\ \hline b_{m-1} & b_{2m-1} & b_{3m-1} & \cdots & b_{nm-1} \\ \hline \end{array}$$

$$\begin{pmatrix} b_0 \\ b_1 \\ \vdots \\ b_{m-1} \end{pmatrix} = X_0 \cdot \begin{pmatrix} a_0 \\ a_1 \\ \vdots \\ a_{m-1} \end{pmatrix}, \begin{pmatrix} b_m \\ b_{m+1} \\ \vdots \\ b_{2m-1} \end{pmatrix} = X_1 \cdot \begin{pmatrix} a_m \\ a_{m+1} \\ \vdots \\ a_{2m-1} \end{pmatrix}, \cdots, \begin{pmatrix} b_{(n-1)m} \\ b_{(n-1)m+1} \\ \vdots \\ b_{nm-1} \end{pmatrix} = X_{n-1} \cdot \begin{pmatrix} a_{(n-1)m} \\ a_{(n-1)m+1} \\ \vdots \\ a_{nm-1} \end{pmatrix}$$

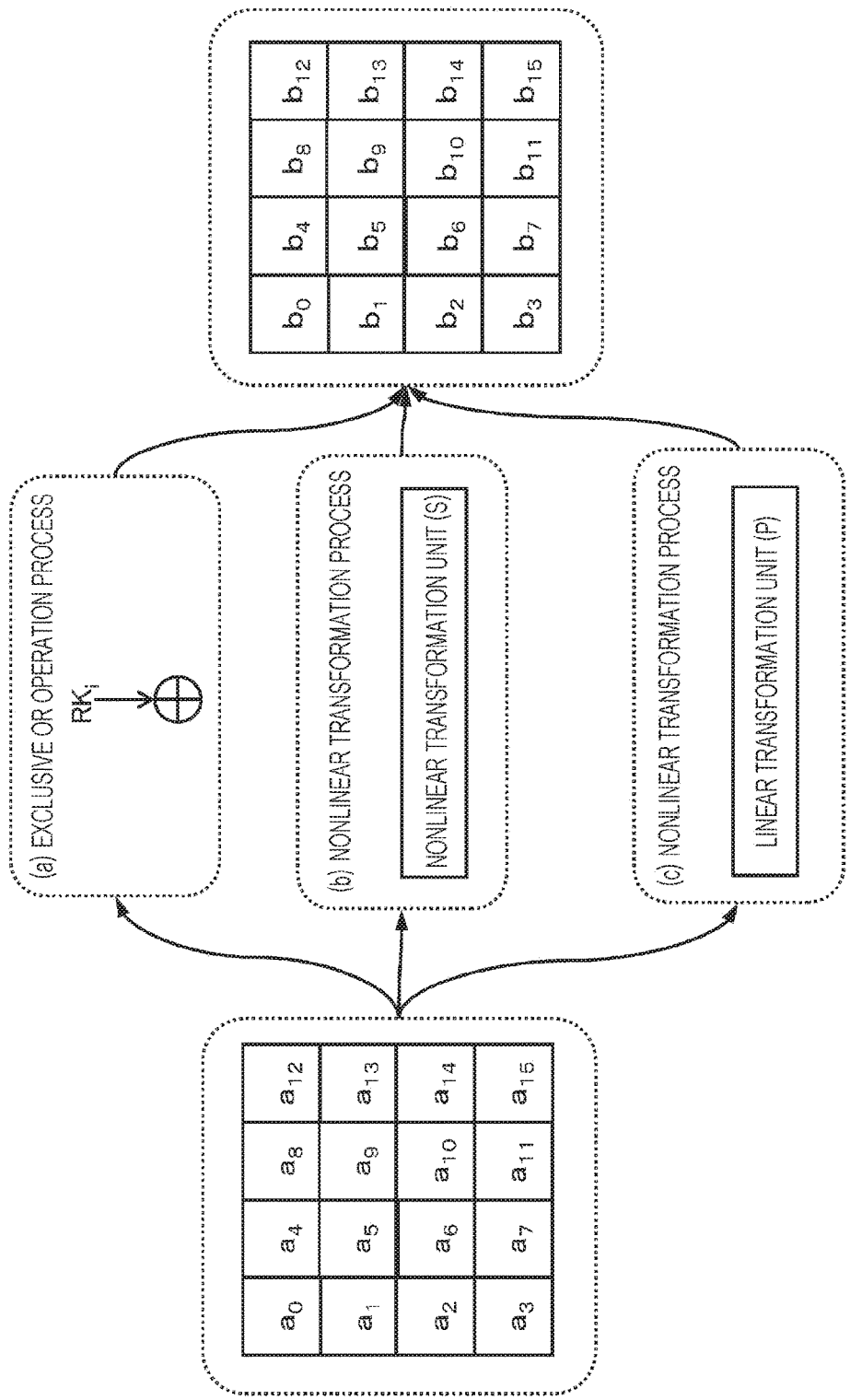

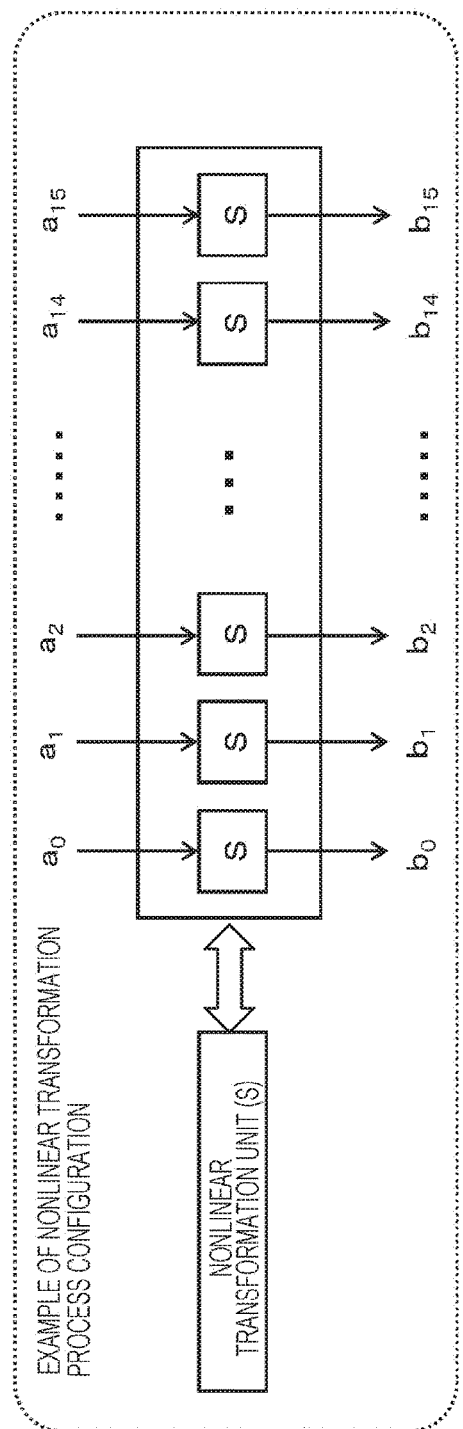
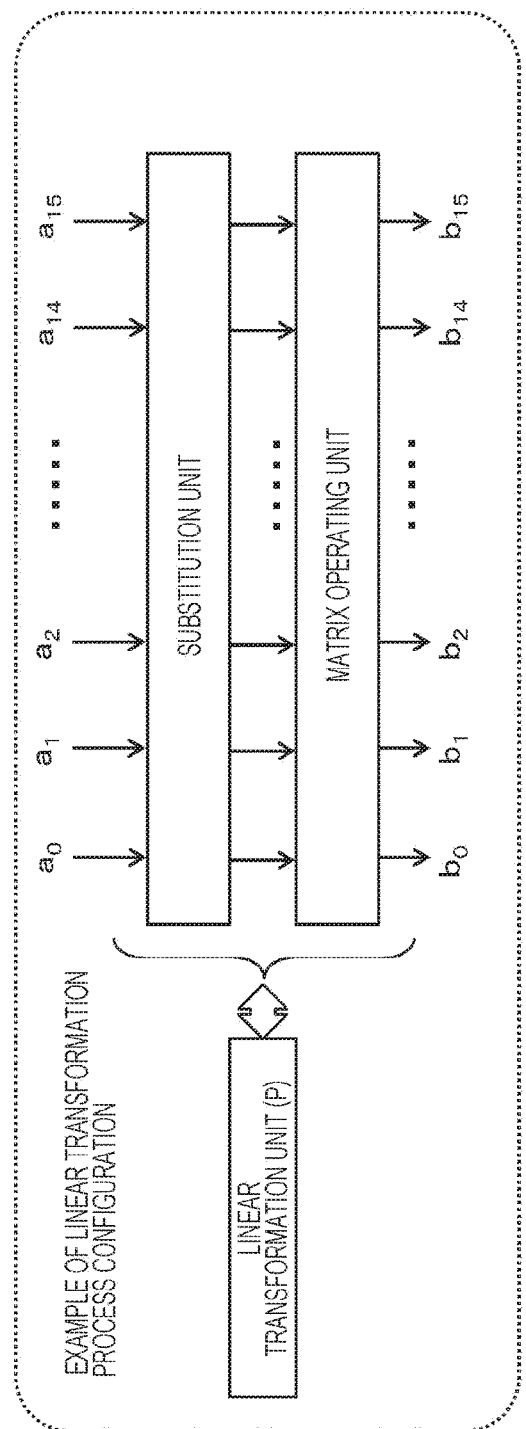
FIG. 22 (1) EXAMPLE OF NONLINEAR TRANSFORMATION PROCESS CONFIGURATION
FIG. 22 (2) EXAMPLE OF LINEAR TRANSFORMATION PROCESS CONFIGURATION

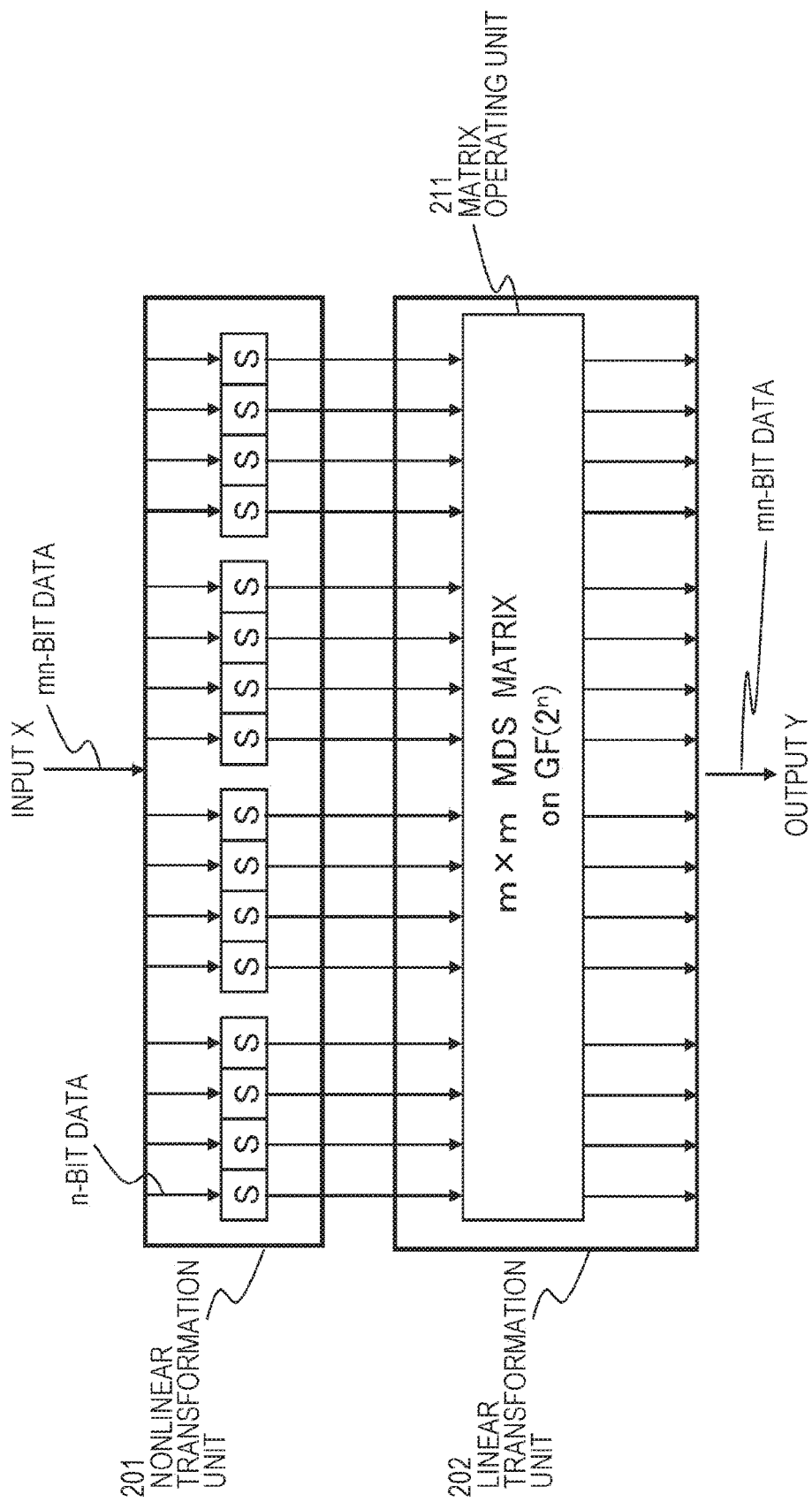

FIG. 27

| ROUND NUMBER | EXISTING SYSTEM 2 | EXISTING SYSTEM 3 |
|---|---|---|
| 4 | 25 | 16 |
| 6 | 30 | 24 |
| 8 | 50 | 32 |
| 10 | 55 | 40 |
| 12 | 75 | 48 |
| 14 | 80 | 56 |
| 16 | 100 | 64 |
| 18 | 105 | 72 |
| 20 | 125 | 80 |
| 22 | 130 | 88 |
| 24 | 150 | 96 |
| ... | ... | ... |
| 56 | 350 | 224 |
| 58 | 355 | 232 |
| 60 | 375 | 240 |

FIG. 30 (1)

EXAMPLE OF QUASI-MDS (almost-MDS)
MATRIX APPLIED IN MATRIX OPERATING UNIT
OF LINEAR TRANSFORMATION UNIT $$M_b \begin{pmatrix} 0 & 1 & 1 & 1 \\ 1 & 0 & 1 & 1 \\ 1 & 1 & 0 & 1 \\ 1 & 1 & 1 & 0 \end{pmatrix}$$

FIG. 30 (2)

EXAMPLE OF OPERATION APPLYING QUASI-MDS
(almost-MDS) MATRIX APPLIED IN MATRIX
OPERATING UNIT OF LINEAR TRANSFORMATION UNIT
COLUMN DIFFUSION OPERATION COLUMN DIFFUSION OPERATION
(MixColumn)

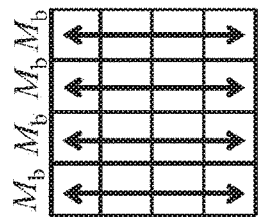

$M_b \; M_b \; M_b \; M_b$ $MC[M_b]$
$(= MC[M_b, M_b, M_b, M_b])$

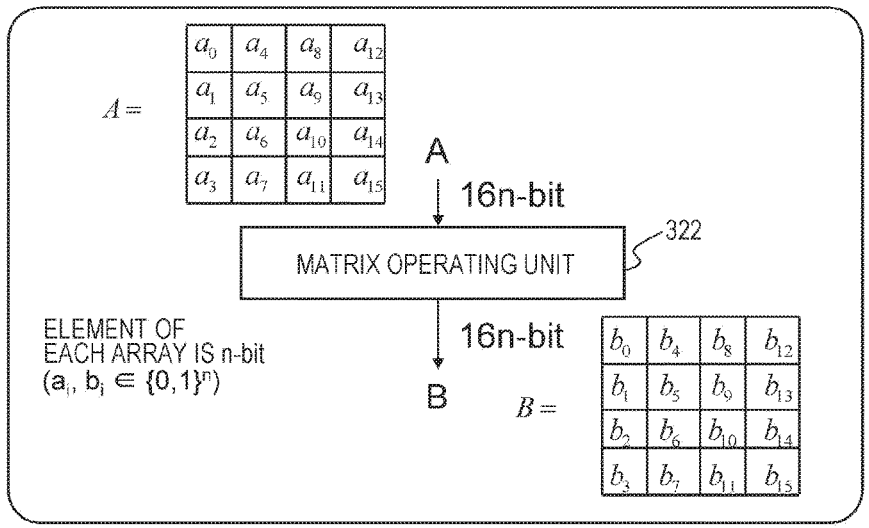
FIG. 31 (1)
FIG. 31 (2)
$b_0 = a_1 (+) a_2 (+) a_3,$    $b_8 = a_9 (+) a_{10} (+) a_{11},$
$b_1 = a_0 (+) a_2 (+) a_3,$    $b_9 = a_8 (+) a_{10} (+) a_{11},$
$b_2 = a_0 (+) a_1 (+) a_3,$    $b_{10} = a_8 (+) a_9 (+) a_{11},$
$b_3 = a_0 (+) a_1 (+) a_2,$    $b_{11} = a_8 (+) a_9 (+) a_{10},$
$b_4 = a_5 (+) a_6 (+) a_7,$    $b_{12} = a_{13} (+) a_{14} (+) a_{15},$
$b_5 = a_4 (+) a_6 (+) a_7,$    $b_{13} = a_{12} (+) a_{14} (+) a_{15},$
$b_6 = a_4 (+) a_5 (+) a_7,$    $b_{14} = a_{12} (+) a_{13} (+) a_{15},$
$b_7 = a_4 (+) a_5 (+) a_6,$    $b_{15} = a_{12} (+) a_{13} (+) a_{14}$
(HERE, (+) REPRESENTS XOR (EXCLUSIVE OR))

FIG. 35

| ROUND NUMBER | EXISTING SYSTEM 3 (CONDITION 1) | EMBODIMENT 1 (CONDITION 1 + CONDITION A) |
|---|---|---|
| 4 | 16 | 16 |
| 6 | 20 | 24 |
| 8 | 32 | 32 |
| 10 | 36 | 40 |
| 12 | 48 | 48 |
| 14 | 52 | 56 |
| 16 | 64 | 64 |
| 18 | 68 | 72 |
| 20 | 80 | 80 |
| 22 | 84 | 88 |
| 24 | 96 | 96 |
| ... | ... | ... |
| 56 | 224 | 224 |
| 58 | 228 | 232 |
| 60 | 240 | 240 |

| ROUND NUMBER | EXISTING SYSTEM 3 (CONDITION 1) | EMBODIMENT 1 (CONDITION 1 + CONDITION A) | EMBODIMENT 2 (CONDITION 1 + CONDITION B) |
|---|---|---|---|
| 4 | 16 | 16 | 16 |
| 6 | 20 | 24 | 30 |
| 8 | 32 | 32 | 38 |
| 10 | 36 | 40 | 50 |
| 12 | 48 | 48 | 62 |
| 14 | 52 | 56 | 72 |
| 16 | 64 | 64 | 84 |
| 18 | 68 | 72 | 94 |
| 20 | 80 | 80 | 106 |
| 22 | 84 | 88 | 116 |
| 24 | 96 ... | 96 ... | 128 |
| ... | | | |
| 56 | 224 | 224 | 300 |
| 58 | 228 | 232 | 310 |
| 60 | 240 | 240 | 322 |

FIG. 42

CIPHER PROCESSING APPARATUS AND CIPHER PROCESSING METHOD

CROSS REFERENCE TO RELATED APPLICATIONS

This application is a U.S. National Phase of International Patent Application No. PCT/JP2015/073309 filed on Aug. 20, 2015, which claims priority benefit of Japanese Patent Application No. JP 2014-210296 filed in the Japan Patent Office on Oct. 14, 2014. Each of the above-referenced applications is hereby incorporated herein by reference in its entirety.

TECHNICAL FIELD

The present disclosure relates to a cipher processing apparatus, a cipher processing method, and a program, and more particularly, to a cipher processing apparatus, a cipher processing method, and a program executing a common-key system cipher.

BACKGROUND ART

In accordance with the development of an information society, the significance of information security technologies used for safely protecting handled information increases. As one of constituent elements of such information security technologies, there is a cipher technology, and, the cipher technology is currently used in various products and systems.

While there are various cipher processing algorithms, as one of basic technologies, there is a technology called a common-key block cipher. In the common-key block cipher, an encryption key and a decryption key are common. In both an encryption process and a decryption process, a plurality of keys are generated from the common key, and a data transformation process is repeatedly performed in units of a certain block, for example, in units of block data of 64 bits, 128 bits, 256 bits, or the like.

As representative algorithms of the common-key block cipher, data encryption standard (DES) that is the past standard of the U.S.A. and advanced encryption standard (AES) that is the current standard of the U.S.A. are known. In addition, various common-key block ciphers are continuously proposed at present, and CLEFIA proposed by Sony Corp. in 2007 is one of the common-key block ciphers.

In addition, as conventional technologies disclosed for the common-key block cipher, for example, there are Patent Document 1 (Japanese Patent Application Laid-Open No. 2012-215813) and the like.

Such an algorithm of the common-key block cipher is mainly configured by a cipher processing unit that includes a round function executing unit that repeatedly executes a transformation of input data and a key scheduling unit that generates a round key to be applied in each round of a round function unit. The key scheduling unit generates an extended key acquired by increasing the number of bits on the basis of a master key (main key) that is a secret key and then generates a round key (sub key) to be applied in each round function unit of the cipher processing unit on the basis of the generated extended key.

As a specific structure executing such an algorithm, a structure is known which repeatedly executes a round function having a linear transformation unit and a nonlinear transformation unit. For example, as representative structures, there are a substitution-permutation network (SPN) structure, a Feistel structure, an extended Feistel structure, and the like.

All of these have a structure for transforming a plain text into a cipher text by repeatedly executing a round function having a linear transformation unit and a nonlinear transformation unit.

CITATION LIST

Patent Document

Patent Document 1: Japanese Patent Application Laid-Open No. 2012-215813

SUMMARY OF THE INVENTION

Problems to be Solved by the Invention

For example, as attacks attempting to decipher a cipher algorithm or a secret key, there are a difference attack, a linear attack, and the like. Resistance against such various attacks is requested for a cipher processing apparatus. In other words, security called a difficulty in deciphering an algorithm or a secret key also in case of various attacks is required.

The present disclosure, for example, is in consideration of the above-described situations, and an object thereof is to provide a cipher processing apparatus, a cipher processing method, and a program having a high security level.

Solutions to Problems

A first concept of the present disclosure lies in a cipher processing apparatus including:
a cipher processing unit that generates output data by repeatedly performing a round operation in a round operating unit for input data,
wherein the input data is a state including a plurality of elements each formed from data of one or more bits,
the round operating unit includes a nonlinear transformation unit that performs a nonlinear transformation process by inputting the state and a linear transformation unit that performs a linear transformation process by inputting the state,
the linear transformation unit includes
a matrix operating unit that performs a matrix operation in units of elements for the state, and
a substitution unit that performs a substitution process in units of elements for the state,
the matrix operating unit performs a matrix operation applying a quasi-MDS (Almost-Maximum Distance Separable) matrix, and
the substitution unit performs the substitution process applying a substitution unit satisfying the following Condition 1 and Condition A.
(Condition 1)
According to the substitution process of the substitution unit for the input X, each column element of the output Y is configured by elements of four mutually-different columns of the input X.
(Condition A)
In a case where the substitution process performed by the substitution unit for the input X is repeatedly performed continuously twice, each column element of the output Y is configured by elements of three or more mutually-different columns of the input X.

Furthermore, a second concept of the present disclosure lies in a cipher processing apparatus including:

a cipher processing unit that generates output data by repeatedly performing a round operation in a round operating unit for input data, wherein the input data is a state including a plurality of elements each formed from data of one or more bits, the round operating unit includes a nonlinear transformation unit that performs a nonlinear transformation process by inputting the state and a linear transformation unit that performs a linear transformation process by inputting the state, the linear transformation unit includes a matrix operating unit that performs a matrix operation in units of elements for the state, and a substitution unit that performs a substitution process in units of elements for the state, the matrix operating unit performs a matrix operation applying a quasi-MDS (Almost-Maximum Distance Separable) matrix, and the substitution unit performs the substitution process applying a substitution unit satisfying the following Condition 1' and Condition A'.

(Condition 1')

According to the substitution process of the substitution unit for the input X, each row element of the output Y is configured by elements of four mutually-different rows of the input X.

(Condition A')

In a case where the substitution process performed by the substitution unit for the input X is repeatedly performed continuously twice, each row element of the output Y is configured by elements of three or more mutually-different rows of the input X.

Furthermore, a third concept of the present disclosure lies in a cipher processing method performed in a cipher processing apparatus including a cipher processing unit that generates output data by repeatedly performing a round operation in a round operating unit for input data, wherein the input data is a state including a plurality of elements each formed from data of one or more bits, the round operating unit includes a nonlinear transformation unit that performs a nonlinear transformation process by inputting the state and a linear transformation unit that performs a linear transformation process by inputting the state, the linear transformation unit includes a matrix operating unit that performs a matrix operation in units of elements for the state, and a substitution unit that performs a substitution process in units of elements for the state, the matrix operating unit performs a matrix operation applying a quasi-MDS (Almost-Maximum Distance Separable) matrix, and the substitution unit performs the substitution process satisfying the following Condition 1 and Condition A.

(Condition 1)

According to the substitution process of the substitution unit for the input X, each column element of the output Y is configured by elements of four mutually-different columns of the input X.

(Condition A)

In a case where the substitution process performed by the substitution unit for the input X is repeatedly performed continuously twice, each column element of the output Y is configured by elements of three or more mutually-different columns of the input X.

Furthermore, a fourth concept of the present disclosure lies in a cipher processing method performed in a cipher processing apparatus including a cipher processing unit that generates output data by repeatedly performing a round operation in a round operating unit for input data, wherein the input data is a state including a plurality of elements each formed from data of one or more bits, the round operating unit includes a nonlinear transformation unit that performs a nonlinear transformation process by inputting the state and a linear transformation unit that performs a linear transformation process by inputting the state, the linear transformation unit includes a matrix operating unit that performs a matrix operation in units of elements for the state, and a substitution unit that performs a substitution process in units of elements for the state, the matrix operating unit performs a matrix operation applying a quasi-MDS (Almost-Maximum Distance Separable) matrix, and the substitution unit performs the substitution process applying a substitution unit satisfying the following Condition 1' and Condition A'.

(Condition 1')

According to the substitution process of the substitution unit for the input X, each row element of the output Y is configured by elements of four mutually-different rows of the input X.

(Condition A')

In a case where the substitution process performed by the substitution unit for the input X is repeatedly performed continuously twice, each row element of the output Y is configured by elements of three or more mutually-different rows of the input X.

Furthermore, a fifth concept of the present disclosure lies in a program executing cipher processing in a cipher processing apparatus including a cipher processing unit that generates output data by repeatedly performing a round operation in a round operating unit for input data, wherein the input data is a state including a plurality of elements each formed from data of one or more bits, the round operating unit includes a nonlinear transformation unit that performs a nonlinear transformation process by inputting the state and a linear transformation unit that performs a linear transformation process by inputting the state, and the linear transformation unit includes a matrix operating unit that performs a matrix operation in units of elements for the state, and a substitution unit that performs a substitution process in units of elements for the state, the program causing the matrix operating unit to perform a matrix operation applying a quasi-MDS (Almost-Maximum Distance Separable) matrix and the substitution unit to perform the substitution process satisfying the following Condition 1 and Condition A.

(Condition 1)

According to the substitution process of the substitution unit for the input X, each column element of the output Y is configured by elements of four mutually-different columns of the input X.

(Condition A)

In a case where the substitution process performed by the substitution unit for the input X is repeatedly performed continuously twice, each column element of the output Y is configured by elements of three or more mutually-different columns of the input X.

Furthermore, a sixth concept of the present disclosure lies in a program executing cipher processing in a cipher processing apparatus including a cipher processing unit that generates output data by repeatedly performing a round operation in a round operating unit for input data, wherein the input data is a state including a plurality of elements each formed from data of one or more bits, the round operating unit includes a nonlinear transformation unit that performs a nonlinear transformation process by inputting the state and a linear transformation unit that performs a linear transformation process by inputting the state, and the linear transformation unit includes a matrix operating unit that performs a matrix operation in units of elements for the state, and a substitution unit that performs a substitution process in units of elements for the state, the program causing the matrix operating unit to perform a matrix operation applying a quasi-MDS (Almost-Maximum Distance Separable) matrix and the substitution unit to perform the substitution process applying a substitution unit satisfying the following Condition 1' and Condition A'.

(Condition 1')

According to the substitution process of the substitution unit for the input X, each row element of the output Y is configured by elements of four mutually-different rows of the input X.

(Condition A')

In a case where the substitution process performed by the substitution unit for the input X is repeatedly performed continuously twice, each row element of the output Y is configured by elements of three or more mutually-different rows of the input X.

Note that a program of the present disclosure, for example, is a program that is provided for an information processing apparatus or a computer system capable of executing various program codes, for example, using a storage medium. By executing such a program using a program execution unit of the information processing apparatus or the computer system, a process according to the program is realized.

The other objects, features, and advantages of the present disclosure will be disclosed in detailed description that is based on embodiments of the present disclosure to be described later and accompanying drawings. Note that, in this specification, a system is a logical aggregated configuration of a plurality of apparatuses, but the apparatuses included in the configuration are not limited to be arranged inside the same casing.

Effects of the Invention

According to one embodiment of the present disclosure, a cipher processing configuration, of which the resistance against various attacks is improved, having a high security level is realized.

More specifically, in a cipher processing configuration in which a nonlinear transformation process and a linear transformation process are repeatedly performed for state data formed from a plurality of elements, a linear transformation unit performs a matrix operation applying a quasi-MDS matrix and a substitution process.

As the substitution process, a substitution process is performed which satisfies the following conditions (Condition 1) and (Condition A).

(Condition 1) According to the substitution process of the substitution unit for the input X, each column element of the output Y is configured by elements of four mutually-different columns of the input X (Condition A) In a case where the substitution process performed by the substitution unit for the input X is repeatedly performed continuously twice, each column element of the output Y is configured by elements of three or more mutually-different columns of the input X.

Alternatively, as the substitution process, a substitution process is performed which satisfies the following conditions (Condition 1) and (Condition B).

(Condition 1) According to the substitution process of the substitution unit for the input X, each column element of the output Y is configured by elements of four mutually-different columns of the input X.

(Condition B) Elements of each column of two outputs Y and Y' are configured by elements of four mutually-different columns of an input X. Here, Y is a result of repeatedly performing the substitution process of the substitution unit continuously twice for the input X. In addition, Y' is a result of repeatedly performing an inverse transformation of the substitution process of the substitution unit continuously twice for the input X.

According to this configuration, a cipher processing configuration, of which the resistance against various attacks is improved, having a high security level is realized.

Note that the effects described in this specification are merely examples but are not for the purposes of limitation, and any additional effect may be present.

BRIEF DESCRIPTION OF DRAWINGS

FIG. 11 is a diagram that illustrates an example of a data transformation process for a state (state representing data).

FIG. 12 is a diagram that illustrates an example of a data transformation process for a state.

FIGS. 13(1) and 13(2) are diagrams that illustrate an example of a data transformation process for a state.

FIG. 14(3) is a diagram that illustrates an example of a data transformation process for a state.

FIG. 15 is a diagram that illustrates a column diffusion operation process for a state.

FIG. 21 is a diagram that illustrates an example of a data transformation process performed by a cipher processing unit.

FIGS. 22(1) and 22(2) are diagrams that illustrate the configurations and the processes of a nonlinear transformation unit and a linear transformation unit of the cipher processing unit.

FIG. 23 is a diagram that illustrates the configuration and the process of Existing System 1 of the linear transformation unit.

FIG. 27 is a diagram that illustrates comparison data of the numbers of active S boxes of a case where the linear transformation unit is configured using Existing System 2 and Existing System 3.

FIGS. 30(1) and 30(2) are diagrams that illustrate the configuration and the process of a matrix operating unit of the linear transformation unit of the cipher processing apparatus of the present disclosure according to Embodiment 1.

FIGS. 31(1) and 31(2) are diagrams that illustrate the configuration and the process of a matrix operating unit of the linear transformation unit of the cipher processing apparatus of the present disclosure according to Embodiment 1.

FIG. 35 is a diagram that illustrates comparison data of the numbers of active S boxes of a case where the linear transformation unit is configured according to Embodiment 1 or Existing System 3.

FIG. 42 is a diagram that illustrates comparison data of the numbers of active S boxes of a case where the linear transformation unit is configured according to Embodiment 2, Embodiment 1, or Existing System 3.

MODE FOR CARRYING OUT THE INVENTION

Hereinafter, a cipher processing apparatus, a cipher processing method, and a program according to the present disclosure will be described in detail with reference to the drawings. The description will be made following items described below.

1. Overview of Common-Key Block Cipher
2. Index of Security in Common-Key Block Cipher
3. Whole Configuration of Common-Key Cipher Processing and Overview of Process
4. Configuration and Process of Linear Transformation Unit of Cipher Processing Unit
5. Configuration and Process of Linear Transformation Unit of Cipher Processing Apparatus according to Present Disclosure (Embodiment 1)
6. Configuration and Process of Linear Transformation Unit of Cipher Processing Apparatus according to Present Disclosure (Embodiment 2)

7. Applied Quasi-MDS Matrix
8. Example of Configuration of Cipher Processing Apparatus
9. Summary of Configuration according to Present Disclosure

1. Overview of Common-Key Block Cipher

First, an overview of a common-key block cipher will be described.

(1-1. Common-Key Block Cipher)

Here, a common-key block cipher (hereinafter, also referred to as a block cipher) represents the following defined below.

In the block cipher, a plain text P and a key K are taken as inputs, and a cipher text C is output. The bit length of each of the plain text and the cipher text is called a block size, and, for example, the block size=n. While n may take an arbitrary integer value, commonly, n is a one value determined in advance for each block cipher algorithm. A block cipher of which the block length is n may be also referred to as an n-bit block cipher.

The bit length of a key is represented as k. A key may take an arbitrary integer value. A common-key block cipher algorithm corresponds to one or a plurality of key sizes. For example, a certain block cipher algorithm A may be configured to have a block size n=128 and correspond to a key size of k=128, k=192, or k=256.

plain text P: n bits
cipher text C: n bits
key K: k bits

Figure 1:
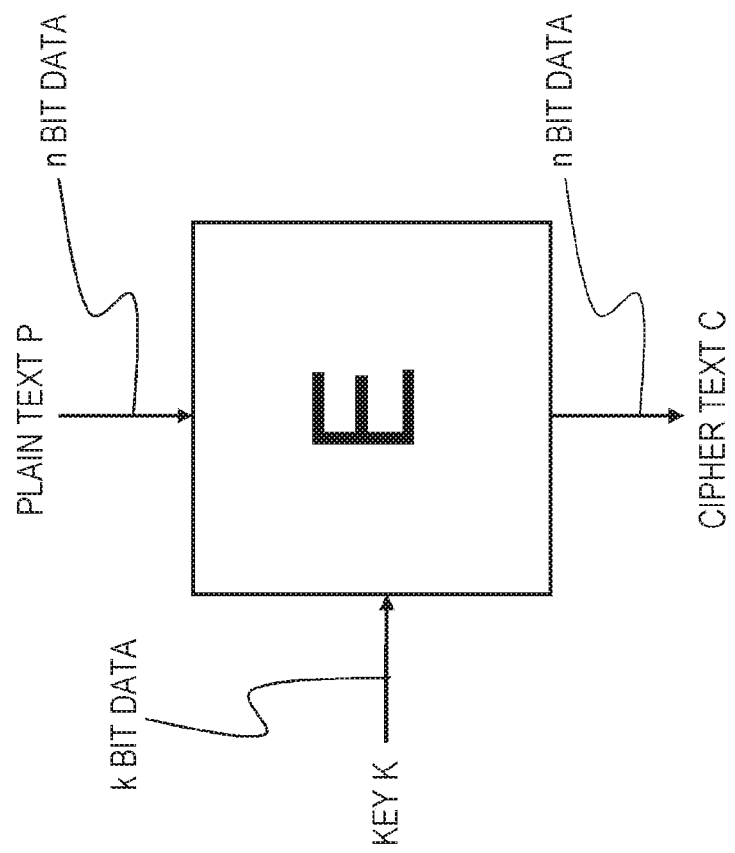
FIG. 1 is a diagram that illustrates an n-bit common key block cipher algorithm corresponding to a key length of k bits.

FIG. 1 is a diagram that illustrates an n-bit common key block cipher algorithm E corresponding to a key length of k bits.

Figure 2:
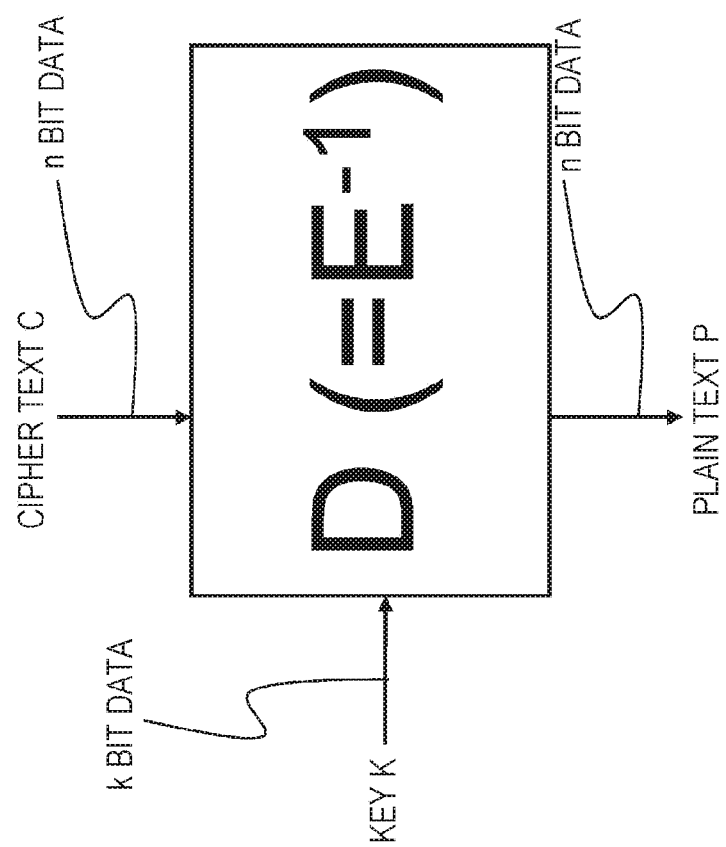
FIG. 2 is a diagram that illustrates a decryption algorithm corresponding to the n-bit common key block cipher algorithm corresponding to the key length of the k bits illustrated in FIG. 1.

A decryption algorithm D corresponding to the encryption algorithm E can be defined as an inverse function $E^{-1}$ of the encryption algorithm E and receives a cipher text C and a key K as inputs and outputs a plain text P. FIG. 2 is a diagram that illustrates the decryption algorithm D corresponding to the encryption algorithm E illustrated in FIG. 1.

(1-2. Internal Configuration)

A block cipher can be considered as two parts. One is a "key scheduling unit" that receives a secret key K as an input and outputs a round key applied in each round of a cipher processing unit in a set step, and the other is the "cipher processing unit" that receives a plain text P and receives a round key from the key scheduling unit as inputs, performs a data transformation thereof, and outputs a cipher text C.

Figure 3:
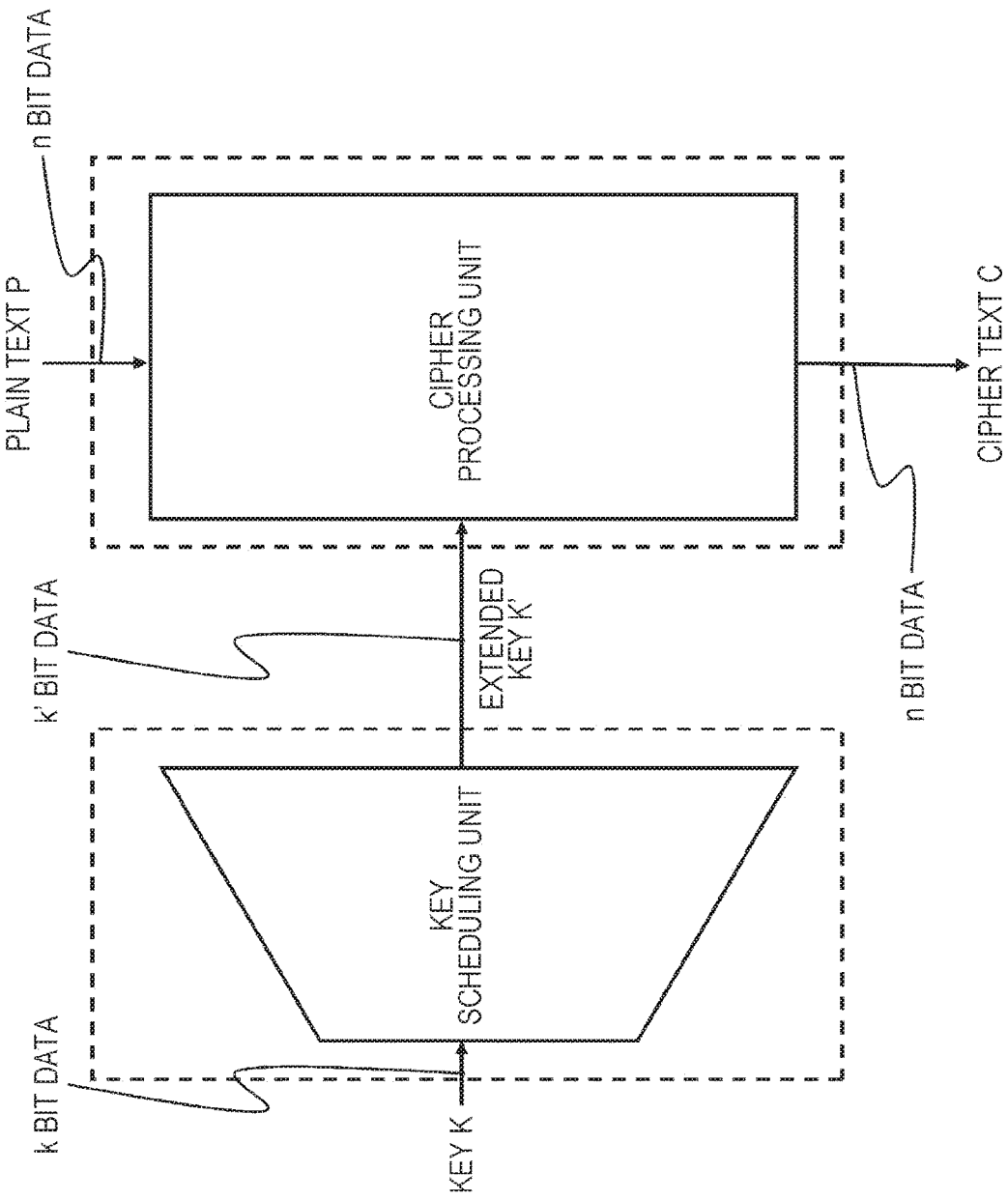
FIG. 3 is a diagram that illustrates a relation between a key scheduling unit and a cipher processing unit.

A relation between the two parts is illustrated in FIG. 3.

In addition, there are many cases where the cipher processing unit is configured to perform a decryption process of receiving a cipher text C as an input and outputting a plain text P as well. Also in such cases, a decryption process applying a round key supplied from the key scheduling unit is performed.

A relation between the two parts is illustrated in FIG. 3.

(1-3. Cipher Processing Unit)

The cipher processing unit used in the following embodiments can be divided into processing units called round functions. Each round function performs a predetermined data transformation for input data and outputs transformed data. Input data for the round function, for example, is n-bit data in the middle of encryption. An output of a round function in a certain round is configured to be supplied as an input of a next round. In addition, as one configuration of the round function, a configuration for an operation with a round key generated on the basis of a key output from the key scheduling unit is included. More specifically, exclusive OR of n-bit data in the middle of encryption and a round key is performed.

In addition, a total number of round functions is called a total round number and is a value that is set in advance for each cipher algorithm.

Figure 4:
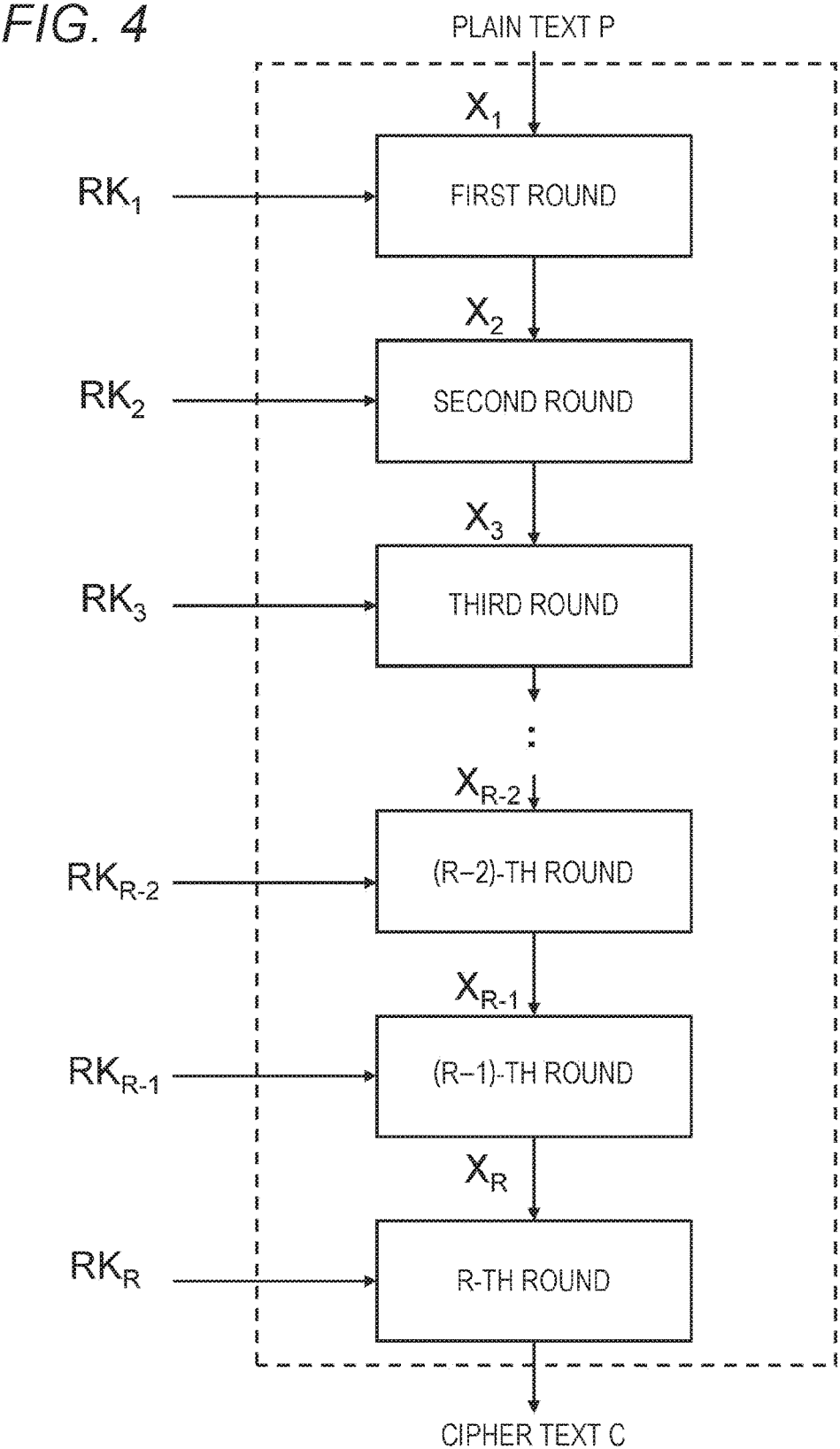
FIG. 4 is a diagram that illustrates an example of the configuration of a cipher processing unit.

When input data of the first round seen from the input side of the cipher processing unit is $X_1$, data input to the i-th round function is $X_i$, and a round key is $RK_i$, the whole cipher processing unit is represented as in FIG. 4.

(1-4. Round Function)

A round function may take various forms based on the block cipher algorithm. Round functions can be classified according to structures employed by the cipher algorithms. As representative structures, here, a substitution-permutation network (SPN) structure, a Feistel structure, and an extended Feistel structure will be presented as examples.

(A) Substitution-Permutation Network (SPN) Structure Round Function

Figure 5:
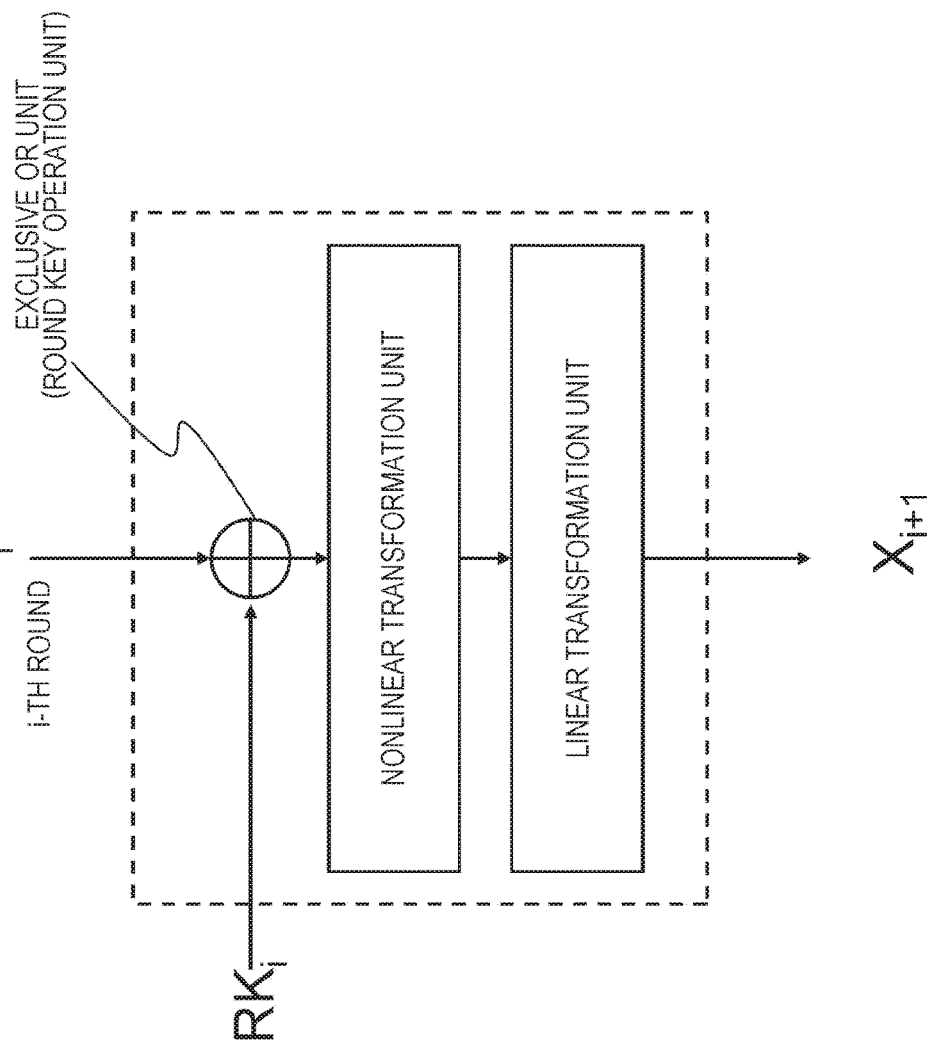
FIG. 5 is a diagram that illustrates an example of a round function having an SPN structure.

A configuration in which an exclusive OR operation with a round key, a nonlinear transformation, a linear transformation process, and the like are applied for all the input data of n bits. The order of the operations is not particularly set. FIG. 5 illustrates an example of a round function having the SPN structure. A linear transformation unit may be referred to also as a permutation layer (P layer).

(B) Feistel Structure

Figure 6:
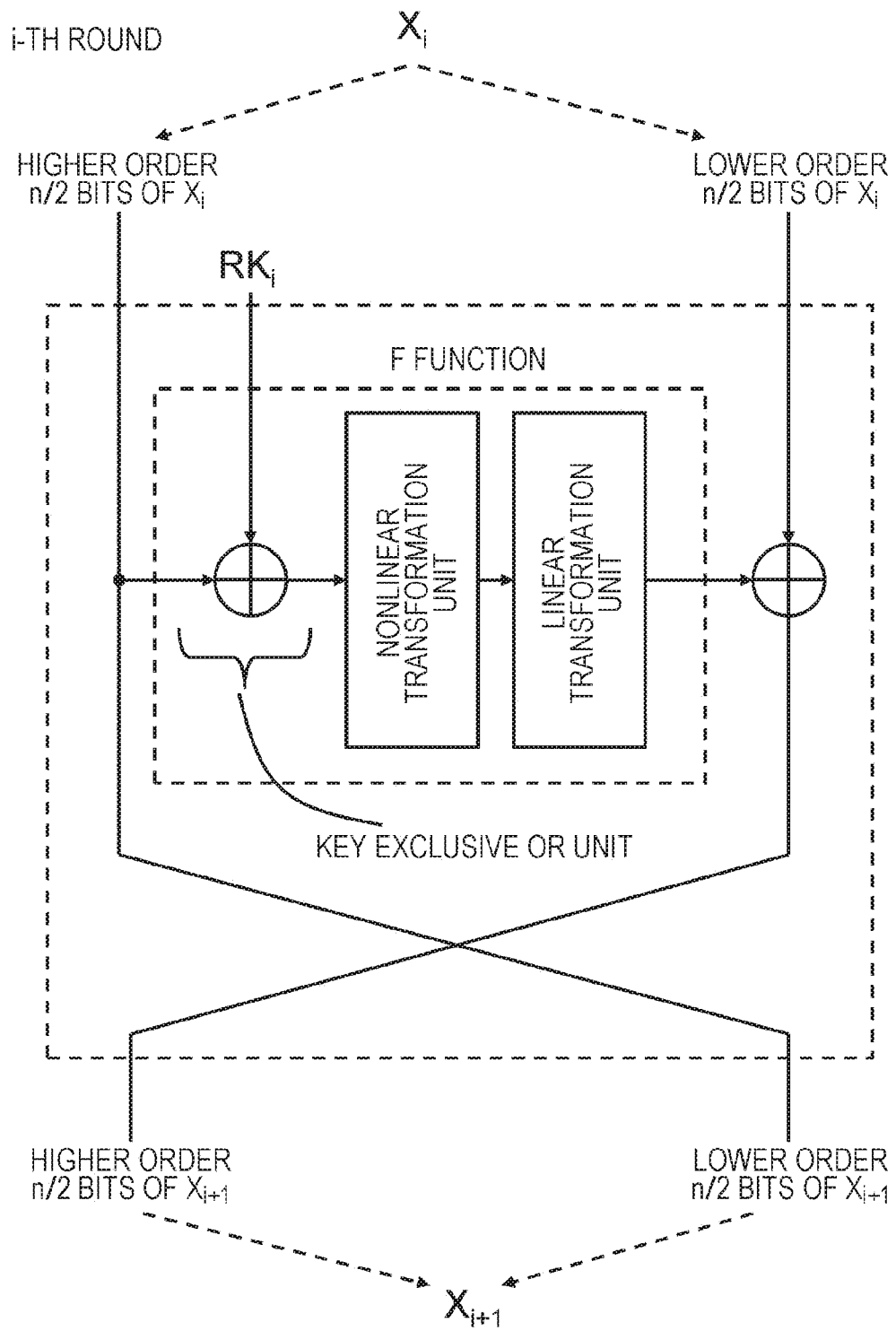
FIG. 6 is a diagram that illustrates an example of a round function having a Feistel structure.

Input data of n bits is divided into two pieces of data of n/2 bits. A function (F function) having one piece of data out of the pieces of data and a round key as inputs is applied, and the output is exclusively ORed with the other piece of data. Thereafter, data acquired by exchanging the left side and the right side is set as output data. While there are various types of internal configuration of the F function, basically, similar to the SPN structure, the internal configuration is realized by a combination of an exclusive OR operation with a round key data, a nonlinear operation, and a linear transformation. FIG. 6 illustrates an example of the round function having the Feistel structure.

(C) Extended Feistel Structure

Figure 7:
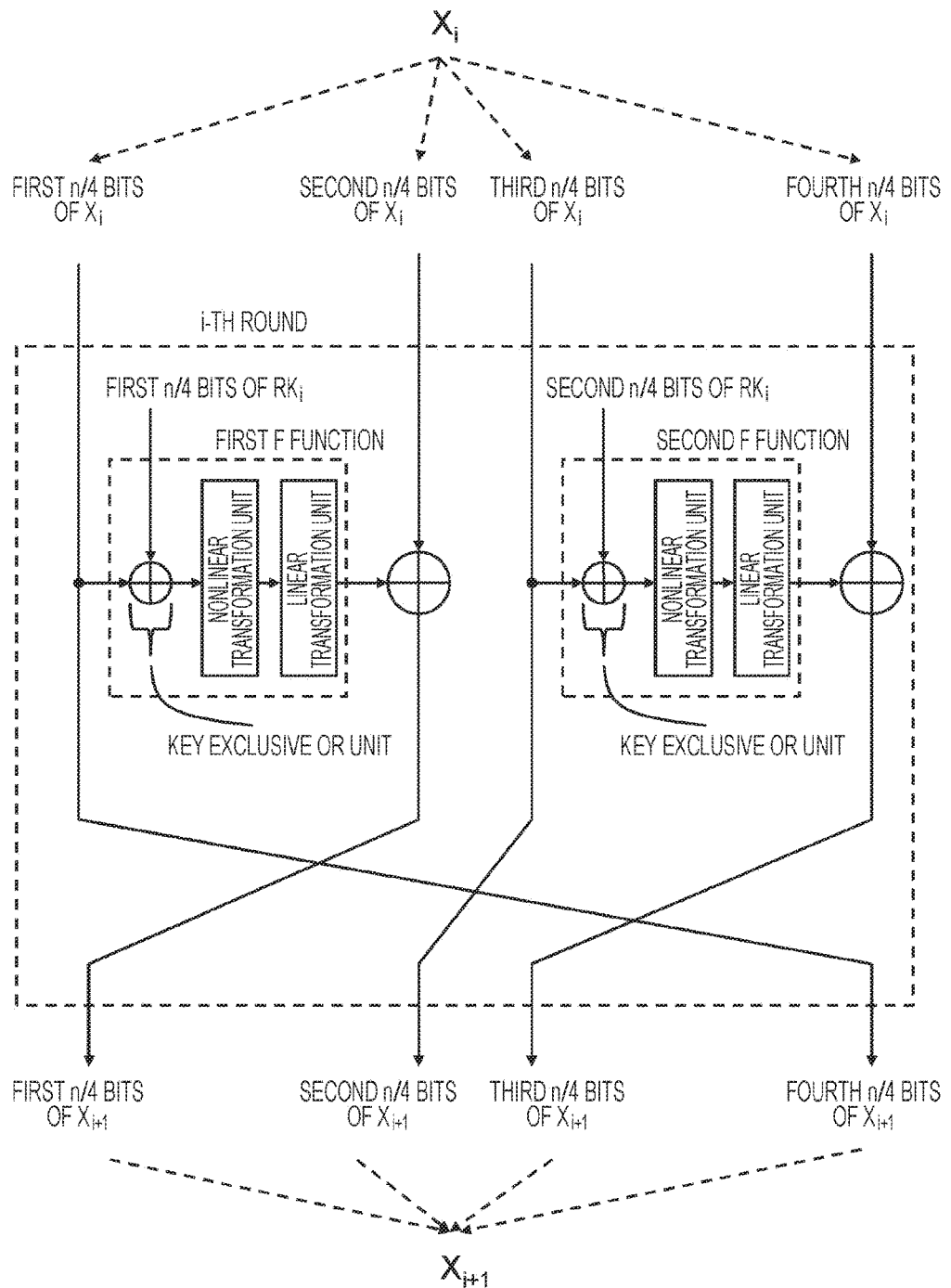
FIG. 7 is a diagram that illustrates an example of an extended Feistel structure.
Figure 8:
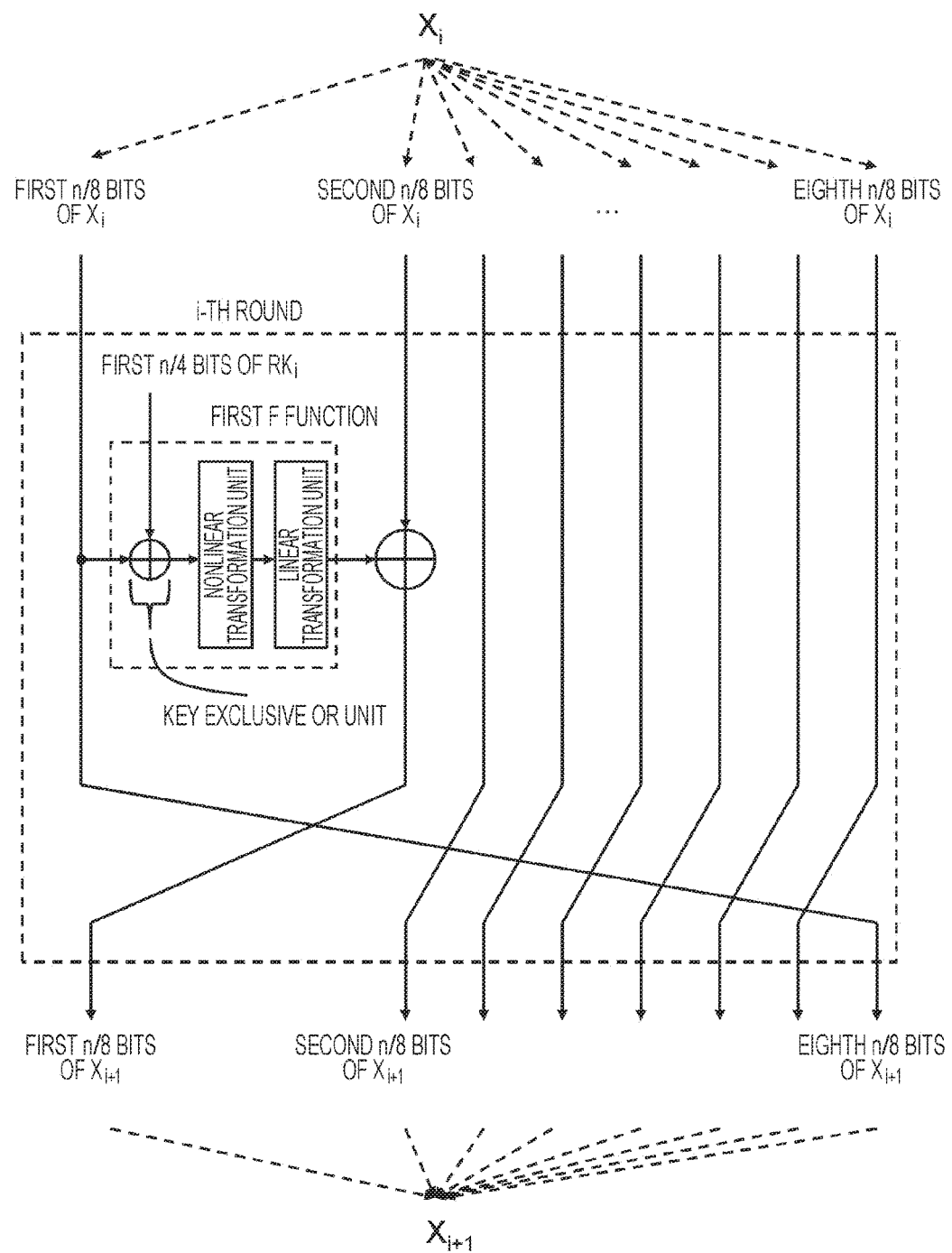
FIG. 8 is a diagram that illustrates an example of the extended Feistel structure.

The extended Feistel structure is acquired by extending the Feistel structure in which the number of data divisions is two to a form in which data is divided into three or more parts. When the number of divisions is d, various extended Feistel structures can be defined using d. Since the input/output size of the F function is relatively small, the extended Feistel structure is directed for small-size mounting. FIG. 7 illustrates an example of the extended Feistel structure of a case where d=4, and two F functions are applied in parallel inside one round. In addition, FIG. 8 illustrates an example of the extended Feistel structure of a case where d=8, and one F function is applied inside one round.

(1-5. Nonlinear Transformation Unit)

The mounting cost of the nonlinear transformation unit tends to increase as the size of input data is increased. In order to avoid this, there are many cases where target data is divided into a plurality of units, and a nonlinear transformation is performed for each of the units. For example, a configuration is employed in which an input size is ms bits, the input is divided into m pieces of data of s bits, and a nonlinear transformation having input/output of s bits is performed for each of the pieces of data. A nonlinear transformation executing unit in units of such s bits is called an S-box. An example of the S-box is illustrated in FIG. 9.

Figure 9:
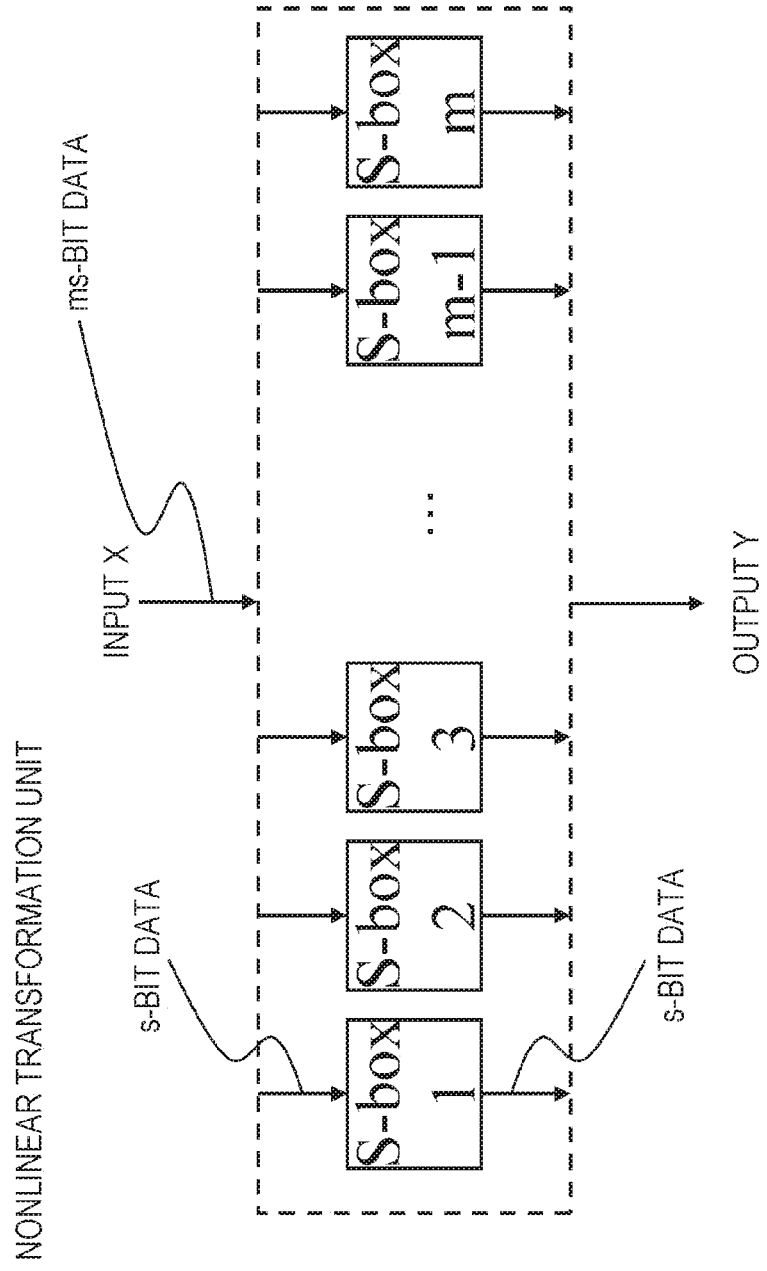
FIG. 9 is a diagram that illustrates an example of the configuration of a nonlinear transformation unit.

The example illustrated in FIG. 9 illustrates a configuration in which input data formed by ms bits is divided into m pieces of data of s bits, each divided data is input to m S boxes each performing a nonlinear transformation process of s bits, and a nonlinear transformation result of ms bits is acquired by connecting the outputs of the S boxes.

(1-6. Linear Transformation Unit)

Figure 10:
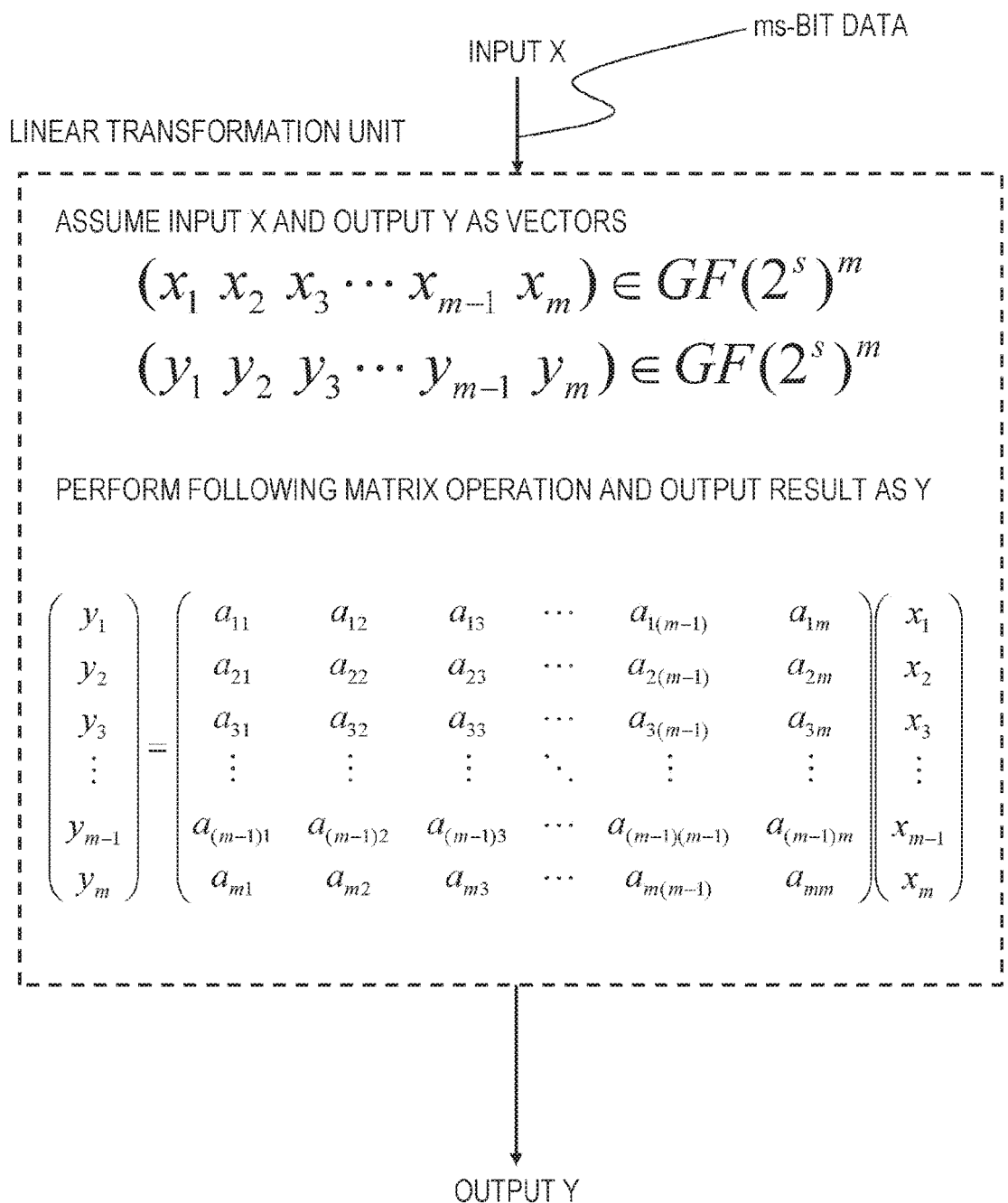
FIG. 10 is a diagram that illustrates an example of the configuration of a linear transformation unit.

The linear transformation unit can be defined as a matrix on the basis of the characteristics thereof. Generally, the elements of the matrix can be represented in various forms using elements of the body of an extended body $GF(2^8)$, elements of $GF(2)$, and the like. FIG. 10 illustrates an example of the linear transformation unit that has input/output of ms bits and is defined by a matrix of m×m defined on $GF(2^s)$.

(1-7. Data Representation Using State)

When each data (a plain text, a cipher text, a key, or the like) is represented, there are cases where data is represented as m×n array data in which data is formed in a matrix type of m rows and n columns. Data represented by this m×n array is referred to as a state or state representing data. Each element included in a state, in other words, each of m×n elements is referred to as a "word". The bit size of one word is referred to as a word size.

FIG. 11 illustrates an example in which input data is A, output data after a data transformation for the input data A is B, and each of the input data A and the output data B is represented as a state having an m×n array.

The input data A are elements of an extended body $GF(2^s)^{mn}$, and the input data $A=(a_0\ a_1\ a_2\ \ldots\ a_{mn-2}\ a_{mn-1})$.

In addition, $a_0$ is an MSB, and $a_{mn-1}$ is bit data of the LSB side.

Similarly, the output data B are elements of the extended body $GF(2^s)^{mn}$.

The output data $B=(b_0\ b_1\ b_2\ \ldots\ b_{mn-2}\ b_{mn-1})$.

In addition, $b_0$ is an MSB, and $b_{mn-1}$ is bit data of the LSB side.

As illustrated in the drawing, in a state of an m×n array, m×n elements are included.

For example, in a state A illustrated in FIG. 11, mn elements of $a_0$ to $a_{nm-1}$ are included. The elements of a state B are mn elements of $b_0$ to $b_{nm-1}$.

Each of such mn elements is formed by data of s (here, s=1 or more) bits. More specifically, each element (word) is bit data, for example, data of four bits, data of eight bits (one byte), or the like. In other words, the word size can be set to various sizes such as four bits, eight bits, and the like.

In addition, in the following embodiments, while the embodiments in which the word size of each element (word) is data of four bits will be described, the process of the present disclosure can be also applied to configurations other than the configuration of element data of four bits.

FIG. 12 illustrates an example of a 4×4 state of a case where each of 16 elements included in the 4×4 state is data of four bits.

Also in the example illustrated in FIG. 12, similar to that illustrated in FIG. 11, input data is A, and output data after a certain data transformation is B.

The input data A are elements of an extended body $GF(2^4)^{4\times4}$, and the input data $A=(a_0\ a_1\ a_2\ \ldots\ a_{14}\ a_{15})$.

In addition, $a_0$ is an MSB, and $a_{15}$ is bit data of the LSB side.

Similarly, the output data B are elements of the extended body $GF(2^4)^{4\times4}$, and the output data $B=(b_0\ b_1\ b_2\ \ldots\ b_{14}\ b_{15})$.

In addition, $b_0$ is an MSB, and $b_{15}$ is bit data of the LSB side.

The example illustrated in FIG. 12 is an example in which each of the input data A and the output data B is represented as states having a 4×4 array of which each element is formed from data of four bits.

For example, in the state A illustrated in FIG. 12, 16 elements of $a_0$ to $a_{15}$ are included, and each of such elements is data of four bits.

In other words, when the input data A of 64 bits is represented as states, the input data A can be represented as the state A having a 4×4 array of which each element illustrated in FIG. 12 is formed from data of four bits.

Similarly, in a state B illustrated in FIG. 12, 16 elements of $b_0$ to $b_{15}$ are included, and each of such elements is data of four bits as well.

In other words, when the output data B of 64 bits is represented as states, the output data B can be represented as the state B having a 4×4 array of which each element illustrated in FIG. 12 is formed from data of four bits.

(1.8. Basic Operation for State Representing Data)

Next, an operation process for a state (state representing data) will be described.

(1) Nonlinear Transformation Process (S)

For example, by applying a plurality of S boxes performing a nonlinear transformation of each element of the state in units of four bits, a nonlinear transformation process is performed.

As illustrated in FIG. 13(1), by performing the nonlinear transformation process for an input state A, a state B is generated.

A relation between an output $b_i$ and an input $a_i$ in units of four bits of each element of this case is $b_i=S(a_i)$ where i=0, 1, . . . , 15.

(2) Linear Transformation Process (P)

As illustrated in FIG. 13(2), by performing the linear transformation process for an input state A, a state B is generated.

The linear transformation process for a 4×4 state, for example, is performed as an operation regarding four pieces of data for each row of the 4×4 state as a vector and updating the values thereof by using a matrix [M] of 4×4. This is called a row diffusion operation.

A relation between an output $b_i$ and an input $a_i$ in units of four bits of each element of the states after the transformation process is ${}^t(b_i, b_{i+4}, b_{i+8}, b_{i+12})=M\times{}^t(a_i, a_{i+4}, a_{i+8}, a_{i+12})$, where i=0, 1, 2, 3. In addition, ${}^tX$ represents a transposed matrix of X. As the linear transformation process, there are various processing methods such as a column diffusion operation, a bit substitution, and the like other than the row diffusion operation.

(3) Exclusive OR Operation (Key Applying Operation Process (K))

As illustrated in FIG. 14(3), by performing an exclusive OR operation process for an input state A, a state B is generated.

For example, the process described above is an operation for calculating output data B by performing an exclusive OR operation of a round key K output from the key scheduling unit and input data A. Each of the input data A, the round key K, and the output data B is state representing data of 64 bits formed by 16 elements of four bits.

A relation among the output $b_i$, the input $a_i$, and the round key $k_i$ in units of four bits of each element of the states after the transformation process is $b_i=a_i(XOR)k_i$, where i=0, 1, . . . , 15. In addition, in the equation described above, (XOR) represents an exclusive OR operation.

According to a combination of operations in which the operations (1) to (3) are sequentially executed in a predetermined sequence, one round operation is set. For input data, the round operation is repeatedly performed, and output data, for example, encryption data is generated and output.

In addition, a basic round operation is set as performing of each of an exclusive OR operation with a round key, a linear transformation process, and a nonlinear transformation process once. However, within the round operation performed in a cipher processing sequence, the configuration of an irregular round operation can be set. For example, a round operation different from the other round operations such as a round operation including a plurality of exclusive OR operations with a round key, a configuration in which the linear transformation process is omitted, or the like may be set.

In addition, a configuration in which only an operation with a round key is performed at the start or end of the cipher processing sequence is frequently used as well. Such a process is called a key whitening process and, generally, is not counted as a round number.

(1-9. Column Diffusion Operation for State Representing Data)

A column diffusion operation process for a state representing data represented as a matrix array of m×n will be described with reference to FIGS. 15 and 16.

Each of $X_0, X_1, \ldots, X_{n-1}$ is assumed to be an m×m matrix of which each element is formed from an element on $GF(2^s)$.

As illustrated in FIG. 15, a matrix operation of an operation of $MC[X_0, X_1, \ldots, X_{n-1}]$, for elements of state representing data, applying elements of each column (0 to n−1) of the state and matrixes $X_0, X_1, \ldots, X_{n-1}$ corresponding to each column is defined as a column diffusion operation.

In addition, MC represents diffusion (Mix) in units of one column, in other words, (MixColumn).

In the column diffusion operation, a matrix operation of applying one matrix $X_k$ to elements of one column of the state is performed.

In addition, the matrixes $X_k$ applied to a plurality of columns configuring the state may be set to be the same matrix or set to be mutually-different matrixes.

For example, an operation equation calculating a state B that is output data by performing a column diffusion operation for a state A that is input data can be represented as below.

$$B = MC[X_0, X_1, \ldots, X_{n-1}] \quad (A)$$

This column diffusion operation process, as illustrated in a lower stage of FIG. 15, is a process represented by the following equation.

In other words, the elements of the state B calculated by the operation equation described above are as follows.

$${}^t(b_0 b_1 \ldots b_{m-1}) = X_0 \times {}^t(a_0 a_1 \ldots a_{m-1})$$

$${}^t(b_m b_{m+1} \ldots b_{2m-1}) = X1 \times {}^t(a_m a_{m-1} \ldots a_{2m-1})$$

$${}^t(b_{(n-1)m} b_{(n-1)m+1} \ldots b_{nm-1}) = X_{n-1} \times {}^t(a_{(n-1)m} a_{(n-1)m+1} \ldots a_{nm-1})$$

In addition, in the equation ${}^t(b_1 b_2 \ldots b_k)$ described above represents a transposed matrix of $(b_1 b_2 \ldots b_k)$ When the operation equation described above is represented according to the element arrays of the actual states A and B, as illustrated in the lower stage illustrated in FIG. 15, the following operation equation (Equation 1) is formed.

[Mathematical Expression 1]

$$\begin{pmatrix} b_0 \\ b_1 \\ \vdots \\ b_{m-1} \end{pmatrix} = X_0 \cdot \begin{pmatrix} a_0 \\ a_1 \\ \vdots \\ a_{m-1} \end{pmatrix}, \quad \text{(Equation 1)}$$

$$\begin{pmatrix} b_m \\ b_{m+1} \\ \vdots \\ b_{2m-1} \end{pmatrix} = X_1 \cdot \begin{pmatrix} a_m \\ a_{m+1} \\ \vdots \\ a_{2m-1} \end{pmatrix}, \ldots, \ldots,$$

$$\begin{pmatrix} b_{(n-1)m} \\ b_{(n-1)m+1} \\ \vdots \\ b_{nm-1} \end{pmatrix} = X_{n-1} \cdot \begin{pmatrix} a_{(n-1)m} \\ a_{(n-1)m+1} \\ \vdots \\ a_{nm-1} \end{pmatrix}$$

Figure 16:
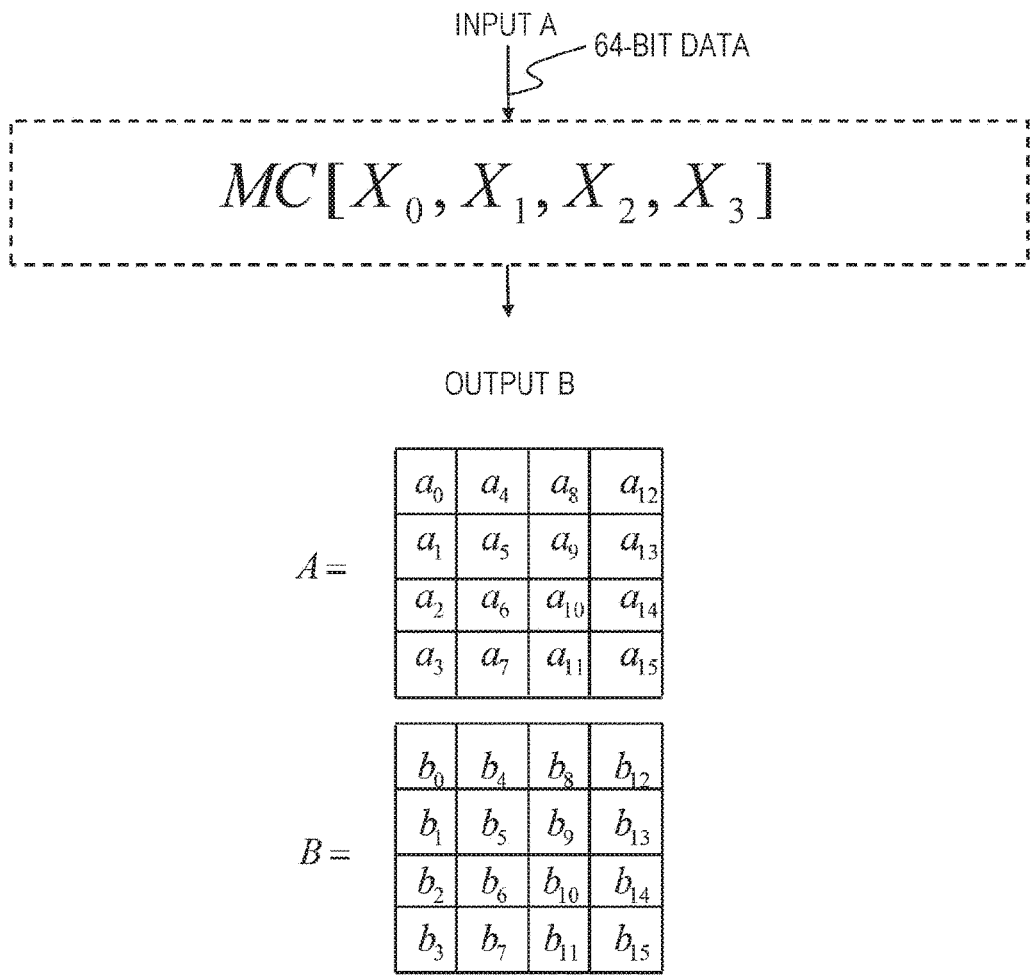
FIG. 16 is a diagram that illustrates a column diffusion operation process for a state.

FIG. 16 is a diagram that illustrates an example of the application process of a column diffusion operation: $MC[X_0, X_1, X_2, X_3]$ of a case where the input data A is 64-bit data, the state A is a state A formed from 16 data elements of four bits, the output data B is 64-bit data, and the state B is a state B formed from 16 data elements of four bits.

In other words, as described with reference to FIG. 15, an example of the calculation process of elements of the state B performed by the column diffusion operation process of $B = MC[X_0, X_1, X_2, X_3]$ (A) described above is illustrated.

In other words, the elements of the state B calculated using the operation equation described above are as follows.

$${}^t(b_0 b_1 b_2 b_3) = X_0 \times {}^t(a_0 a_1 a_2 a_3)$$

$${}^t(b_4 b_5 b_6 b_7) = X_1 \times {}^t(a_4 a_5 a_6 a_7)$$

$${}^t(b_8 b_9 b_{10} b_{11}) = X_2 \times {}^t(a_8 a_9 a_{10} a_{11})$$

$${}^t(b_{12} b_{13} b_{14} b_{15}) = X_3 \times {}^t(a_{12} a_{13} a_{14} a_{15})$$

When the operation equation described above is represented according to the element arrays of the actual states A and B, as illustrated in a lower stage illustrated in FIG. 16, the following operation equation (Equation 2) is formed.

[Mathematical Expression 2]

$$\begin{pmatrix} b_0 \\ b_1 \\ b_2 \\ b_3 \end{pmatrix} = X_0 \cdot \begin{pmatrix} a_0 \\ a_1 \\ a_2 \\ a_3 \end{pmatrix}, \quad \text{(Equation 2)}$$

$$\begin{pmatrix} b_4 \\ b_5 \\ b_6 \\ b_7 \end{pmatrix} = X_1 \cdot \begin{pmatrix} a_4 \\ a_5 \\ a_6 \\ a_7 \end{pmatrix},$$

$$\begin{pmatrix} b_8 \\ b_9 \\ b_{10} \\ b_{11} \end{pmatrix} = X_2 \cdot \begin{pmatrix} a_8 \\ a_9 \\ a_{10} \\ a_{11} \end{pmatrix},$$

$$\begin{pmatrix} b_{12} \\ b_{13} \\ b_{14} \\ b_{15} \end{pmatrix} = X_3 \cdot \begin{pmatrix} a_{12} \\ a_{13} \\ a_{14} \\ a_{15} \end{pmatrix}$$

In addition, in a case where a matrix operation applying the same matrix X to each column element of the state is performed, it may be also represented as MC[X].

In other words, MC[X] and MC[X, X, . . . , X] are the same operations.

(1-10. Row Diffusion Operation for State Representing Data)

A row diffusion operation process for a state representing data represented as a matrix array of m×n will be described with reference to FIGS. 17 and 18.

Each of $X_0, X_1, \ldots, X_{n-1}$ is assumed to be an n×n matrix of which each element is formed from an element on $GF(2^s)$.

Figure 17:
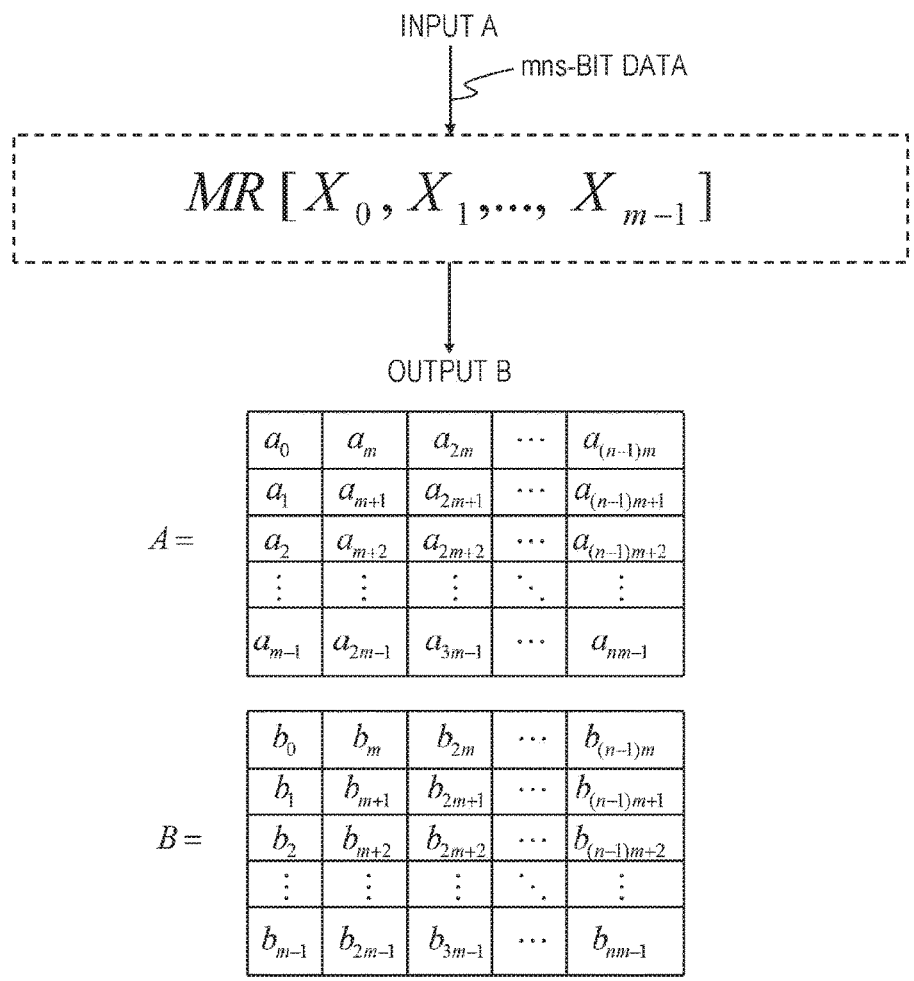
FIG. 17 is a diagram that illustrates a row diffusion operation process for a state.

As illustrated in FIG. 17, a matrix operation of an operation of $MR[X_0, X_1, \ldots, X_{m-1}]$, for elements of the state representing data, applying elements of each row (0 to n−1) of the state and matrixes $X_0, X_1, \ldots, X_{m-1}$ corresponding to each row is defined as a row diffusion operation.

In addition, MR represents diffusion (Mix) in units of one row, in other words, (MixRow).

In the row diffusion operation, a matrix operation of applying one matrix $X_k$ to elements of one row of the state is performed.

In addition, the matrixes $X_k$ applied to a plurality of rows configuring the state may be set to be the same matrix or set to be mutually-different matrixes.

For example, an operation equation calculating a state B that is output data by performing a row diffusion operation for a state A that is input data can be represented as below.

$$B = MR[X_0, X_1, \ldots, X_{m-1}] \quad (A)$$

This row diffusion operation process is a process as illustrated in a lower stage of FIG. 17.

In other words, the elements of the state B calculated by the operation equation described above are as follows.

$$^t(b_0 \ b_m \ \ldots \ b_{(n-1)m}) = X_0 \times {}^t(a_0 \ a_m \ \ldots \ a_{(n-1)m})$$

$$^t(b_1 \ b_{m+1} \ \ldots \ b_{(n-1)m+1}) = X_1 \times {}^t(a_1 \ a_{m+1} \ \ldots \ a_{(n-1)m+1})$$

$$\ldots$$

$$^t(b_{m-1} \ b_{2m-1} \ \ldots \ b_{nm+1}) = X_{m-1} \times {}^t(a_{m-1} \ a_{2m+1} \ \ldots \ a_{nm+1})$$

In addition, in the equation $t(b_1 \ b_2 \ldots b_k)$ described above represents a transposed matrix of $(b_1 \ b_2 \ldots b_k)$ When the operation equation described above is represented according to the element arrays of the actual states A and B, as illustrated in the lower stage illustrated in FIG. 17, the following operation equation (Equation 3) is formed.

[Mathematical Expression 3]

$$\begin{pmatrix} b_0 \\ b_m \\ \vdots \\ b_{(n-1)m-1} \end{pmatrix} = X_0 \cdot \begin{pmatrix} a_0 \\ a_m \\ \vdots \\ a_{(n-1)m} \end{pmatrix},$$

$$\begin{pmatrix} b_1 \\ b_{m+1} \\ \vdots \\ b_{(n-1)m+1} \end{pmatrix} = X_1 \cdot \begin{pmatrix} a_1 \\ a_{m+1} \\ \vdots \\ a_{(n-1)m+1} \end{pmatrix}, \ldots, \ldots,$$

$$\begin{pmatrix} b_{m-1} \\ b_{2m-1} \\ \vdots \\ b_{nm-1} \end{pmatrix} = X_{m-1} \cdot \begin{pmatrix} a_{m-1} \\ a_{2m-1} \\ \vdots \\ a_{nm-1} \end{pmatrix}$$

(Equation 3)

Figure 18:
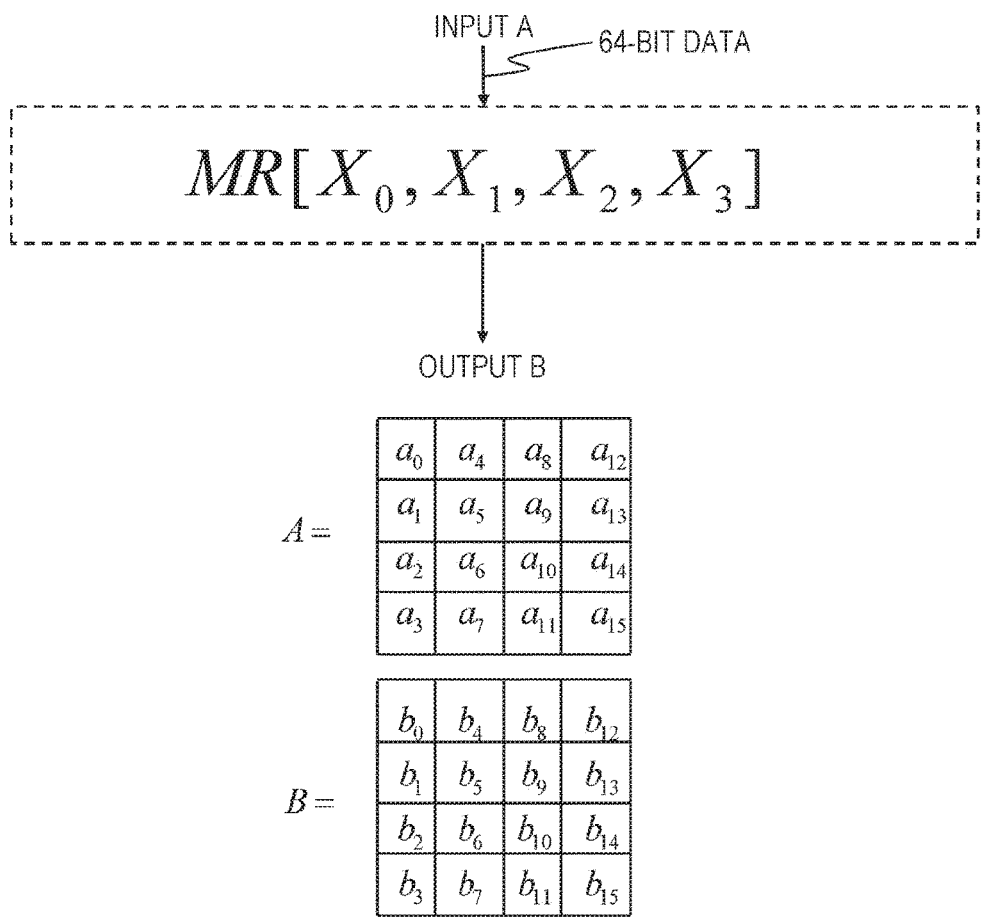
FIG. 18 is a diagram that illustrates a row diffusion operation process for a state.

FIG. 18 is a diagram that illustrates an example of the application process of a row diffusion operation: $MR[X_0, X_1, X_2, X_3]$ of a case where the input data A is 64-bit data, the input data A is a state A formed from 16 data elements of four bits, the output B is 64-bit data, and the state B is a state B formed from 16 data elements of four bits.

In other words, as described with reference to FIG. 17, an example of the calculation process of elements of the state B performed by the row diffusion operation process of $B = MR[X_0, X_1, X_2, X_3]$ (A) described above is illustrated.

In other words, the elements of the state B calculated using the operation equation described above are as follows.

$$^t(b_0 b_4 b_8 b_{12}) = X_0 \times {}^t(a_0 a_4 a_8 a_{12})$$

$$^t(b_1 b_5 b_9 b_{13}) = X_1 \times {}^t(a_1 a_5 a_9 a_{13})$$

$$^t(b_2 b_6 b_{10} b_{14}) = X_2 \times {}^t(a_2 a_6 a_{10} a_{14})$$

$$^t(b_3 b_7 b_{11} b_{15}) = X_3 \times {}^t(a_3 a_7 a_{11} a_{15})$$

When the operation equation described above is represented according to the element arrays of the actual states A and B, as illustrated in a lower stage illustrated in FIG. 18, the following operation equation (Equation 4) is formed.

[Mathematical Expression 4]

$$\begin{pmatrix} b_0 \\ b_4 \\ b_8 \\ b_{12} \end{pmatrix} = X_0 \cdot \begin{pmatrix} a_0 \\ a_4 \\ a_8 \\ a_{12} \end{pmatrix},$$

$$\begin{pmatrix} b_1 \\ b_5 \\ b_9 \\ b_{13} \end{pmatrix} = X_1 \cdot \begin{pmatrix} a_1 \\ a_5 \\ a_9 \\ a_{13} \end{pmatrix},$$

$$\begin{pmatrix} b_2 \\ b_6 \\ b_{10} \\ b_{14} \end{pmatrix} = X_2 \cdot \begin{pmatrix} a_2 \\ a_6 \\ a_{10} \\ a_{14} \end{pmatrix},$$

$$\begin{pmatrix} b_3 \\ b_7 \\ b_{11} \\ b_{15} \end{pmatrix} = X_3 \cdot \begin{pmatrix} a_3 \\ a_7 \\ a_1 \\ a_{15} \end{pmatrix}$$

(Equation 4)

In addition, in a case where a matrix operation applying the same matrix X to each row element of the state is performed, it may be also represented as MR[X].

In other words, MR[X] and MR[X, X, . . . , X] are the same operations.

2. Index of Security in Common-Key Block Cipher

Attacks for a common-key block cipher, for example, various attacks for the purpose of deciphering a secret key and the like are known. More specifically, there are a difference attack, a linear attack, and the like.

The difference attack is an attack for estimating a key by inputting data having a specific difference to a cipher apparatus and detecting data reflecting an input difference from the output. In addition, a propagation probability of a difference value is called a difference probability.

The linear attack is an attack for estimating a key by observing a correlation between exclusive OR of specific bits of an input and exclusive OR of specific bits of an output and finding out a strong correlation. In addition, a correlation coefficient of the specific bits of the input/output is called a linear probability.

A cipher having a high security level is a cipher having high resistance against various kinds of attacks as described above, in other words, a cipher for which secret information applied to cipher processing, for example, a key or the like is difficult to decipher.

Hereinafter, a plurality of pieces of data that is an index for the security of a cipher algorithm will be described.

(2-1. Number of Branches)

For a common-key block cipher, various data transformations, for example, the linear transformation, the nonlinear transformation, and the exclusive OR operation described above and the like are performed.

As an index of the security for the deciphering difficulty of such a data transformation, there is the number of branches.

For example, mapping $\theta$ from data of n×a bits to data of n×b bits is represented as $\theta: \{0, 1\}^{na} \to \{0, 1\}^{nb}$.

For the mapping $\theta$ described above, the number of branches ($Branch_n(\theta)$) is defined as below.

$$Branch_n(\theta) = \min_{\alpha \neq 0}\{hw_n(\alpha) + hw_n(\theta(\alpha))\}$$

Here, $\min_{\alpha \neq 0}\{X\alpha\}$ represents a minimum value of all $X_\alpha$ satisfying $\alpha \neq 0$, and $hw_n(Y)$ is a function returning the number of (non-zero) elements of which data of all the n bits is not "0" when a bit stream Y is represented to be delimited for every n bits.

Generally, as the number of branches is increased, the deciphering difficulty increases, and the resistance against a difference attack or a linear attack is regarded to be improved.

In addition, mapping $\theta$ of which the number $Branch_n(\theta)$ is b+1 is defined as optimal diffusion mapping (ODM).

Furthermore, mapping $\theta$ of which the number $Branch_n(\theta)$ is b is defined as sub optimal diffusion mapping (SODM).

As a matrix for a linear transformation of which the number of branches is large, for example, there is a maximum distance separable (MDS) matrix performing an optimal diffusion mapping (ODM) of the number of branches=b+1. The MDS matrix is a matrix for which an arbitrary submatrix configuring the matrix is a regular matrix. In addition, the regular matrix is a matrix having an inverse matrix, and, when a matrix is A, and an inverse matrix is $A^{-1}$, $AA^{-1} = A^{-1}A = E$, where E is a unit matrix. A matrix A having an inverse matrix $A^{-1}$ satisfying the equation described above is a regular matrix.

In addition, as a matrix performing a quasi-optimal diffusion transformation (SODM) of the number of branches=b, there is a quasi-MDS matrix (Almost-MDS matrix).

In a case where an MDS matrix and a quasi-MDS matrix having a same size are compared with each other, the diffusion performance of the MDS matrix is higher than that of the quasi-MDS matrix. However, generally, the required calculation amount of the quasi-MDS matrix is smaller than that of the MDS matrix.

(2-2. Minimum Difference Active S-Box Number)

As described above, in a nonlinear transformation unit set to a common key block cipher, an S-box performing a nonlinear transformation in units of s bits is used.

As an index representing the resistance against a difference attack, there is a minimum number of difference active S-boxes included in a difference path representing a connection relation of differences, in other words, a minimum difference active S-box number.

The difference path is acquired by designating specific difference values for all the data parts in an encryption function except for key data. The difference values are not freely determined, but the difference values before and after a transformation process are associated with each other, and, before and after a linear transformation process, a relation between an input difference and an output difference is determined as one to one. Before and after a nonlinear transformation, while a relation between an input difference and an output difference is not determined as one to one, the concept of a probability is introduced. A probability for a certain input difference and an output difference can be calculated in advance. By adding probabilities for all the outputs, one is obtained.

In a general cipher (a block cipher or the like), a nonlinear transformation is only the part of the process performed by S-boxes. Accordingly, in such a case, a difference path having a probability other than zero is a set of difference data starting from a difference value for a plain text (input) and arriving at a difference value of a cipher text (output), and difference values given before and after all the S-boxes have probabilities other than zero. An S-box of a difference path having a probability other than zero to which a difference value other than zero is input will be referred to as a difference active S-box. A smallest number of difference active S-box numbers of all the difference paths having probabilities other than zero is called a minimum difference active S-box number, and this numerical value is well known as an index of the security for a difference attack.

Generally, by assuring that the minimum difference active S-box number is sufficiently large, the security for a difference attack can be represented, and a cipher assuring a more minimum difference active S-box number with a smaller number of times of repeating a round function can be regarded to be a cipher having higher performance. In addition, a difference path in which all the difference values are zeros has a probability of "1" and does not have any meaning of an attack.

(2-3. Minimum Linear Active S-Box Number)

As one of indexes representing the resistance against a linear attack, there is a minimum number of linear active S-boxes included in a linear path representing a connection relation among linear masks.

In addition, while the linear path may be frequently called linear approximation, for a correspondence with a difference, here, the term "path" will be used.

The linear path is acquired by designating specific linear mask values for all the data parts in an encryption function except for key data. The linear mask values are not freely determined, but the linear mask values before and after a transformation process are associated with each other, and, before and after a linear transformation process, a relation between an input linear mask value and an output linear mask value is determined as one to one. Before and after a nonlinear transformation, while a relation between an input linear mask value and an output linear mask value is not determined as one to one, the concept of a probability is introduced. For an input linear mask value, a set of one or more linear mask values to be output is present, and a probability of the output of each thereof can be calculated in advance. By adding probabilities for all the outputs, one is obtained.

In a general cipher (a block cipher or the like), a nonlinear transformation is only the part of the process performed by S-boxes. Accordingly, in such a case, a linear path having a probability other than zero is a set of linear mask value data starting from a linear mask value for a plain text (input) and arriving at a linear mask value of a cipher text (output), and linear mask values given before and after all the S-boxes have probabilities other than zero. An S-box of a linear path having a probability other than zero to which a linear mask value other than zero is input will be referred to as a linear active S-box. A smallest number of active S-box numbers of all the linear paths having probabilities other than zero is called a minimum linear active S-box number, and this numerical value is well known as an index of the security for a linear attack.

Generally, by assuring that the minimum linear active S-box number is sufficiently large, the security for a linear attack can be represented, and a cipher assuring a more minimum linear active S-box number with a smaller number of times of repeating a round function can be regarded to be a cipher having higher performance. In addition, a linear path in which all the linear mask values are zeros has a probability of "1" and does not have any meaning of an attack.

3. Whole Configuration of Common-Key Cipher Processing and Overview of Process Next, the whole configuration and the process of a common-key cipher processing apparatus will be described.

The cipher processing apparatus according to the present disclosure described hereinafter is an apparatus that executes a common-key block cipher (block cipher) and is an apparatus that has a round function of a substitution-permutation network (SPN) structure.

For all the input data of n bits, an exclusive OR operation with a round key, a nonlinear transformation, a linear transformation process are configured to be repeatedly performed in a plurality of rounds.

Figure 19:
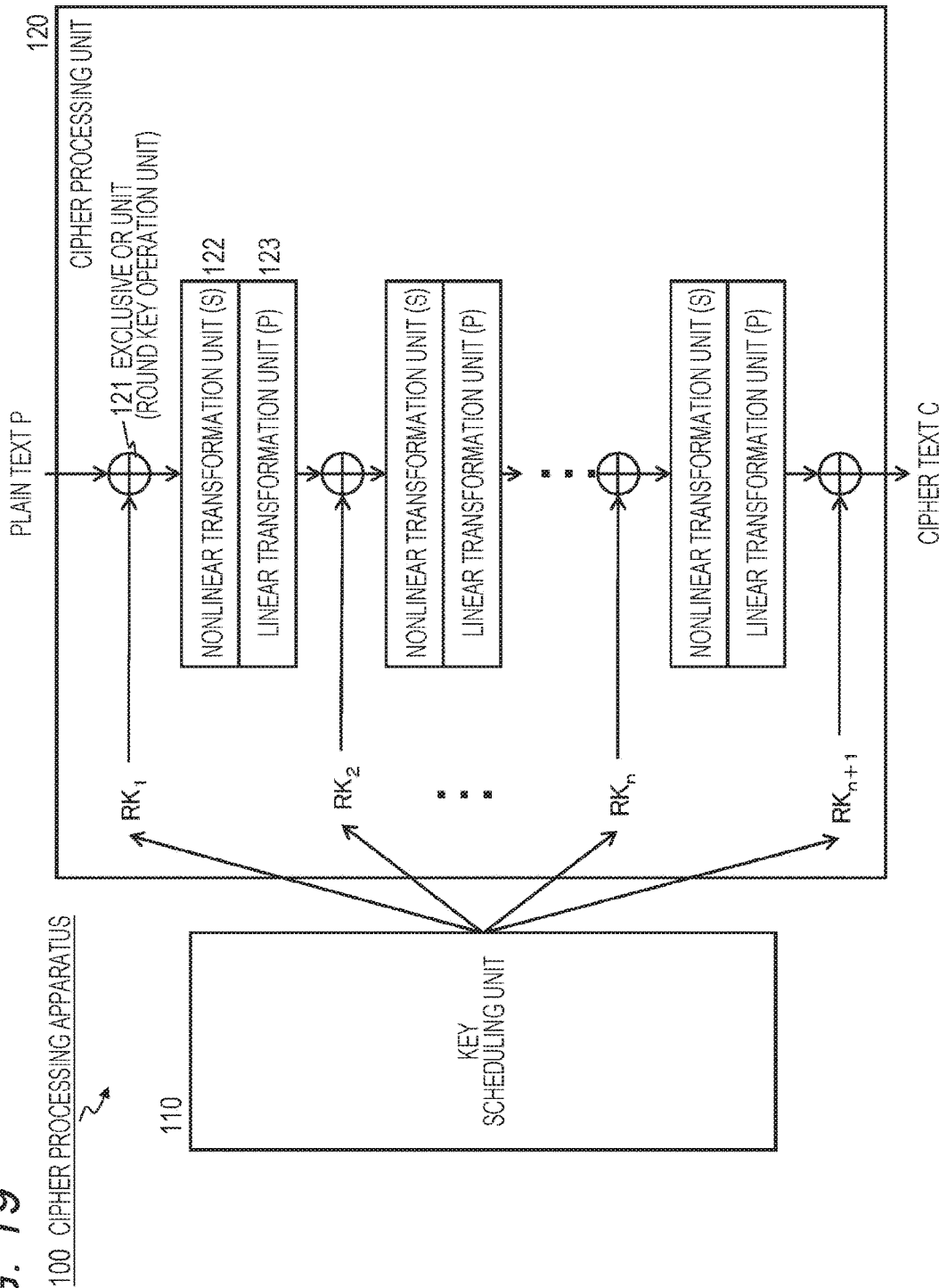
FIG. 19 is a diagram that illustrates an example of the configuration of a cipher processing apparatus according to one embodiment of the present disclosure.

One specific configuration example of the common-key cipher processing apparatus according to the present disclosure is illustrated in FIG. 19.

As illustrated in FIG. 19, the cipher processing apparatus 100 includes a key scheduling unit 110 and a cipher processing unit 120.

The key scheduling unit 110 receives a secret key K as an input and outputs a round key applied in each round of the cipher processing unit 120 on the basis of a predetermined key generation algorithm. The cipher processing unit 120 receives a round key as an input from the key scheduling unit 110, performs a data transformation of a plain text P, and outputs a cipher text C.

In addition, the cipher processing unit 120 also can perform a decryption process of receiving a cipher text C as an input and outputting a plain text P. When the decryption process is performed, the cipher processing unit 120 performs a process applying a round key supplied from the key scheduling unit 110 in an order opposite to that of the encryption process.

The cipher processing unit 120 includes: an exclusive OR unit 121 that executes an exclusive OR operation of input data and a round key; a nonlinear transformation unit 122 that performs a nonlinear transformation process for input data; and a linear transformation unit 123 that performs a linear transformation process for input data.

As illustrated in the drawing, the cipher processing unit 120 of the cipher processing apparatus 100 according to the present disclosure has a configuration in which three mutually-different data transformation processes are repeatedly performed using the configurations of the exclusive OR unit 121, the nonlinear transformation unit 122, and the linear transformation unit 123.

Figure 20:
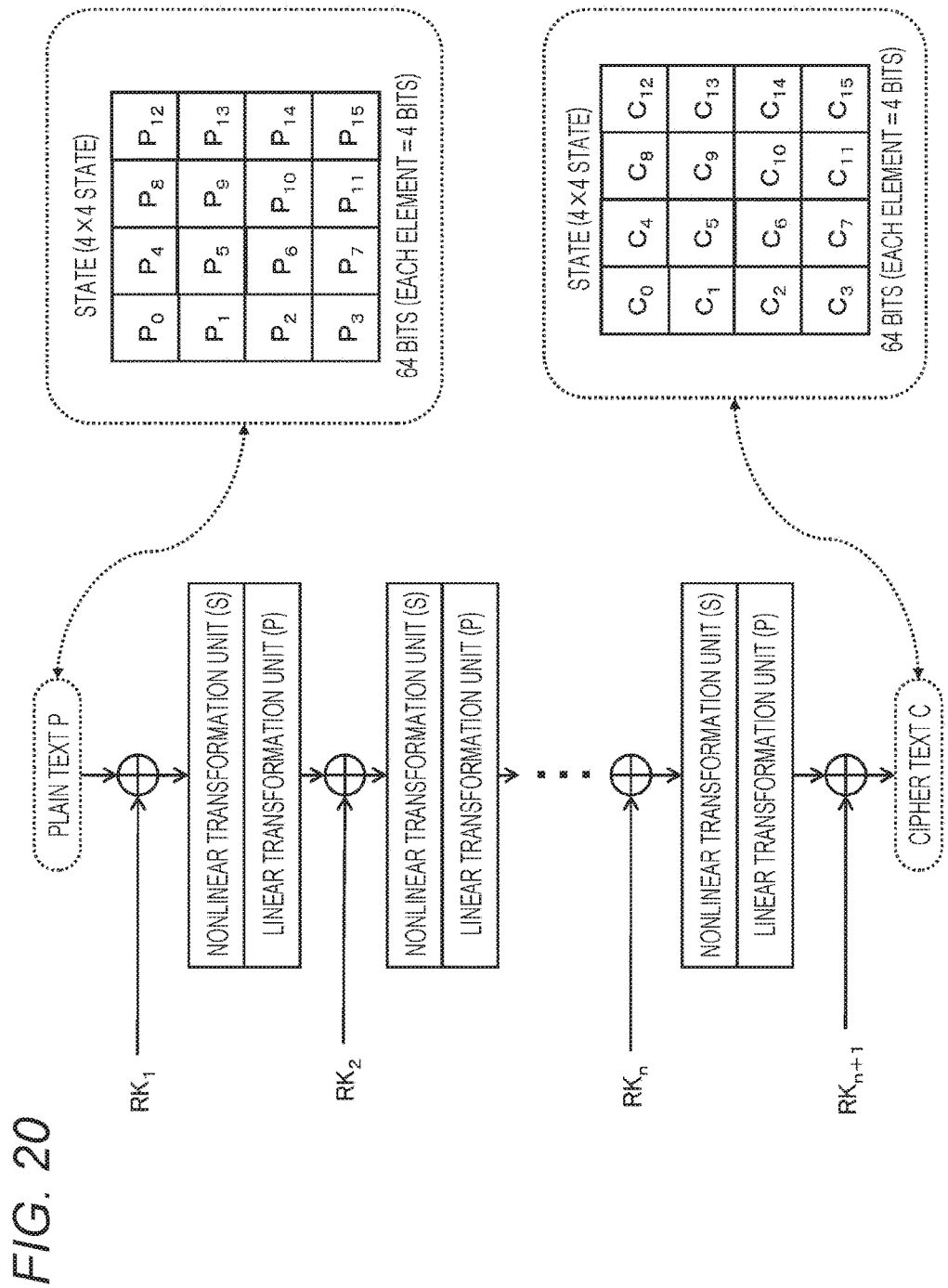
FIG. 20 is a diagram that illustrates an example of the configuration of a cipher processing apparatus according to one embodiment of the present disclosure.

In addition, the plain text P as input data and the cipher text C as output data, as illustrated in FIG. 20 are the state representing data described above.

Furthermore, the number of bits of each element, in other words, a word size n can be variously set.

For example, in a case where the word size: n=4, the number of bits of the whole state is 64 bits, and cipher processing (including a decryption process) applying a 64-bit state is performed.

In a case where the word size: n=8, the number of bits of the whole state is 128 bits, and cipher processing (including a decryption process) applying a 128-bit state is performed.

In a case where the word size: n=16, the number of bits of the whole state is 256 bits, and cipher processing (including a decryption process) applying a 256-bit state is performed.

In addition, a round key input from the key scheduling unit 110, similar to the plain text P as input data and the cipher text C as output data, is state representing data formed by 16 elements (words). The word size and the state size of the round key are the same as those of the plain text P and the cipher text C.

In the cipher processing unit 120, as illustrated in FIG. 21, the following three kinds of data transformation processes are repeatedly performed.
(a) Exclusive OR Operation Process
(b) Nonlinear Transformation Process
(c) Linear Transformation Process Each of such processes is performed as a process for the state. Such processes for the state are as described above with reference to FIGS. 13(1) and 13(2) and 14(3).

The nonlinear transformation process performed by the nonlinear transformation unit of the cipher processing unit 120, for example, as illustrated in FIG. 22(1), is performed using a plurality of S-boxes.

Each S box, for example, is a nonlinear transformation unit having an n-bit input/output configuration corresponding to the word size n of each element of the state and performs a nonlinear transformation process of n×16=16n bits through a parallel process performed by 16 S boxes.

In addition, the linear transformation unit of the cipher processing unit 120, for example, as illustrated in FIG. 22(2), is configured by a matrix operating unit and a substitution unit. A linear transformation process performed by the linear transformation unit of the cipher processing unit 120, as illustrated in FIG. 22(2), is performed by a substitution process performed by the substitution unit and a matrix operating process performed by the matrix operating unit.

In addition, in FIG. 22(2), while the substitution unit is set in a former stage, the matrix operating unit is set in a later stage, and the matrix operating unit is set to perform a matrix operation by receiving a substitution result acquired by the substitution unit as an input, the configuration order of the substitution unit and the matrix operating unit may be reversely set.

In other words, it may be configured such that the matrix operating unit is set in a former stage, the substitution unit is set in a later stage, and the substitution unit is set to perform a substitution process by receiving a matrix operating result acquired by the matrix operating unit as an input.

4. Configuration and Process of Linear Transformation Unit of Cipher Processing Unit As described with reference to FIG. 19, the cipher processing unit 120 of the cipher processing apparatus 100 according to the present disclosure is configured to repeatedly perform an exclusive OR operation with a round key, a nonlinear transformation, and a linear transformation process in a plurality of rounds.

One of the characteristics of the cipher processing apparatus according to the present disclosure is the configuration of the linear transformation process performed in each round.

The process of the linear transformation unit of the cipher processing unit 120, as illustrated in FIG. 22(2) as described above, is performed by the substitution process performed by the substitution unit and the matrix operating process performed by the matrix operating unit.

Before description of a specific configuration example of the linear transformation process and the process in the cipher processing apparatus according to the present disclosure, examples of the configuration of the linear transformation unit and an overview of the processes in existing cipher processing apparatuses will be described. Hereinafter, configuration examples of three linear transformation units will be described.

(Existing System 1) Linear transformation unit configured by a single MDS matrix
(Existing System 2) Linear transformation unit configured by a substitution unit and a plurality of MDS matrixes
(Existing System 3) Linear transformation unit configured by a substitution unit and a plurality of quasi-MDS (almost-MDS) matrixes Hereinafter, the configurations and the processes of such three existing linear transformation units will be described with reference to FIGS. 23 to 25.

(Existing System 1)

First, the configuration and the process of a linear transformation unit configured by a single MDS matrix will be described with reference to FIG. 23 (Existing System 1).

In FIG. 23, a linear transformation unit 202 and a nonlinear transformation unit 201 disposed in a former stage of the linear transformation unit 202 are illustrated.

The nonlinear transformation unit 201, as described above with reference to FIG. 22(1), is formed by a plurality of S-boxes.

Each S box, for example, is a nonlinear transformation unit having an n-bit input/output configuration corresponding to the word size n of each element of a state, and a nonlinear transformation process of n×16=16n bits is performed through a parallel process performed by 16 S boxes.

The linear transformation unit 202 illustrated in FIG. 23 is configured by a matrix operating unit 211 that is formed by a single maximum distance separable (MDS) matrix.

The MDS matrix, as described above, is a matrix used for a linear transformation of which the number of branches is large and is a matrix that performs optimal diffusion mapping (ODM) of the number of branches=b+1.

For example, mapping θ from data of n×a bits to data of n×b bits is represented as θ: $\{0, 1\}^{na} \to \{0, 1\}^{nb}$, and, for the mapping θ, the number of branches ($\text{Branch}_n(\theta)$) is defined as below.

$$\text{Branch}_n(\theta) = \min_{\alpha \neq 0}\{hw_n(\alpha) + hw_n(\theta(\alpha))\}$$

Here, $\min_{\alpha \neq 0}\{X\alpha\}$ represents a minimum value of all $X_\alpha$ satisfying $\alpha \neq 0$, and $hw_n(Y)$ is a function returning the number of (non-zero) elements of which data of all the n bits is not "0" when a bit stream Y is represented to be delimited for every n bits.

Generally, as the number of branches is increased, the deciphering difficulty increases, and the resistance against a difference attack or a linear attack is regarded to be improved.

In the configuration illustrated in FIG. 23, an input X is data of mn bits, and respective n bits (word) are input to the S-box of the nonlinear transformation unit 201, and an output thereof is input to the matrix operating unit 211 that is formed by the MDS matrix of the linear transformation unit 202.

The MDS matrix is an MDS matrix formed by m×m elements, and a matrix operation is performed as an operation on an extended body $GF(2^n)$.

The cipher processing unit including the linear transformation unit illustrated in FIG. 23 (Existing System 1), in other words, configured by a single MDS matrix has a characteristic that the security (minimum difference/linear active S-box number) is high.

However, there is a problem in that the operation cost of the linear transformation unit 202 is increased. For example, also in a case where the circuit configuration as hardware is large, and the process is performed as software, the number of operation steps is increased, and there is a problem in that the processing time is long.

(Existing System 2)

Next, the configuration and the process of a linear transformation unit configured by a substitution unit and a plurality of MDS matrixes will be described with reference to FIG. 24 (Existing System 2).

Figure 24:
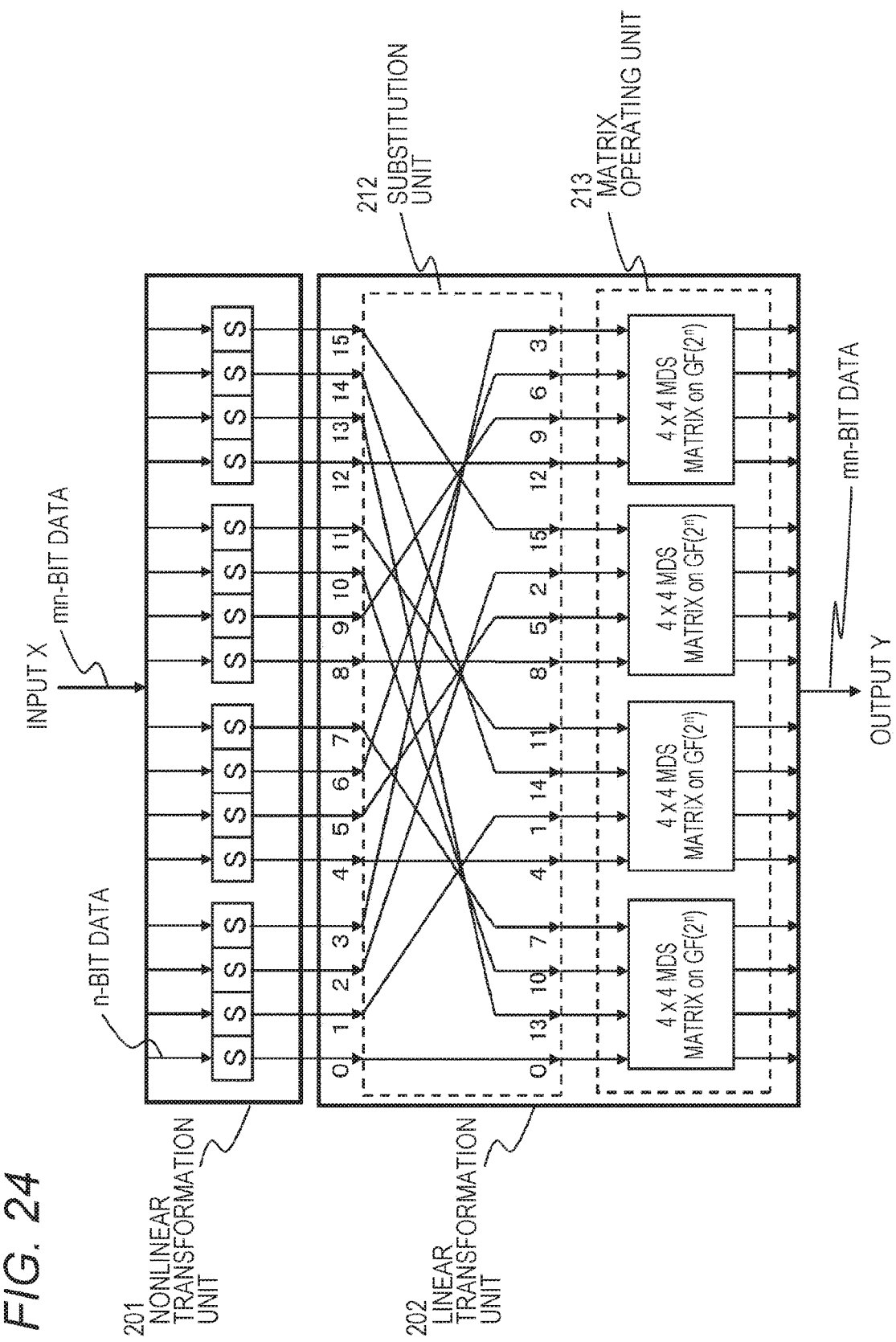
FIG. 24 is a diagram that illustrates the configuration and the process of Existing System 2 of the linear transformation unit.

Also in FIG. 24, similar to the case illustrated in FIG. 23, a linear transformation unit 202 and a nonlinear transformation unit 201 disposed in a former stage of the linear transformation unit 202 are illustrated.

The nonlinear transformation unit 201, similar to the case illustrated in FIG. 23, is formed by a plurality of S-boxes.

The linear transformation unit 202 includes a substitution unit 212 and a matrix operating unit 213 configured by a plurality of MDS matrixes.

Each MDS matrix configuring the matrix operating unit 213 is a matrix that is formed by a×a elements. Here, a<m.

A column operation is performed as an operation on an extended body $GF(2^n)$.

Note that numerical values 0, 1, 2, . . . , 13, 14, 15 represented at input positions of the substitution unit 212 and numerical values 0, 13, 10, . . . , 9, 6, 3 represented at output positions are identifiers of 16 elements (words) of a 4×4 state. A changed status of element positions of the state according to the substitution process performed by the substitution unit 212 is illustrated.

Figure 25:
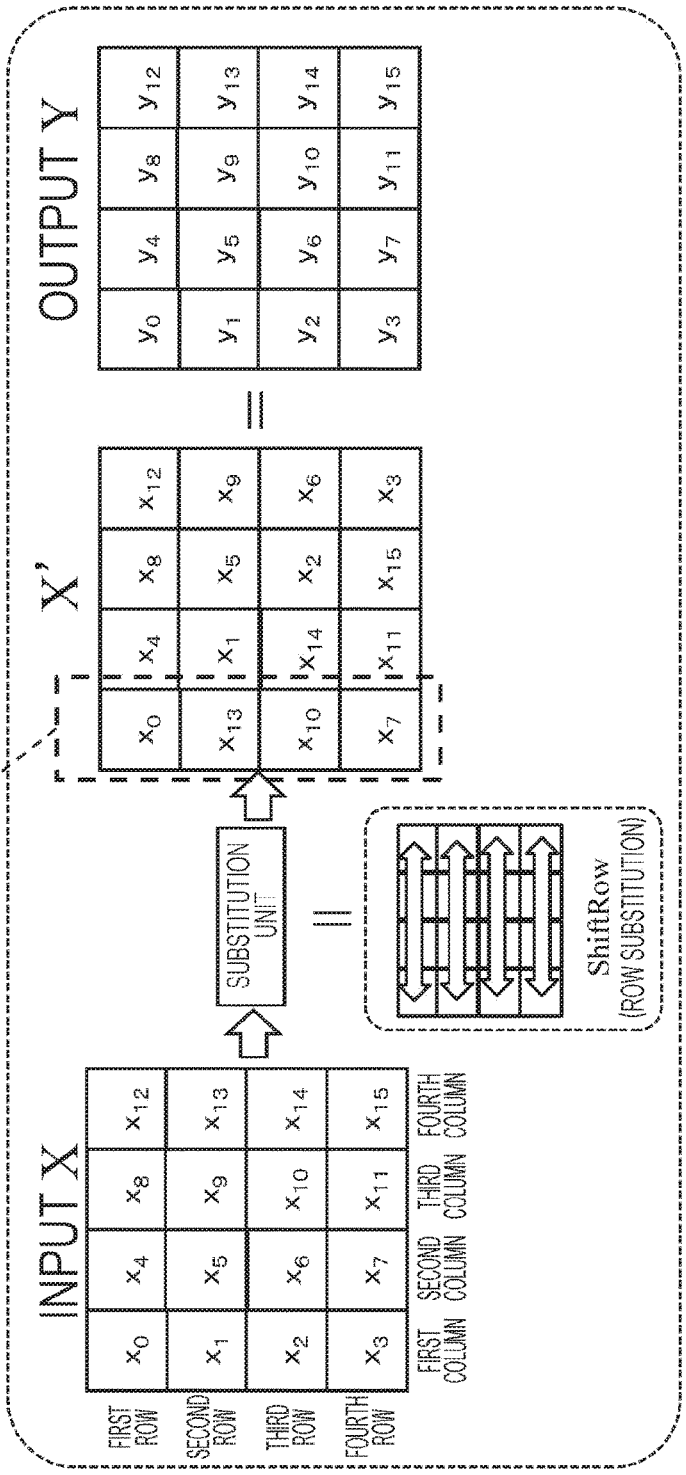
FIG. 25 is a diagram that illustrates a condition (Condition 1) satisfied by a substitution unit of Existing System 2 of the linear transformation unit.

The substitution unit 212, as illustrated in FIG. 25, is configured as a substitution unit that performs a substitution process satisfying the following (Condition 1).

(Condition 1)

According to the substitution process of the substitution unit for the input X, each column element of the output Y is configured by elements of four mutually-different columns of the input X.

FIG. 25 is a diagram that illustrates changes in the arrangement of elements (words) of an 4×4 output Y output by the substitution process performed by the substitution unit, which has an 4×4 state X as an input, satisfying (Condition 1) described above.

For example, the input X is transformed into the output Y through the substitution process. In X', each element of the output Y is represented using each element of the input X.

In other words, the arrangement of each element of the input X is changed as represented in X'. The elements $x_0$, $x_5$, $x_{10}$, and $x_{15}$ (=$y_0$, $y_1$, $y_2$, and $y_3$) of the first column of X' (=Y) after the substitution are configured by the following elements of the original input X.

$x_0$ (=$y_0$) is the element of the first row and the first column of the input X.

$x_{13}$ (=$y_1$) is the element of the second row and the fourth column of the input X.

$x_{10}$ (=$y_2$) is the element of the third row and the third column of the input X.

$x_7$ (=$y_3$) is the element of the fourth row and the second column of the input X.

In this way, the elements of the first column of the output Y are configured by elements of four mutually-different columns of the input X.

In addition, for the other columns 2 to 4 of the output Y, column elements of Y are configured by elements of four mutually-different columns of the input X.

In this way, the substitution unit 212 is configured as a substitution unit that performs a substitution process satisfying the following (Condition 1).

(Condition 1)

By the substitution process performed by the substitution unit for the input X, each column element of the output Y is configured by elements of four mutually-different columns of the input X.

In addition, a substitution unit satisfying (Condition 1) described above may have other various substitution configurations (variations) in addition to the substitution configuration described with reference to FIGS. 24 and 25.

(Existing System 2) is configured by the substitution unit 212 satisfying (Condition 1) described above, and the linear transformation unit 213 configured by a plurality of MDS matrixes.

Compared to (Existing System 1) described above, the mounting efficiency is improved. However, there is a problem in that the security is lower than that of (Existing System 1).

(Existing System 3)

Next, the configuration and the process of a linear transformation unit configured by a substitution unit and a plurality of quasi-MDS (almost-MDS) matrixes will be described with reference to FIG. 26 (Existing System 3).

Figure 26:
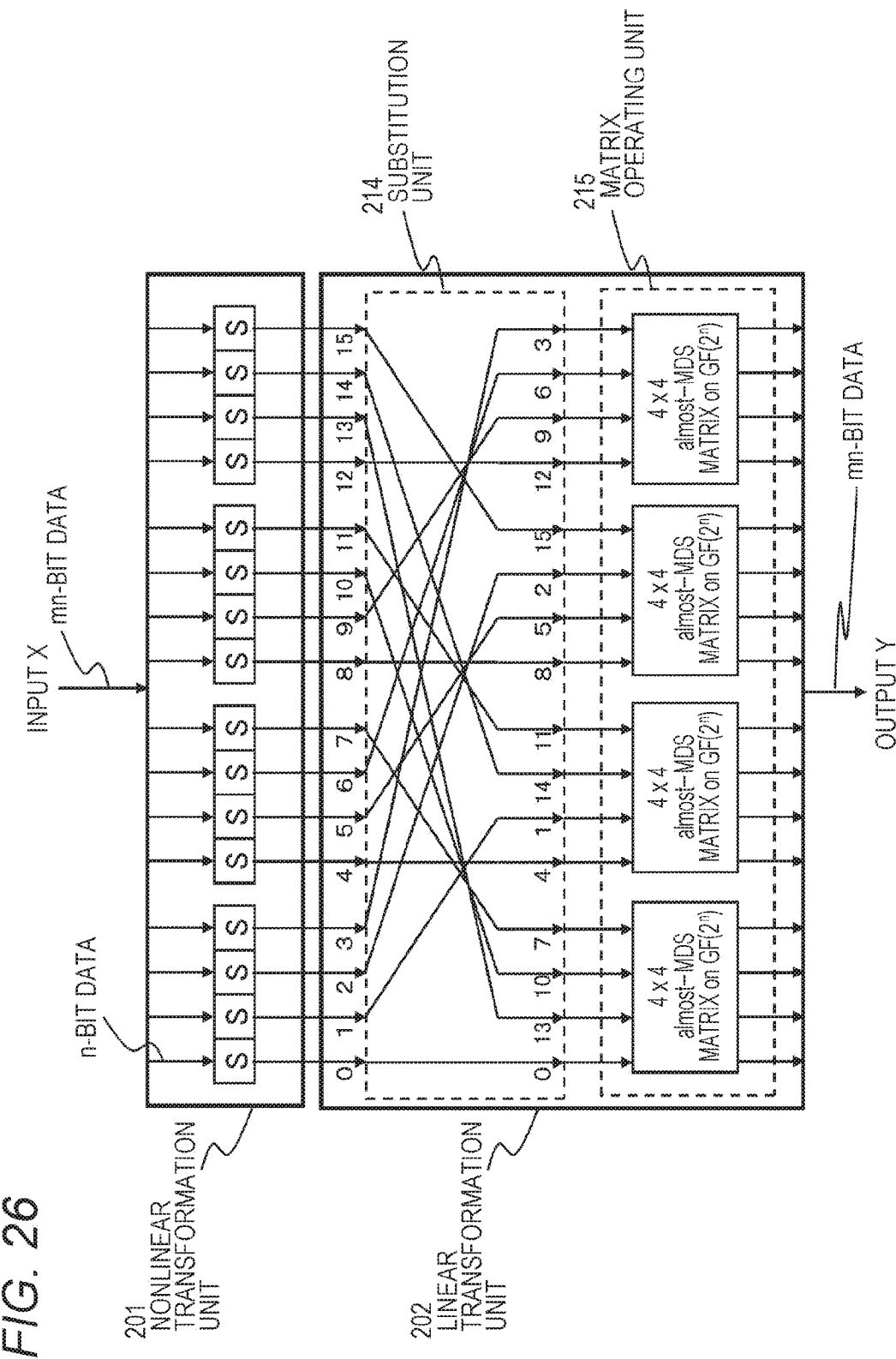
FIG. 26 is a diagram that illustrates the configuration and the process of Existing System 3 of the linear transformation unit.

Also in FIG. 26, similar to the cases illustrated in FIGS. 23 and 24, a linear transformation unit 202 and a nonlinear transformation unit 201 disposed in a former stage of the linear transformation unit 202 are illustrated.

The nonlinear transformation unit 201, similar to the cases illustrated in FIGS. 23 and 24, is formed by a plurality of S-boxes.

The linear transformation unit 202 includes a substitution unit 214 and a matrix operating unit 215 configured by a plurality of quasi-MDS (almost-MDS) matrixes.

The substitution unit 214, similar to the substitution unit 212 of (Existing System 2) described above, is configured as a substitution unit that performs a substitution process satisfying the following (Condition 1).

(Condition 1)

According to the substitution process of the substitution unit for the input X, each column element of the output Y is configured by elements of four mutually-different columns of the input X.

The quasi-MDS (almost-MDS) matrix configuring the matrix operating unit 215 is a matrix that is configured by a×a elements. Here, a<m.

A column operation is performed as an operation on an extended body GF($2^n$).

The quasi-MDS (almost-MDS) matrix, as described above, is a matrix that performs suboptimal diffusion mapping (SODM) of the number of branches=b.

Generally, as the number of branches is increased, the deciphering difficulty increases, and the resistance against a difference attack or a linear attack is regarded to be improved.

In a case where an MDS matrix and a quasi-MDS matrix having a same size are compared with each other, the diffusion performance of the MDS matrix is higher than that of the quasi-MDS matrix. However, generally, the required calculation amount of the quasi-MDS matrix is smaller than that of the MDS matrix.

The linear transformation unit represented in this (Existing System 3), compared to (Existing System 1) and (Existing System 2) described above, the mounting efficiency is improved. In other words, the hardware configuration can be simplified, and the processing speed in the case of hardware mounting or software mounting is improved.

However, there is a problem in that the security is lower than that of (Existing System 1) and (Existing System 2).

As described above, as existing configurations of the linear transformation units, there are the following configurations.

(Existing System 1) Linear transformation unit configured by a single MDS matrix (FIG. 23)

(Existing System 2) Linear transformation unit configured by a substitution unit and a plurality of MDS matrixes (FIG. 24)

(Existing System 3) Linear transformation unit configured by a substitution unit and a plurality of quasi-MDS (almost-MDS) matrixes (FIG. 26)

In such three existing linear transformation units, while (Existing System 1) has highest security, the operation cost of the single MDS matrix of (Existing System 1) is high. In other words, there is a problem in that the hardware circuit is complex, and the processing speed is decreased.

While (Existing System 2) and (Existing System 3) have an advantage that the operation cost is suppressed more than (Existing System 1), there is a problem in that there is concern regarding the security.

FIG. 27 is a diagram that illustrates a list representing the number of minimum difference/linear active S-boxes as a security index for (Existing System 2) and (Existing System 3).

As described above, as the number of minimum difference/linear active S-boxes increases, the security is regarded to be higher.

Figure 28:
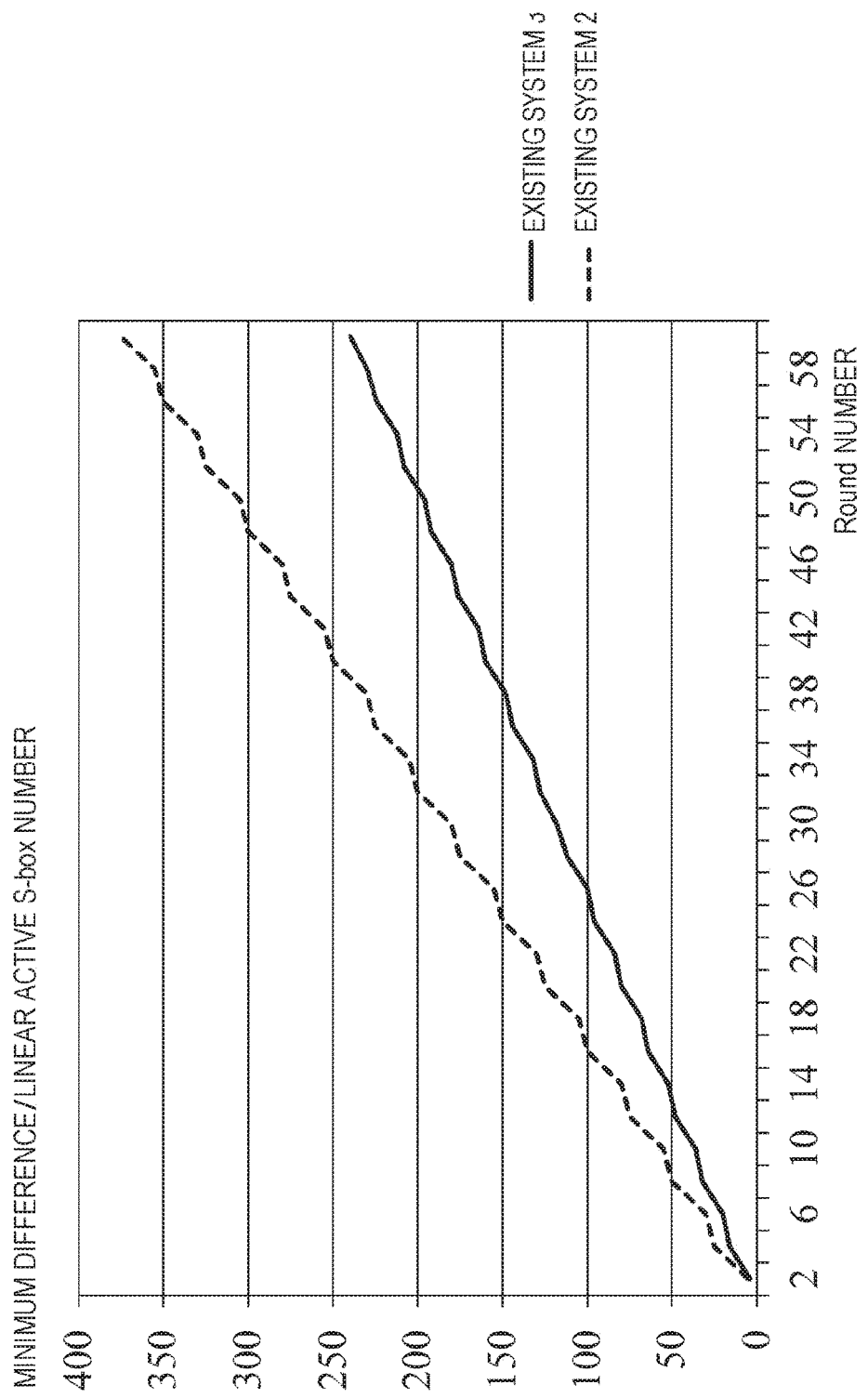
FIG. 28 is a diagram that illustrates comparison data of the numbers of active S boxes of a case where the linear transformation unit is configured using Existing System 2 and Existing System 3.

FIG. 28 illustrates graphs representing correspondence relations between the number of minimum difference/linear active S-boxes and the round number for (Existing System 2) and (Existing System 3).

As can be understood from FIG. 28, (Existing System 3) configured by the substitution unit and the plurality of quasi-MDS (almost-MDS) matrixes has the number of minimum difference/linear active S-boxes smaller than (Existing System 2) configured by the substitution unit and the plurality of MDS matrixes. In other words, there is a result representing that the security is degraded.

However, in the aspects of the mounting efficiency and the processing speed, (Existing System 3) configured by the substitution unit and the plurality of quasi-MDS (almost-MDS) matrixes is superior to any one of (Existing System 1) and (Existing System 2).

Hereinafter, a linear transformation unit according to an embodiment of the present disclosure of which the security is improved with the superiority of the mounting efficiency and the processing speed maintained by improving this (Existing System 3) will be described.

5. Configuration and Process (Embodiment 1) of Linear Transformation Unit of Cipher Processing Apparatus According to Present Disclosure Hereinafter, the configuration and the process of the linear transformation unit of the cipher processing apparatus according to the present disclosure will be described as Embodiment 1.

In addition, the cipher processing apparatus 100 according to the present disclosure, as illustrated in FIG. 19 described above, includes a key scheduling unit 110 and a cipher processing unit 120, and the cipher processing unit 120 has the following configuration.

Configurations of an exclusive OR unit 121 that executes an exclusive OR operation of input data and a round key, a nonlinear transformation unit 122 that performs a nonlinear transformation process for input data, and a linear transformation unit 123 that performs a linear transformation process for input data are included.

In the cipher processing unit 120, as illustrated in FIG. 21, the following three kinds of data transformation processes are repeatedly performed.
(a) Exclusive OR Operation Process
(b) Nonlinear Transformation Process
(c) Linear Transformation Process Each of such processes is performed as a process for the state. Such processes for the state are as described above with reference to FIGS. 13(1) and 13(2) and 14(3).

The nonlinear transformation process performed by the nonlinear transformation unit of the cipher processing unit 120, for example, as illustrated in FIG. 22(1), is performed using a plurality of S-boxes.

Each S box, for example, is a nonlinear transformation unit having an n-bit input/output configuration corresponding to the word size n of each element of the state and performs a nonlinear transformation process of n×16=16n bits through a parallel process performed by 16 S boxes.

In addition, the linear transformation unit of the cipher processing unit 120, for example, as illustrated in FIG. 22(2), is configured by a matrix operating unit and a substitution unit. A linear transformation process performed by the linear transformation unit of the cipher processing unit 120, as illustrated in FIG. 22(2), is performed by a substitution process performed by the substitution unit and a matrix operating process performed by the matrix operating unit.

In addition, as described above, in FIG. 22(2), while the substitution unit is set in a former stage, the matrix operating unit is set in a later stage, and the matrix operating unit is set to perform a matrix operation by receiving a substitution result acquired by the substitution unit as an input, the configuration order of the substitution unit and the matrix operating unit may be reversely set.

In other words, it may be configured such that the matrix operating unit is set in a former stage, the substitution unit is set in a later stage, and the substitution unit is set to perform a substitution process by receiving a matrix operating result acquired by the matrix operating unit as an input.

Hereinafter, a specific configuration example and the process of the linear transformation processing unit of the cipher processing apparatus according to the present disclosure will be described.

Figure 29:
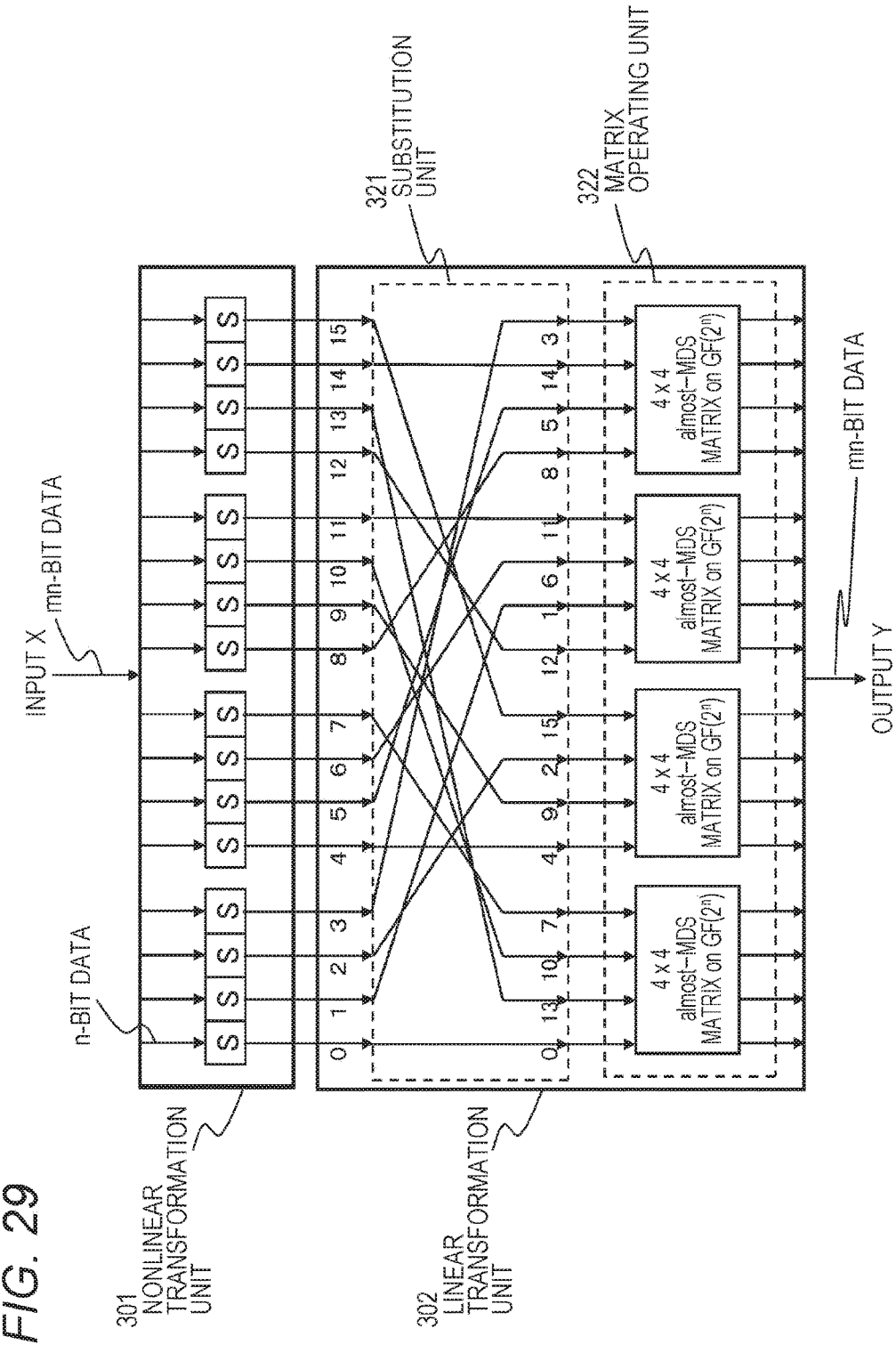
FIG. 29 is a diagram that illustrates the configuration and the process of the linear transformation unit of the cipher processing apparatus of the present disclosure according to Embodiment 1.

In FIG. 29, a linear transformation unit 302 having the configuration of this Embodiment 1 and a nonlinear transformation unit 301 disposed in a former stage of the linear transformation unit 302 are illustrated.

The nonlinear transformation unit 301, as described above with reference to FIG. 22(1), is formed by a plurality of S-boxes.

Each S box, for example, is a nonlinear transformation unit having an n-bit input/output configuration corresponding to the word size n of each element of a state, and a nonlinear transformation process of n×16=16n bits is performed through a parallel process performed by 16 S boxes.

The linear transformation unit 302 includes a substitution unit 321 and a matrix operating unit 322 configured by a plurality of quasi-MDS (almost-MDS) matrixes.

In addition, numerical values 0, 1, 2, . . . , 13, 14, 15 represented at input positions of the substitution unit 321 and numerical values 0, 13, 10, . . . , 5, 14, 3 represented at output positions are identifiers of 16 elements (words) of a 4×4 state. A changed status of element positions of the state according to the substitution process performed by the substitution unit 321 is illustrated.

The matrix operating unit 322, similarly to (Existing System 3) described above with reference to FIG. 26, is configured by a plurality of quasi-MDS (almost-MDS) matrixes.

Each quasi-MDS (almost-MDS) matrix is a matrix that is formed by a×a elements. Here, a<m.

A column operation is performed as an operation on an extended body $GF(2^n)$.

The quasi-MDS (almost-MDS) matrix, as described above, is a matrix that performs suboptimal diffusion mapping (SODM) of the number of branches=b.

Generally, as the number of branches is increased, the deciphering difficulty increases, and the resistance against a difference attack or a linear attack is regarded to be improved.

In a case where an MDS matrix and a quasi-MDS matrix having a same size are compared with each other, the diffusion performance of the MDS matrix is higher than that of the quasi-MDS matrix. However, generally, the required calculation amount of the quasi-MDS matrix is smaller than that of the MDS matrix.

The quasi-MDS (almost-MDS) matrix used in the matrix operating unit 322 configuring the linear transformation unit 302 according to this Embodiment 1 will be described with reference to FIGS. 30(1) and 30(2).

The quasi-MDS (almost-MDS) matrix used in the matrix operating unit 322, as illustrated in FIG. 30(1), is a quasi-MDS matrix Mb having an element configuration illustrated in the following (Equation 5).

[Mathematical Expression 5]

$$M_b = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \quad \text{(Equation 5)}$$

The 4×4 matrix illustrated in (Equation 5) described above is a quasi-MDS (almost-MDS) matrix.

FIG. 30(2) is a diagram that illustrates the form of a specific matrix operation using the 4×4 quasi-MDS matrix illustrated in FIG. 30(1).

A 4×4 square illustrated in FIG. 30(2) illustrates a state configured by 16 elements each configured by n bits that are targets for the linear transformation process. In other words, the square is a 4×4 state of 16n bits.

For input data of this 4×4 state, a matrix operation using the quasi-MDS matrix $M_b$ illustrated in FIG. 30(1) is performed.

More specifically, as illustrated in FIG. 30(2), for elements of each column of the input data of the 4×4 state, a matrix operation applying one matrix $M_b$ is performed in units of one column.

This is a column diffusion operation (MixColum) described above with reference to FIGS. 15 and 16.

In other words, the matrix operation is a column diffusion operation (MC) represented by an equation $MC[M_b]$.

In addition, $MC[M_b]$ is an equation representing a matrix operation applying the same matrix $M_b$ for each column of the state and has the same meaning as an equation $MC[M_b, M_b, M_b, M_b]$ that individually represents a matrix to be applied for each column of the state.

FIGS. 31(1) and 31(2) are diagrams that illustrate a specific calculation process example of a matrix operation performed by the matrix operating unit 322 configuring the linear transformation unit 302 according to this Embodiment 1, in other words, the column diffusion operation (MixColumn) applying the 4×4 quasi-MDS (almost-MDS) matrix represented in (Equation 5) described above.

In FIG. 31(1), an example of input/output data for the matrix operating unit 322 is illustrated.

An input A is a state formed by 16 elements $a_0$ to $a_{15}$ of n-bit data.

An output B is a state formed by 16 elements $b_0$ to $b_{15}$ of n-bit data as well.

In addition, each element $a_i$ or $b_i$ (here, i=0 to 15) of the input/output data is n-bit data configured by one of values "0" and "1".

For example, in the case of n=4, each element is 4-bit data, and each of the input A and the output B has 64 bits.

In FIG. 31(2), a specific calculation process example of the column diffusion operation (MixColumn) performed as a matrix operation performed by the matrix operating unit 322.

A column diffusion operation (MixColumn) applying the 4×4 quasi-MDS (almost-MDS) matrix represented in (Equation 5) described above in the matrix operating unit 322 is a matrix operation according to the following equation (Equation 6).

[Mathematical Expression 6]

$$\begin{pmatrix} b_0 \\ b_1 \\ b_2 \\ b_3 \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_0 \\ a_1 \\ a_2 \\ a_3 \end{pmatrix},$$

$$\begin{pmatrix} b_4 \\ b_5 \\ b_6 \\ b_7 \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_4 \\ a_5 \\ a_6 \\ a_7 \end{pmatrix},$$

$$\begin{pmatrix} b_8 \\ b_9 \\ b_{10} \\ b_{11} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_8 \\ a_9 \\ a_{10} \\ a_{11} \end{pmatrix},$$

$$\begin{pmatrix} b_{12} \\ b_{13} \\ b_{14} \\ b_{15} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_{12} \\ a_{13} \\ a_{14} \\ a_{15} \end{pmatrix}$$

(Equation 6)

The 16 elements $b_0$ to $b_{15}$ of the output B are calculated by the following operations on the basis of the matrix $M_0$ and the 16 elements $a_0$ to $a_{15}$ of the input A.

$b_0 = a_1(+)a_2(+)a_3$ $b_1 = a_0(+)a_2(+)a_3$ $b_2 = a_0(+)a_1(+)a_3$ $b_3 = a_0(+)a_1(+)a_2$ $b_4 = a_5(+)a_6(+)a_7$ $b_5 = a_4(+)a_6(+)a_7$ $b_6 = a_4(+)a_5(+)a_7$ $b_7 = a_4(+)a_5(+)a_6$ $b_8 = a_9(+)a_{10}(+)a_{11}$ $b_9 = a_8(+)a_{10}(+)a_{11}$ $b_{10} = a_8(+)a_9(+)a_{11}$ $b_{11} = a_8(+)a_9(+)a_{10}$ $b_{12} = a_{13}(+)a_{14}(+)a_{15}$ $b_{13} = a_{12}(+)a_{14}(+)a_{15}$ $b_{14} = a_{12}(+)a_{13}(+)a_{15}$ $b_{15} = a_{12}(+)a_{13}(+)a_{14}$

In addition, in the equations described above, the operator (+) represents an exclusive OR operation.

In the matrix operation performed by the matrix operating unit 322, the 16 elements $b_0$ to $b_{15}$ of the output B are calculated according to the operation process described above on the basis of the matrix $M_b$ and the 16 elements $a_0$ to $a_{15}$ of the input A.

Next, the configuration and the process of the substitution unit 321 of the linear transformation unit 302 illustrated in FIG. 29 will be described.

The substitution unit 321, similar to the substitution units of (Existing System 2) and (Existing System 3) described above, is configured as a substitution unit performing a substitution process satisfying the following (Condition 1).

(Condition 1)

According to the substitution process of the substitution unit for the input X, each column element of the output Y is configured by elements of four mutually-different columns of the input X.

In addition, the substitution unit 321 according to this Embodiment 1 is configured as a substitution unit that performs a substitution process satisfying the following (Condition A) in addition to (Condition 1) described above.

(Condition A)

In a case where the substitution process performed by the substitution unit for the input X is repeatedly performed continuously twice, the column elements of the output Y are configured by elements of three or more mutually-different columns of the input X.

This condition A will be described with reference to FIG. 32.

Figure 32:
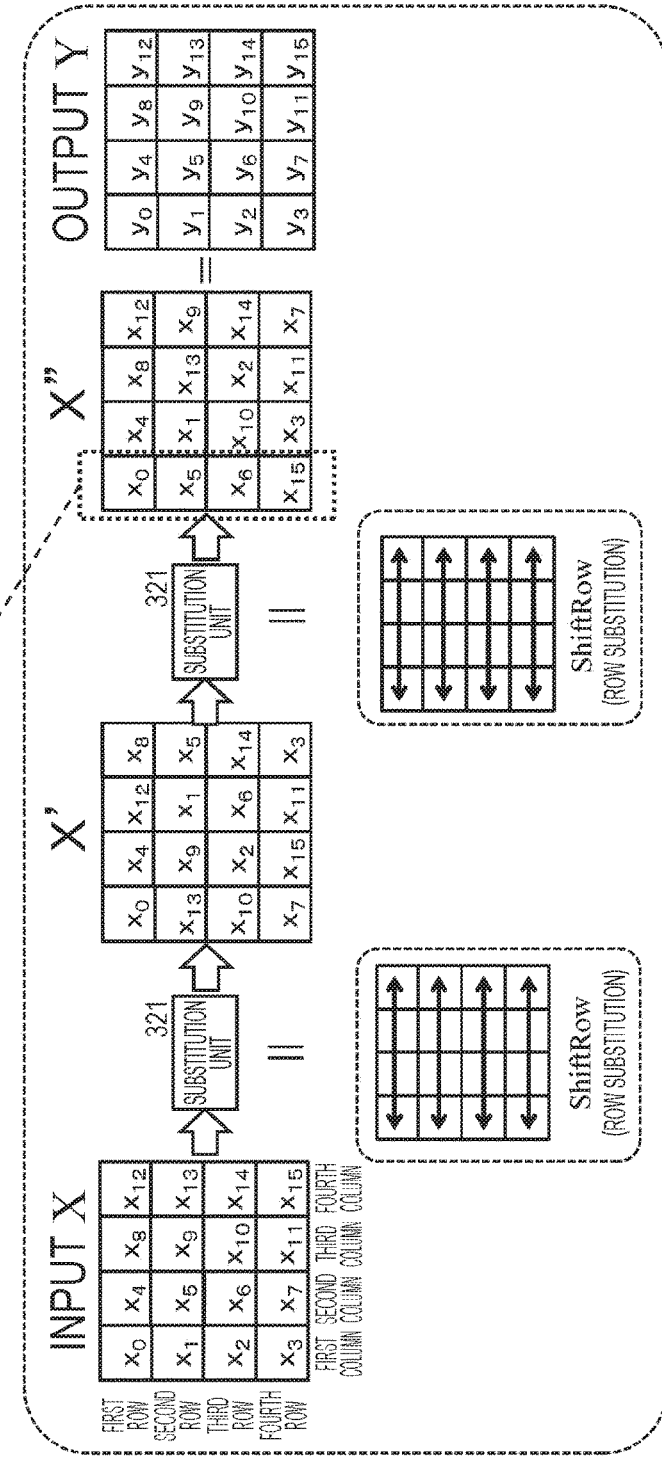
FIG. 32 is a diagram that illustrates a condition (Condition A) satisfied by a substitution unit of the linear transformation unit of the cipher processing apparatus of the present disclosure according to Embodiment 1.

FIG. 32 illustrates an example of a substitution process performed repeatedly twice by the substitution unit 321 for the input X having a 4×4 state.

The input X is a state configured by 16 words of $X_0$ to $X_{15}$.

The substitution unit 321 performs the substitution process in units of one word.

A result of the substitution process performed once by the substitution unit 321 is a state X' illustrated in FIG. 32.

In addition, a result of the substitution process performed continuously twice by the substitution unit 321 for the state X' is a state X".

This state X" corresponds to the output Y represented in (Condition A) described above.

(Condition A) is a condition that elements of columns of the output Y (=X") that is a result of the substitution process performed continuously twice by the substitution unit 321 are configured by elements of three or more mutually-different columns of the input X.

In the example illustrated in FIG. 32, elements $x_0$, $x_5$, $x_6$, and $x_{15}$ (=$y_0$, $y_1$, $y_2$, and $y_3$) of the first column of the output Y (=X") after the substitution performed repeatedly twice are configured by the following elements of the original input X.

$x_0$(=$y_0$) is the element of the first row and the first column of the input X.

$x_5$(=$y_1$) is the element of the second row and the second column of the input X.

$x_6$(=$y_2$) is the element of the third row and the second column of the input X.

$x_{15}$(=$y_3$) is the element of the fourth row and the fourth column of the input X.

In this way, the elements of the first column of the output Y are configured by elements of three mutually-different columns of the input X.

Also for the other columns 2 to 4 of the output Y, the column elements of Y are configured by elements of three or more mutually-different columns of the input X.

In this way, the substitution unit 321 is configured as a substitution unit that performs the substitution process satisfying the following (Condition A).

(Condition A)

In a case where the substitution process performed by the substitution unit for the input X is repeatedly performed continuously twice, each column element of the output Y is configured by elements of three or more mutually-different columns of the input X.

In addition, the substitution unit 321 of the linear transformation unit 302 according to this Embodiment 1, as described above in (Existing System 2) and (Existing System 3), is configured as a substitution unit that also satisfies (Condition 1) in addition to (Condition A) described above.

In other words, the substitution unit is a substitution unit that satisfies the following (Condition 1).

(Condition 1)

According to the substitution process of the substitution unit for the input X, each column element of the output Y is configured by elements of four mutually-different columns of the input X.

A correspondence relation between elements of the input X illustrated in FIG. 32 and the state X' that is a result of the substitution performed once by the substitution unit 321 satisfies (Condition 1) described with reference to FIG. 25.

In addition, there are many state substitutions as substitution forms satisfying (Condition 1) and (Condition A) other than the settings described with reference to FIGS. 29 and 32.

In this way, the linear transformation unit 302 according to this Embodiment 1 illustrated in FIG. 29 is configured by the substitution unit 321 and the matrix operating unit 322 having the following configurations.

The substitution unit 321 satisfies the following two conditions (Condition 1) and (Condition A).

(Condition 1)

According to the substitution process of the substitution unit for the input X, each column element of the output Y is configured by elements of four mutually-different columns of the input X.

(Condition A)

In a case where the substitution process performed by the substitution unit for the input X is repeatedly performed continuously twice, each column element of the output Y is configured by elements of three or more mutually-different columns of the input X.

The matrix operating unit 322 is configured by a plurality of quasi-MDS (almost-MDS) matrixes. More specifically, the matrix operating unit 322 is configured by a quasi-MDS (almost-MDS) matrix of 4×4 elements represented in (Equation 5) described above.

Figure 33:
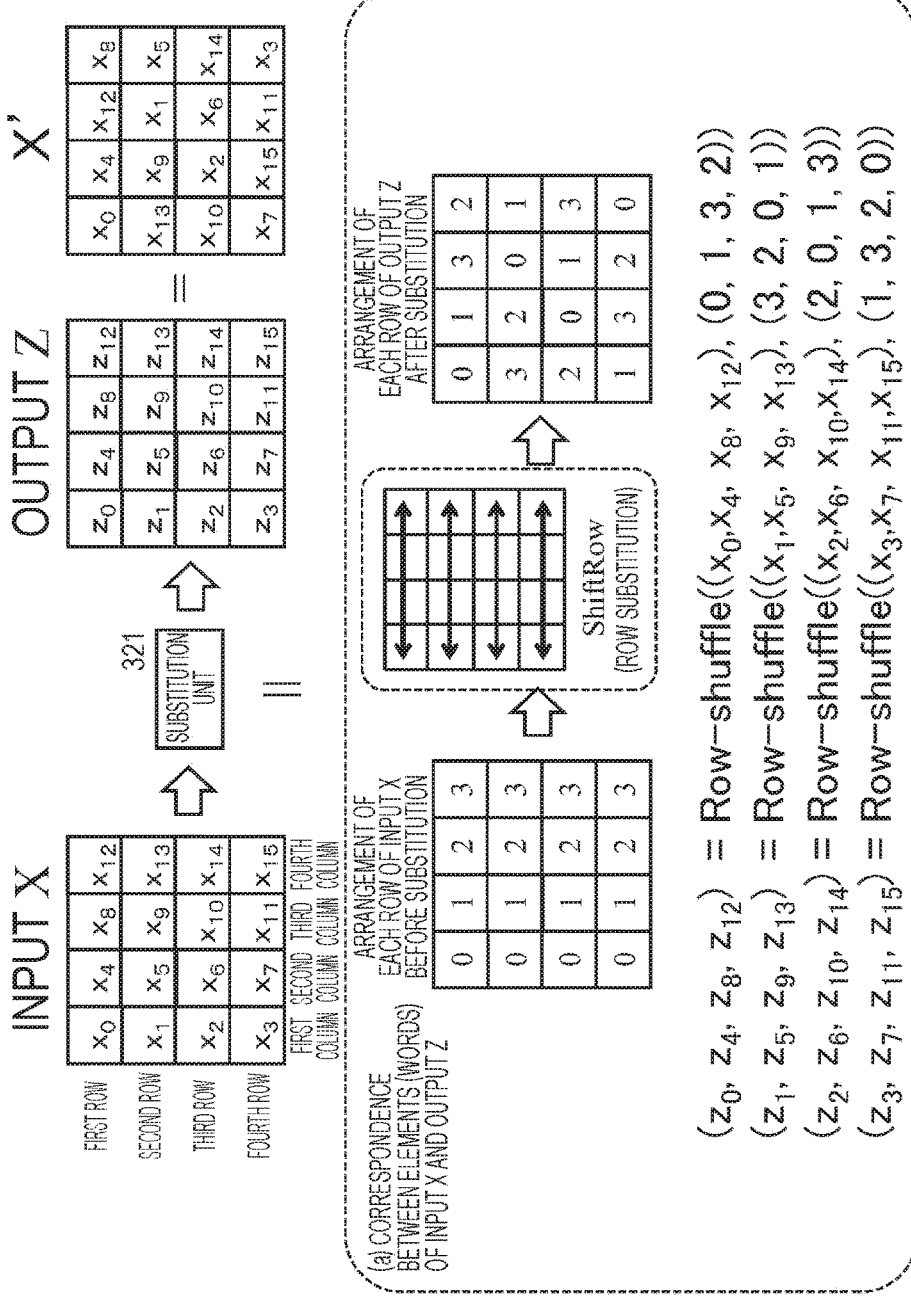
FIG. 33 is a diagram that illustrates the configuration and the process of the substitution unit of the linear transformation unit of the cipher processing apparatus of the present disclosure according to Embodiment 1.

A specific process example of the substitution process of the substitution unit 321 of the linear transformation unit 302 according to this Embodiment 1 is illustrated in FIG. 33.

FIG. 33 illustrates an input X and an output Z for the substitution unit 321. Both the input X and the output Z have the configuration of a 4×4 state.

X' is a state that represents the arrangement of the elements (words) of the output Z using the elements ($X_0$ to $X_{15}$) of the input X.

According to the substitution process of the substitution unit 321, the elements ($X_0$ to $X_{15}$) of the input X are changed to those of the state X'.

According to the substitution process of the substitution unit 321, in at least a part of the elements of the input state X, only the column positions are changed without any change in the row positions More specifically, as illustrated in FIG. 33(A) the correspondence between elements (words) of the input X and the output Z, the column positions of the elements of each row of the input X are changed as follows.

The elements of column positions (0, 1, 2, 3) of the first row of the input X are changed to column positions (0, 1, 3, 2) of the first row of the output Z after the substitution.

The elements of column positions (0, 1, 2, 3) of the second row of the input X are changed to column positions (3, 2, 0, 1) of the first row of the output Z after the substitution.

The elements of column positions (0, 1, 2, 3) of the third row of the input X are changed to column positions (2, 0, 1, 3) of the first row of the output Z after the substitution.

The elements of column positions (0, 1, 2, 3) of the fourth row of the input X are changed to column positions (1, 3, 2, 0) of the first row of the output Z after the substitution.

In this way, the substitution process of the substitution unit 321 is performed as a column position changing process in units of one row. When this substitution process is represented using an equation, it can be represented using the following (Equation 7).

[Mathematical Expression 7]

$$(z_0, z_4, z_8, z_{12}) = \text{Row-shuffle}((x_0, x_4, x_8, x_{12}), (0,1,3,2))$$

$$(z_1, z_5, z_9, z_{13}) = \text{Row-shuffle}((x_1, x_5, x_9, x_{13}), (3,2,0,1))$$

$$(z_2, z_6, z_{10}, z_{14}) = \text{Row-shuffle}((x_2, x_6, x_{10}, x_{14}), (2,0,1,3))$$

$$(z_3, z_7, z_{11}, z_{15}) = \text{Row-shuffle}((x_3, x_7, x_{11}, x_{15}), (1,3,2,0)) \quad \text{(Equation 7)}$$

In (Equation 7) described above, Row-shuffle represents an element shuffling process function in units of one row.

Row-shuffle(xp, xq, xr, xs) (0, 1, 3, 2), for elements (xp, xq, xr, xs) of one row of an input state, represents a process in which the element xp of the 0-th column of the input state is set as an element of the 0-th column of the output state, the element xq of the first column of the input state is set as an element of the first column of the output state, the element xr of the second column of the input state is set as an element of the third column of the output state, and the element xs of the third column of the input state is set as an element of the second column of the output state.

Figure 34:
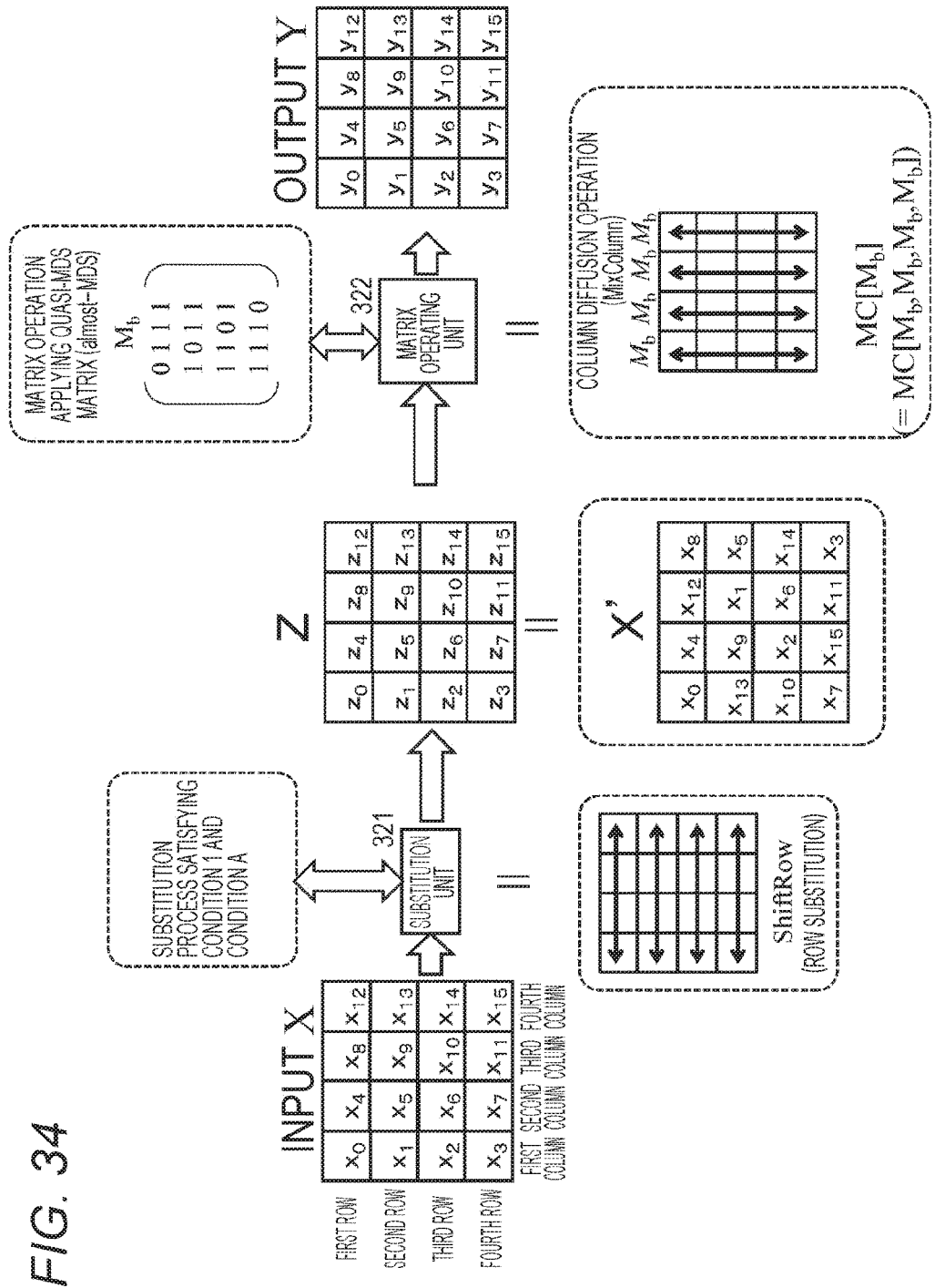
FIG. 34 is a diagram that illustrates the configuration and the process of the linear transformation unit of the cipher processing apparatus of the present disclosure according to Embodiment 1.

FIG. 34 is a diagram that illustrates an example of the processes of the substitution unit 321 and the matrix operating unit 322 of the linear transformation unit 302 according to this Embodiment 1 for the state.

An input X formed by 16 4×4 elements (words) corresponds to the output of the nonlinear transformation unit 301 illustrated in FIG. 29.

This input X, first, is input to the substitution unit 321, and the column positions are changed in units of elements of one row.

The substitution unit 321 satisfies the following two conditions (Condition 1) and (Condition A).
(Condition 1)

According to the substitution process of the substitution unit for the input X, each column element of the output Y is configured by elements of four mutually-different columns of the input X.
(Condition A)

In a case where the substitution process performed by the substitution unit for the input X is repeatedly performed continuously twice, each column element of the output Y is configured by elements of three or more mutually-different columns of the input X.

A state after the substitution process performed by the substitution unit 321 satisfying the conditions 1 and A is a state Z (=state X') illustrated in FIG. 34.

According to the substitution process of the substitution unit 321, the element positions of the 16 elements ($x_0$ to $x_{15}$) of the input X are changed. For example, in the setting of the substitution unit 321 illustrated in FIG. 29, a correspondence relation between the elements $z_0$ to $z_{15}$ of the state Z after the substitution and the elements $x_0$ to $x_{15}$ of the state X before the substitution is as follows.

$z_0 = x_0$ $z_1 = x_{13}$ $z_2 = x_{10}$ $z_3 = x_7$ $z_4 = x_4$ $z_5 = x_9$ $z_6 = x_2$ $z_7 = x_{15}$ $z_8 = x_{12}$ $z_9 = x_1$ $z_{10} = x_6$ $z_{11} = x_{11}$ $z_{12} = x_8$ $z_{13} = x_5$ $z_{14} = x_{14}$ $z_{15} = x_3$

In this way, the substitution process is performed.

In addition, the substitution form described above is an example. The substitution unit 321 may have a configuration satisfying (Condition 1) and (Condition A) described above, and there are many substitution forms satisfying such conditions other than the settings illustrated in FIGS. 33 and 34.

The state Z (=X') that is the output of the substitution unit 321 is input to the matrix operating unit 322 next, and a linear transformation process using matrixes is performed.

The matrix operating unit 322 is configured by a plurality of quasi-MDS (almost-MDS) matrixes. More specifically, the matrix operating unit 322 is configured by a quasi-MDS (almost-MDS) matrix of 4×4 elements illustrated in (Equation 5) described above.

First, as described with reference to FIGS. 30(1) and 30(2) and 31(1) and 31(2), for a state formed by 16 elements each formed by n bits that is a target for the linear transformation process, a matrix operation using the quasi-MDS matrix $M_b$ represented in (Equation 5) is performed.

As described with reference to FIGS. 30(1) and 30(2) and 31(1) and 31(2), for elements of each column of input data of a 4×4 state, in units of one column, by using a matrix operation applying one matrix $M_b$, a column diffusion operation (MixColum) is performed.

A result of this matrix operation is an output Y illustrated in FIG. 34.

A correspondence relation between elements $y_0$ to $y_{15}$ of a state Y before the matrix operation and elements $z_0$ to $z_{15}$ of a state Z before the matrix operation is as follows.

$y_0 = z_1 (+) z_2 (+) z_3$ $y_1 = z_0 (+) z_2 (+) z_3$ $y_2 = z_0 (+) z_1 (+) z_3$ $y_3 = z_0 (+) z_1 (+) z_2$ $y_4 = z_5 (+) z_6 (+) z_7$ $y_5 = z_4 (+) z_6 (+) z_7$ $y_6 = z_4 (+) z_5 (+) z_7$ $y_7 = z_4 (+) z_5 (+) z_6$ $y_8 = z_9 (+) z_{10} (+) z_{11}$ $y_9 = z_8 (+) z_{10} (+) z_{11}$ $y_{10} = z_8 (+) z_9 (+) z_{11}$ $y_{11} = z_8 (+) z_9 (+) z_{10}$ $y_{12} = z_{13} (+) z_{14} (+) z_{15}$ $y_{13} = z_{12} (+) z_{14} (+) z_{15}$ $y_{14} = z_{12} (+) z_{13} (+) z_{15}$ $y_{15} = z_{12} (+) z_{13} (+) z_{14}$

Note that, in the equations described above, the operator (+) represents an exclusive OR operation.

In this way, the linear transformation unit according to this Embodiment 1 performs processes (a) and (b) represented below.
(a) Substitution Process Performed by Substitution Unit Satisfying (Condition 1) and (Condition A) Described Above
(b) Matrix Operating Process Using Quasi-MDS Matrix $M_b$ having Configuration of (Equation 5) Described Above In addition, the sequence of the substitution process performed by the substitution unit and the sequence of the matrix operating process performed by the matrix operating unit may be interchanged.

FIG. 35 is a diagram that illustrates a list representing the number of minimum difference/linear active S-boxes as an index of security for (Embodiment 1) and (Existing System 3) described above.

Figure 36:
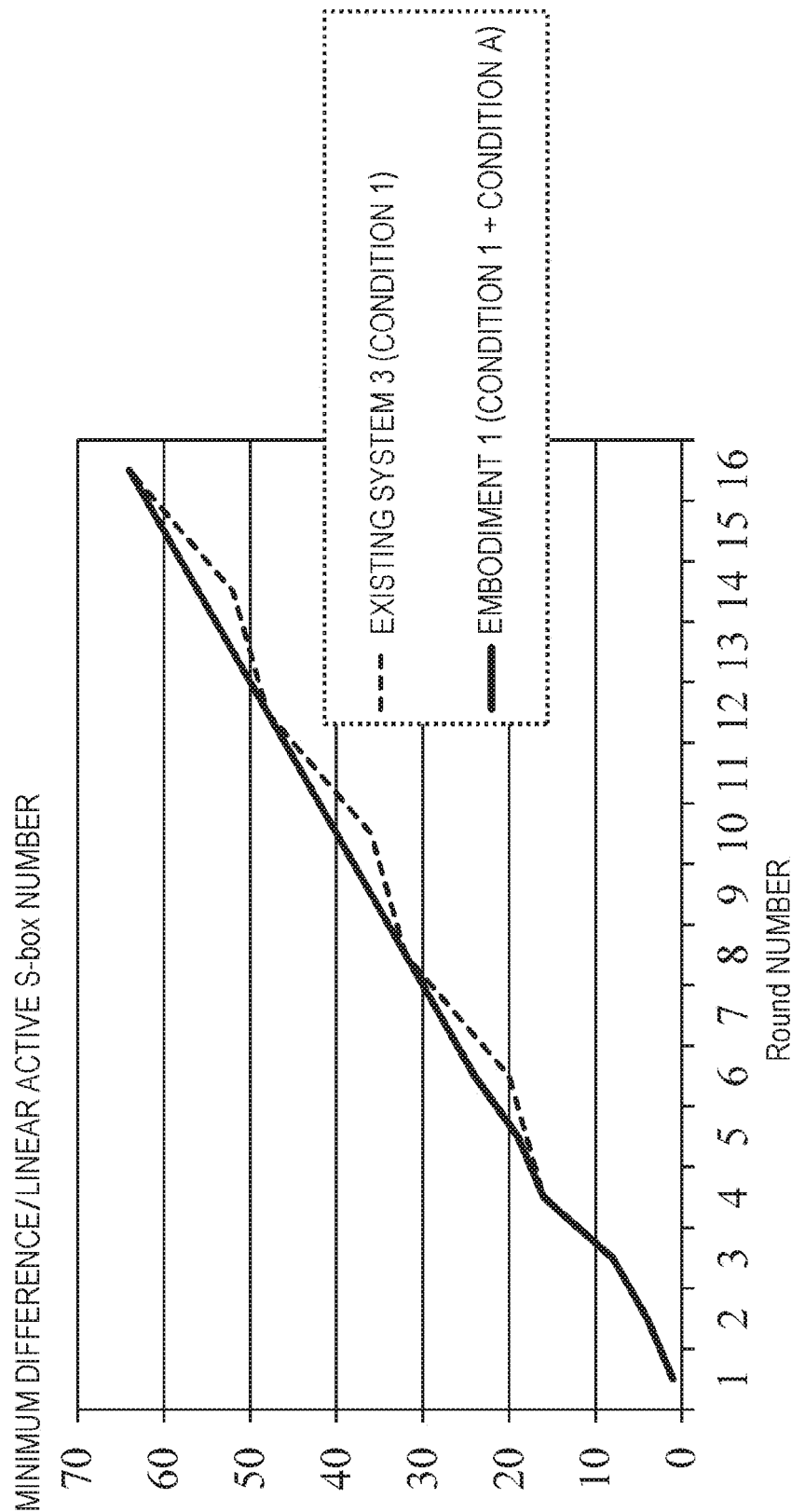
FIG. 36 is a diagram that illustrates comparison data of the numbers of active S boxes of a case where the linear transformation unit is configured according to Embodiment 1 or Existing System 3.

FIG. 36 illustrates graphs representing correspondence relations between the number of minimum difference/linear active S-boxes and the round number for (Embodiment 1) and (Existing System 3).

As described above, as the number of minimum difference/linear active S-boxes increases, the security is regarded to be higher.

The configurations of the linear transformation units of (Existing System 3) and (Embodiment 1) are as follows.
(Existing System 3)
a substitution unit satisfying (Condition 1 (=see FIG. 25)) and a linear transformation unit configured by a plurality of quasi-MDS (almost-MDS) matrixes (FIG. 26)

Embodiment 1 a substitution unit satisfying (Condition 1 (=see FIG. 25)) and (Condition A (=see FIG. 32) and a linear transformation unit configured by a plurality of quasi-MDS (almost-MDS) matrixes having the configuration of (Equation 5) (FIG. 29)

As can be understood from FIGS. 35 and 36, in a case where the linear transformation unit according to this Embodiment 1 is used, the number of minimum difference/linear active S-boxes is slightly larger than that of (Existing System 3). In other words, a result of improved security is acquired.

In addition, the linear transformation unit 302 described with reference to FIG. 34 performs the following two processes (a) and (b).
(a) a substitution process performed by the substitution unit 321 satisfying (Condition 1) and (Condition A) described above
(b) a matrix operating process performed by the matrix operating unit 322 using the quasi-MDS matrix $M_b$ having the configuration of (Equation 5) described above The substitution unit 321 and the matrix operating unit 322 configuring the linear transformation unit 302 illustrated in FIG. 34 perform the following processes.

The substitution unit 321 performs a row substitution (ShiftRow) process for changing the column positions of elements of each row of an input state as a substitution process.

In addition, the matrix operating unit 322 performs a matrix operation applying one matrix $M_b$ in units of one column for each column element of the state X', in other words, a column diffusion operation (MixColum).

However, the process forms of the substitution unit 321 and the matrix operating unit are not limited to such process forms. For example, a setting as illustrated in FIG. 37 may be used.

Figure 37:
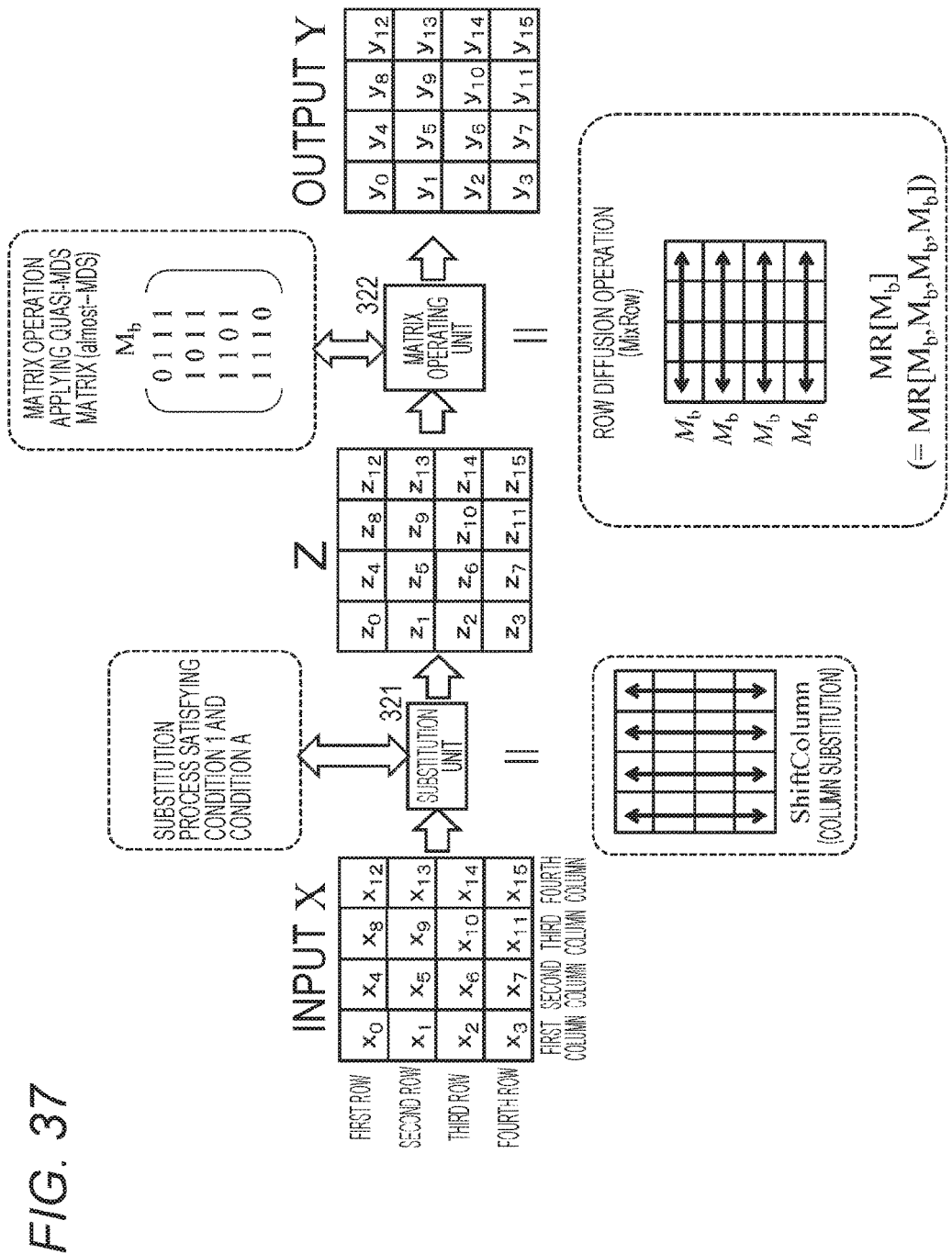
FIG. 37 is a diagram that illustrates the configuration and the process of a linear transformation unit of a cipher processing apparatus of the present disclosure according to a modified example of Embodiment 1.

In the configuration example of the linear transformation unit illustrated in FIG. 37, the substitution unit 321 performs a column substitution (ShiftColumn) for changing the row positions of elements of each column of the input state.

In addition, the matrix operating unit 322, for each row element of the state X', in units of one row, performs a matrix operation applying one matrix $M_b$, in other words, a row diffusion operation (MixRow).

First, the row diffusion operation (MixRow) described with reference to FIGS. 17 and 18 is performed.

A linear transformation unit having such a combination may be configured.

However, in this setting, the substitution unit 321 needs to satisfy conditions acquired by interchanging a relation between the row and the column in (Condition 1) and (Condition A) described above. In other words, it is necessary to satisfy the following two conditions (Condition 1') and (Condition A').
(Condition 1')
According to the substitution process of the substitution unit for the input X, each row element of the output Y is configured by elements of four mutually-different rows of the input X.
(Condition A')
In a case where the substitution process performed by the substitution unit for the input X is repeatedly performed continuously twice, each row element of the output Y is configured by elements of three or more mutually-different rows of the input X.

In the linear transformation process configuration illustrated in FIG. 37, the substitution unit 321 satisfying the two conditions (Condition 1') and (Condition A) described above performs a column substitution (ShiftColumn) process for changing the row positions of elements of each column of the input state.

In addition, the matrix operating unit 322, for each row element of the state X', in units of one row, performs a matrix operation applying one matrix $M_b$, in other words, a row diffusion operation (MixRow).

According to the linear transformation unit performing such a process, advantages similar to those described with reference to FIGS. 35 and 36 are acquired. In other words, the number of minimum difference/linear active S-boxes as an index of security can be increased more than (Existing System 3).

6. Configuration and Process of Linear Transformation Unit of Cipher Processing Apparatus According to Present Disclosure (Embodiment 2)

Next, the configuration and the process of Embodiment 2 of the linear transformation unit of the cipher processing apparatus according to the present disclosure will be described.

In addition, the cipher processing apparatus 100 configured by the linear transformation unit of this Embodiment 2 has a configuration similar to that illustrated in FIG. 19 described above and includes a key scheduling unit 110 and a cipher processing unit 120. The cipher processing unit 120 has the following configuration.

The cipher processing unit 120 is configured to include: an exclusive OR unit 121 that performs an exclusive OR operation of input data and a round key; a nonlinear transformation unit 122 that performs a nonlinear transformation process for input data; and a linear transformation unit 123 that performs a linear transformation process for input data.

The cipher processing unit 120, as illustrated in FIG. 21, repeatedly performs the following three kinds of data transformation processes.

(a) Exclusive OR Operation Process
(b) Nonlinear Transformation Process
(c) Linear Transformation Process Such processes are performed as processes for the state. The processes for the state are as described with reference to FIGS. 13(1) and 13(2) and 14(3).

The nonlinear transformation process performed by the nonlinear transformation unit of the cipher processing unit 120, for example, as illustrated in FIG. 22(1), is performed using a plurality of S-boxes.

Each S box, for example, is a nonlinear transformation unit having an n-bit input/output configuration corresponding to the word size n of each element of the state and performs a nonlinear transformation process of n×16=16n bits through a parallel process performed by 16 S boxes.

In addition, the linear transformation unit of the cipher processing unit 120, for example, as illustrated in FIG. 22(2), is configured by a matrix operating unit and a substitution unit. A linear transformation process performed by the linear transformation unit of the cipher processing unit 120, as illustrated in FIG. 22(2), is performed by a substitution process performed by the substitution unit and a matrix operating process performed by the matrix operating unit.

In addition, as described above, in FIG. 22(2), while the substitution unit is set in a former stage, the matrix operating unit is set in a later stage, and the matrix operating unit is set to perform a matrix operation by receiving a substitution result acquired by the substitution unit as an input, the configuration order of the substitution unit and the matrix operating unit may be reversely set.

In other words, it may be configured such that the matrix operating unit is set in a former stage, the substitution unit is set in a later stage, and the substitution unit is set to perform a substitution process by receiving a matrix operating result acquired by the matrix operating unit as an input.

Hereinafter, a specific configuration example of the linear transformation processing unit according to this Embodiment 2 and the process thereof will be described.

of the linear transformation processing unit according to this Embodiment 2

Figure 38:
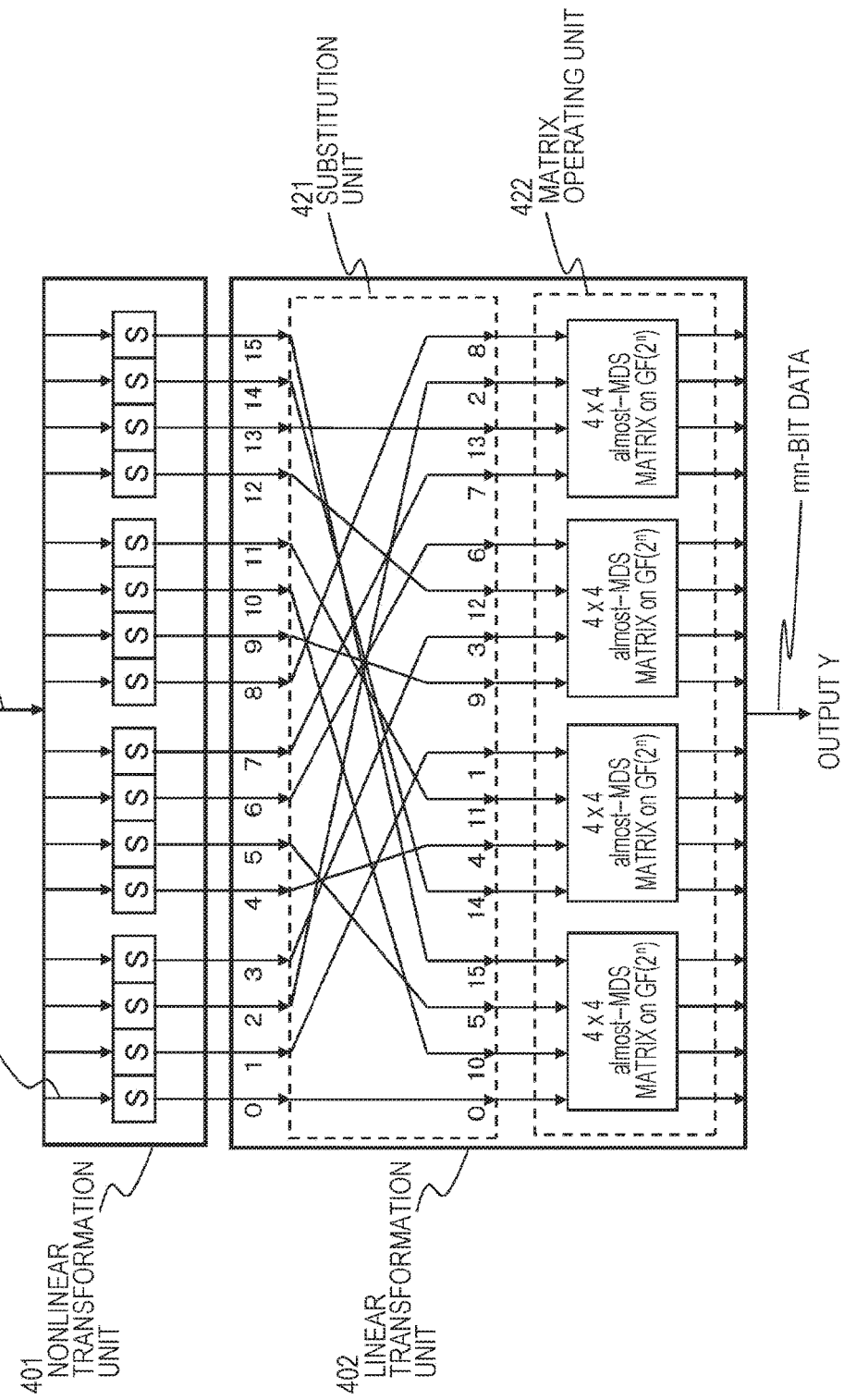
FIG. 38 is a diagram that illustrates the configuration and the process of the linear transformation unit of the cipher processing apparatus of the present disclosure according to Embodiment 2.

FIG. 38 illustrates a linear transformation unit 402 having the configuration according to this Embodiment 2 and a nonlinear transformation unit 401 disposed in a former stage of the linear transformation unit 402.

The nonlinear transformation unit 401, as described above with reference to FIG. 22(1), is formed by a plurality of S-boxes.

Each S box, for example, is a nonlinear transformation unit having an n-bit input/output configuration corresponding to the word size n of each element of a state, and a nonlinear transformation process of n×16=16n bits is performed through a parallel process performed by 16 S boxes.

The linear transformation unit 402 includes a substitution unit 421 and a matrix operating unit 422 configured by a plurality of quasi-MDS (almost-MDS) matrixes.

In addition, numerical values 0, 1, 2, . . . , 13, 14, 15 represented at input positions of the substitution unit 421 and numerical values 0, 10, 5, . . . , 13, 2, 8 represented at output positions are identifiers of 16 elements (words) of a 4×4 state. A changed status of element positions of the state according to the substitution process performed by the substitution unit 212 is illustrated.

The matrix operating unit 422, similarly to (Existing System 3) described above with reference to FIG. 26, is configured by a plurality of quasi-MDS (almost-MDS) matrixes.

Each quasi-MDS (almost-MDS) matrix is a matrix that is formed by a×a elements. Here, a<m.

A column operation is performed as an operation on an extended body GF ($2^n$).

The quasi-MDS (almost-MDS) matrix, as described above, is a matrix that performs sub optimal diffusion mapping (SODM) of the number of branches=b.

A quasi-MDS (almost-MDS) matrix used by the matrix operating unit 422 configuring the linear transformation unit 402 according to this Embodiment 2 is similar to that of Embodiment 1.

In other words, a matrix operation applying a quasi-MDS (almost-MDS) matrix having an element configuration as represented in (Equation 5) described above with reference to FIGS. 30(1) and 30(2), 31(1) and 32(2), and the like is performed.

The matrix operation applying the quasi-MDS (almost-MDS) matrix having the element configuration represented in (Equation 5), similarly to Embodiment 1, for example, is performed as a column diffusion operation (MixColum) described with reference to FIGS. 30(1) and 30(2) and 31(1) and 31(2).

Next, the configuration and the process of the substitution unit 421 of the linear transformation unit 402 according to this Embodiment 2 will be described.

The substitution unit 421, similar to the substitution units of (Existing System 2) and (Existing System 3) described above, is configured as a substitution unit that performs a substitution process satisfying the following (Condition 1).

(Condition 1)

According to the substitution process of the substitution unit for the input X, each column element of the output Y is configured by elements of four mutually-different columns of the input X.

In addition, the substitution unit 421 according to this Embodiment 2 is configured as a substitution unit that performs a substitution process satisfying the following (Condition B) in addition to (Condition 1) described above.

(Condition B)

Elements of each column of two outputs Y and Y' are configured by elements of four mutually-different columns of an input X.

Here, Y is a result of repeatedly performing the substitution process (state substitution (shuffle(X)) of the substitution unit continuously twice for the input X.

$$Y = \text{shuffle}(\text{shuffle}(X))$$

In addition, Y' is a result of repeatedly performing an inverse transformation (inv_shuffle(x)) of the substitution process (state substitution (shuffle(X)) of the substitution unit continuously twice for the input X.

$$Y' = \text{inv\_shuffle}(\text{inv\_shuffle}(X))$$

This Condition B will be described with reference to FIG. 39.

Figure 39:
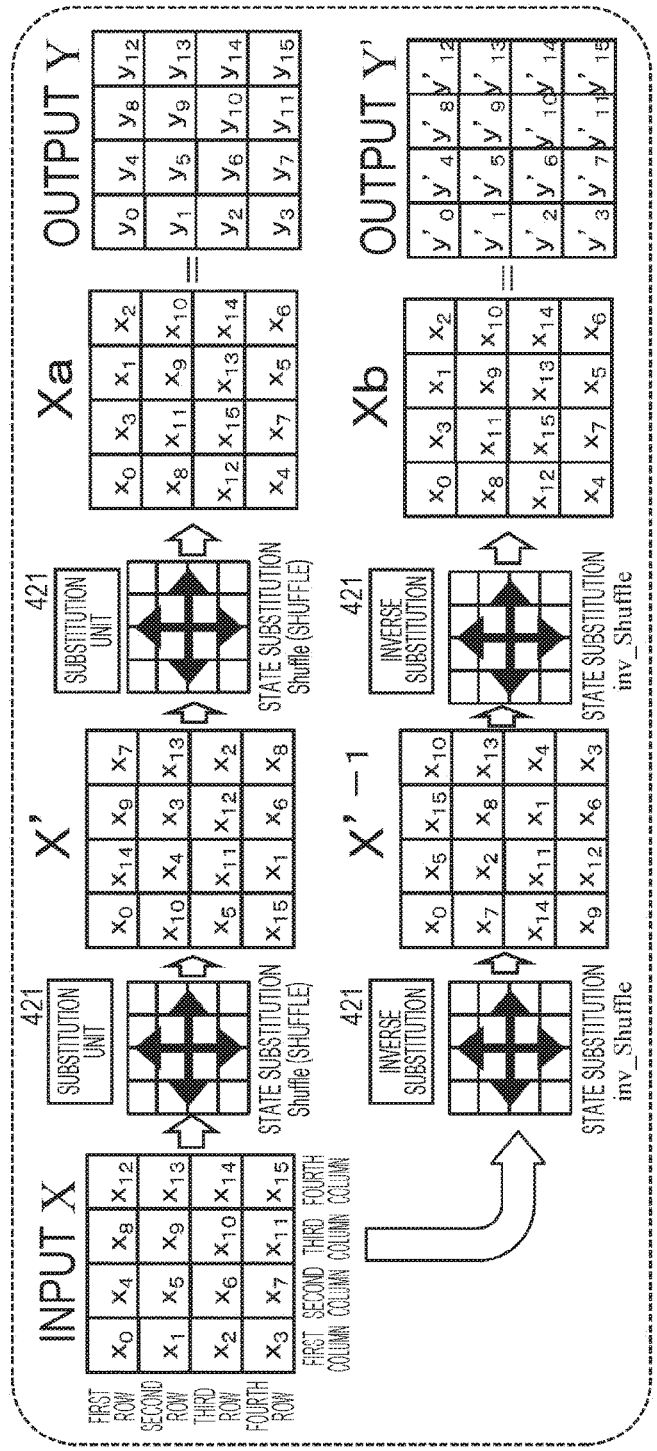
FIG. 39 is a diagram that illustrates a condition (Condition B) satisfied by a substitution unit of the linear transformation unit of the cipher processing apparatus of the present disclosure according to Embodiment 2.

In FIG. 39, an example of two repetitive substitution processes of the substitution process (state substitution (shuffle(X)) performed by the substitution unit 421 for an input X having a 4×4 state and an example of two repetitive substitution processes of the inverse transformation (inv_shuffle(X)) of the substitution unit 421 are illustrated.

The input X is a state configured by 16 words of $X_0$ to $X_{15}$.

In addition, in this Embodiment 2, for at least a part of constituent elements (words) of the 4×4 state, the substitution unit 421 performs a state substitution (shuffle) process for interchange between the row and the column.

The substitution unit 421 performs the shuffling substitution process in units of one word.

The degradation of the two repetitive substitution processes of the substitution process (state substitution (shuffle (X)) performed by the substitution unit 421 is a state Xa (=output Y) illustrated in FIG. 39.

In addition, a result of the two repetitive substitution processes of the inverse transformation (inv_shuffle(X)) performed by the substitution unit 421 is a state Xb (=output Y') illustrated in FIG. 39.

(Condition B) described above is that elements of each column of the state Xa (=output Y) and the state Xb (=output Y') illustrated in FIG. 39 are configured by elements of four mutually-different columns of the input X.

In the example illustrated in FIG. 39, the element arrangements of the output Y (=Xa) that is a result of the two repetitive substitutions performed by the substitution unit 421 and the output Y' (=Xb) that is a result of the two repetitive substitution processes of the inverse transformation (inv_shuffle(X)) performed by the substitution unit 421 are the same.

Elements $x_0$, $x_8$, $x_{12}$, and $x_4$ (=$y_0$, $y_1$, $y_2$, and $y_3$) of the first column of each of these two outputs Y and Y' are configured by the following elements of the original input X.

$x_0$ (=$y_0$) is the element of the first row and the first column of the input X.

$x_8$ (=$y_1$) is the element of the first row and the third column of the input X.

$x_{12}$ (=$y_2$) is the element of the first row and the fourth column of the input X.

$x_4$ (=$y_3$) is the element of the first row and the second column of the input X.

In this way, the elements of the first column of each of the outputs Y and Y' are configured by elements of four mutually-different columns of the input X.

For the other columns 2 to 4 of the output Y, the elements of a corresponding column of Y are configured by elements of four mutually-different columns of the input X.

In this way, the substitution unit 421 is configured as a substitution unit that performs a substitution process satisfying the following (Condition B).

(Condition B)

Elements of each column of two outputs Y and Y' are configured by elements of four mutually-different columns of an input X.

Here, Y is a result of repeatedly performing the substitution process (state substitution (shuffle(X)) of the substitution unit continuously twice for the input X.

$$Y = \text{shuffle}(\text{shuffle}(X))$$

In addition, Y' is a result of repeatedly performing an inverse transformation (inv_shuffle(x)) of the substitution process (state substitution (shuffle(X)) of the substitution unit continuously twice for the input X.

$$Y = \text{inv\_shuffle}(\text{inv\_shuffle}(X))$$

In addition, the substitution unit 421 of the linear transformation unit 402 according to this Embodiment 2 is configured as a substitution unit that satisfies not only (Condition B) described above but also (Condition 1) as described above in (Existing System 2) and (Existing System 3).

In other words, the substitution unit satisfies the following (Condition 1).

(Condition 1)

According to the substitution process of the substitution unit for the input X, each column element of the output Y is configured by elements of four mutually-different columns of the input X.

A correspondence relation between elements of the input X illustrated in FIG. 39 and the state X' that is a result of one substitution performed by the substitution unit 421 satisfies (Condition 1) described above with reference to FIG. 25.

In addition, there are many state substitutions as substitution forms satisfying (Condition 1) and (Condition B) other than the settings illustrated in FIGS. 38 and 39.

In this way, the linear transformation unit 402 according to this Embodiment 2 illustrated in FIG. 38 is configured by a substitution unit 421 and a matrix operating unit 422 having the following configurations.

The substitution unit 421 satisfies the following two conditions (Condition 1) and (Condition B).

(Condition 1)

According to the substitution process of the substitution unit for the input X, each column element of the output Y is configured by elements of four mutually-different columns of the input X.

(Condition B)

Elements of each column of two outputs Y and Y' are configured by elements of four mutually-different columns of an input X.

Here, Y is a result of repeatedly performing the substitution process (state substitution (shuffle(X)) of the substitution unit continuously twice for the input X.

$$Y = \text{shuffle}(\text{shuffle}(X))$$

In addition, Y' is a result of repeatedly performing an inverse transformation (inv_shuffle(x)) of the substitution process (state substitution (shuffle(X)) of the substitution unit continuously twice for the input X.

$$Y = \text{inv\_shuffle}(\text{inv\_shuffle}(X))$$

The matrix operating unit 422 is configured by a plurality of quasi-MDS (almost-MDS) matrixes. More specifically, the matrix operating unit 422 is configured by a quasi-MDS (almost-MDS) matrix of 4×4 elements represented in (Equation 5) described above.

Figure 40:
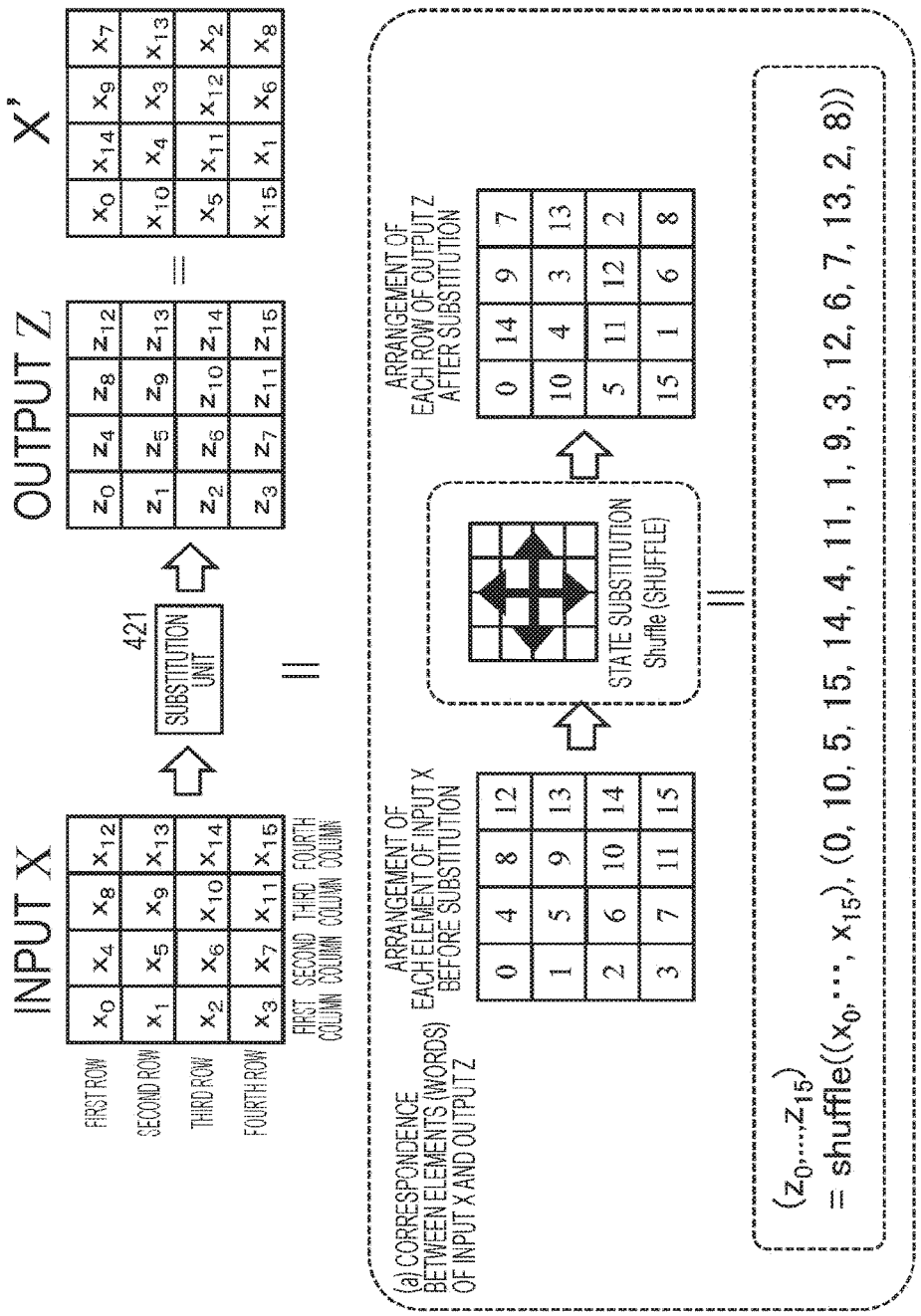
FIG. 40 is a diagram that illustrates the configuration and the process of the substitution unit of the linear transformation unit of the cipher processing apparatus of the present disclosure according to Embodiment 2.

A specific processing example of the substitution process performed by the substitution unit 421 of the linear transformation unit 402 according to this Embodiment 2 is illustrated in FIG. 40.

FIG. 40 illustrates an input X and an output Z for the substitution unit 421. Both the input X and the output Z have the configuration of a 4×4 state.

X' is a state that represents the arrangement of the elements (words) of the output Z using the elements ($X_0$ to $X_{15}$) of the input X.

According to the substitution process of the substitution unit 421, the elements ($X_0$ to $X_{15}$) of the input X are changed to those of the state X'.

According to the substitution process of the substitution unit 421, in at least a part of the elements of the input state X, the row positions and the column positions are changed.

The substitution process performed by the substitution unit 421 is performed as a state substitution (state shuffle) process accompanying a change in the row and column positions. When this substitution process is represented as an equation, the following (Equation 8) can be used.

[Mathematical Expression 8]

$$(z_0, \ldots, z_{15}) = \text{shuffle}((x_0, \ldots, x_{15}), (0,10,5,15,14,4,11,1,9,3,12,6,7,13,2,8))$$ (Equation 8)

In (Equation 8) described above, "shuffle" represents an element shuffling process function in units of one row.

shuffle($x_0, x_1, \ldots, x_{14}, x_{15}$) (0, 10, ..., 2, 8) represents a function for changing the element arrangement sequence to (0, 10, ..., 2, 8) and generating a rearranged output for the elements ($x_0, x_1, \ldots, x_{14}, x_{15}$) of the input state.

Figure 41:
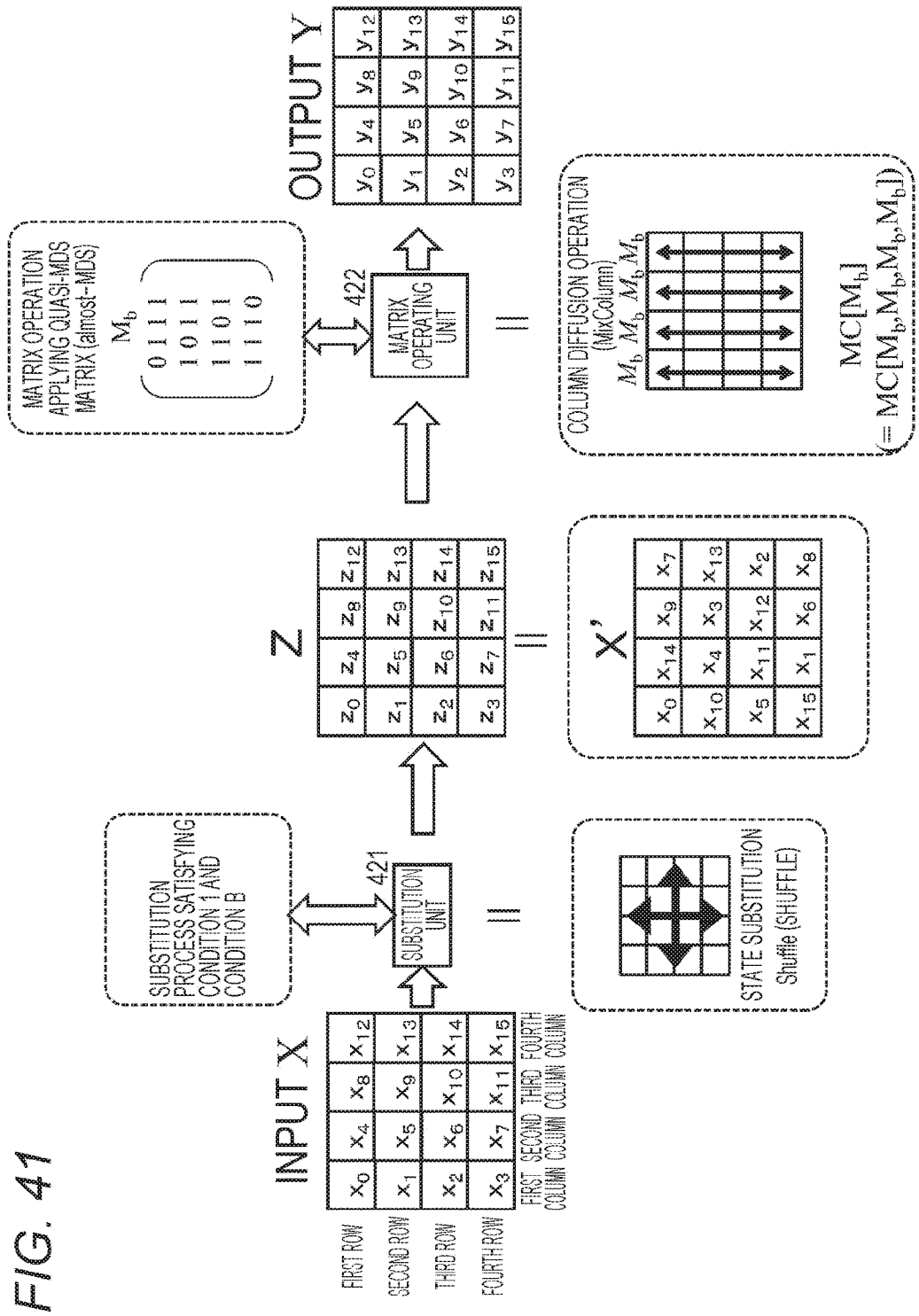
FIG. 41 is a diagram that illustrates the configuration and the process of the linear transformation unit of the cipher processing apparatus of the present disclosure according to Embodiment 2.

FIG. 41 is a diagram that illustrates an example of the process of the substitution unit 421 and the matrix operating unit 422 of the linear transformation unit 402 according to this Embodiment 2 for a state.

An input X formed by 16 4×4 elements (words) corresponds to the output of the nonlinear transformation unit 401 illustrated in FIG. 38.

First, this input X is input to the substitution unit 421, and the element positions are changed.

The substitution unit 421 satisfies the following two conditions (Condition 1) and (Condition B).
(Condition 1)

According to the substitution process of the substitution unit for the input X, each column element of the output Y is configured by elements of four mutually-different columns of the input X.
(Condition B)

Elements of each column of two outputs Y and Y' are configured by elements of four mutually-different columns of an input X.

Here, Y is a result of repeatedly performing the substitution process (state substitution (shuffle(X))) of the substitution unit continuously twice for the input X.

$$Y = \text{shuffle}(\text{shuffle}(X))$$

In addition, Y' is a result of repeatedly performing an inverse transformation (inv_shuffle(x)) of the substitution process (state substitution (shuffle(X))) of the substitution unit continuously twice for the input X.

$$Y' = \text{inv\_shuffle}(\text{inv\_shuffle}(X))$$

A state after the substitution process performed by the substitution unit 421 satisfying Conditions 1 and B is the state Z (=state X') illustrated in FIG. 41.

16 elements (x0 to x15) of the input X have the element positions changed according to the substitution process performed by the substitution unit 421. For example, in the setting of the substitution unit 321 illustrated in FIG. 29, correspondence relations between the elements $z_0$ to $z_{15}$ of the state Z after the substitution and elements $x_0$ to $x_{15}$ of the state X before the substitution are as follows.

$z_0 = x_0$ $z_1 = x_{10}$ $z_2 = x_5$ $z_3 = x_{15}$ $z_4 = x_{14}$ $z_5 = x_4$ $z_6 = x_{11}$ $z_7 = x_1$ $z_8 = x_9$ $z_9 = x_3$ $z_{10} = x_{12}$ $z_{11} = x_6$ $z_{12} = x_7$ $z_{13} = x_{13}$ $z_{14} = x_2$ $z_{15} = x_8$

In this way, the substitution process is performed.

In addition, the substitution form described above is an example. The substitution unit 421 may be configured to satisfy (Condition 1) and (Condition B) described above, and there are many substitution forms satisfying such conditions other than the setting illustrated in FIG. 41.

The state X' that is the output of the substitution unit 421 is input to the matrix operating unit 422 next, and a linear transformation process using matrixes is performed.

The matrix operating unit 422 is configured by a plurality of quasi-MDS (almost-MDS) matrixes. More specifically, the matrix operating unit 422 is configured by quasi-MDS (almost-MDS) matrixes of 4×4 elements represented in (Equation 5) described above.

First, as described with reference to FIGS. 30(1) and 30(2) and 31(1) and 31(2), for a state formed by 16 elements each formed by n bits that is a target for the linear transformation process, a matrix operation using the quasi-MDS matrix $M_b$ represented in (Equation 5) is performed.

As described with reference to FIGS. 30(1) and 30(2) and 31(1) and 31(2), for elements of each column of input data of a 4×4 state, in units of one column, by using a matrix operation applying one matrix $M_b$, a column diffusion operation (MixColum) is performed.

A result of this matrix operation is an output Y illustrated in FIG. 41.

A correspondence relation between elements $y_0$ to $y_{15}$ of a state Y after the matrix operation and elements $z_0$ to $z_{15}$ of a state Z before the matrix operation is as follows.

$y_0 = z_1 (+) z_2 (+) z_3$ $y_1 = z_0 (+) z_2 (+) z_3$ $y_2 = z_0 (+) z_1 (+) z_3$ $y_3 = z_0 (+) z_1 (+) z_2$ $y_4 = z_5 (+) z_6 (+) z_7$ $y_5 = z_4 (+) z_6 (+) z_7$ $y_6 = z_4 (+) z_5 (+) z_7$ $y_7 = z_4 (+) z_5 (+) z_6$ $y_8 = z_9 (+) z_{10} (+) z_{11}$ $y_9 = z_8 (+) z_{10} (+) z_{11}$ $y_{10} = z_8 (+) z_9 (+) z_{11}$ $y_{11} = z_8 (+) z_9 (+) z_{10}$ $y_{12} = z_{13} (+) z_{14} (+) z_{15}$ $y_{13} = z_{12} (+) z_{14} (+) z_{15}$ $y_{14} = z_{12}(+)z_{13}(+)z_{13}$ $y_{13} = z_{12}(+)z_{13}(+)z_{14}$

Note that, in the equations described above, the operator (+) represents an exclusive OR operation.

In this way, the linear transformation unit according to this Embodiment 2 performs processes (a) and (b) represented below.
(a) Substitution Process Performed by Substitution Unit Satisfying (Condition 1) and (Condition B) Described Above
(b) Matrix Operating Process Using Quasi-MDS Matrix $M_b$ having Configuration of (Equation 5) Described Above In addition, the sequence of the substitution process performed by the substitution unit and the sequence of the matrix operating process performed by the matrix operating unit may be interchanged.

FIG. 42 is a diagram that illustrates a list representing the number of minimum difference/linear active S-boxes as an index of security for (Embodiment 2) and (Embodiment 1) and (Existing System 3) described above.

Figure 43:
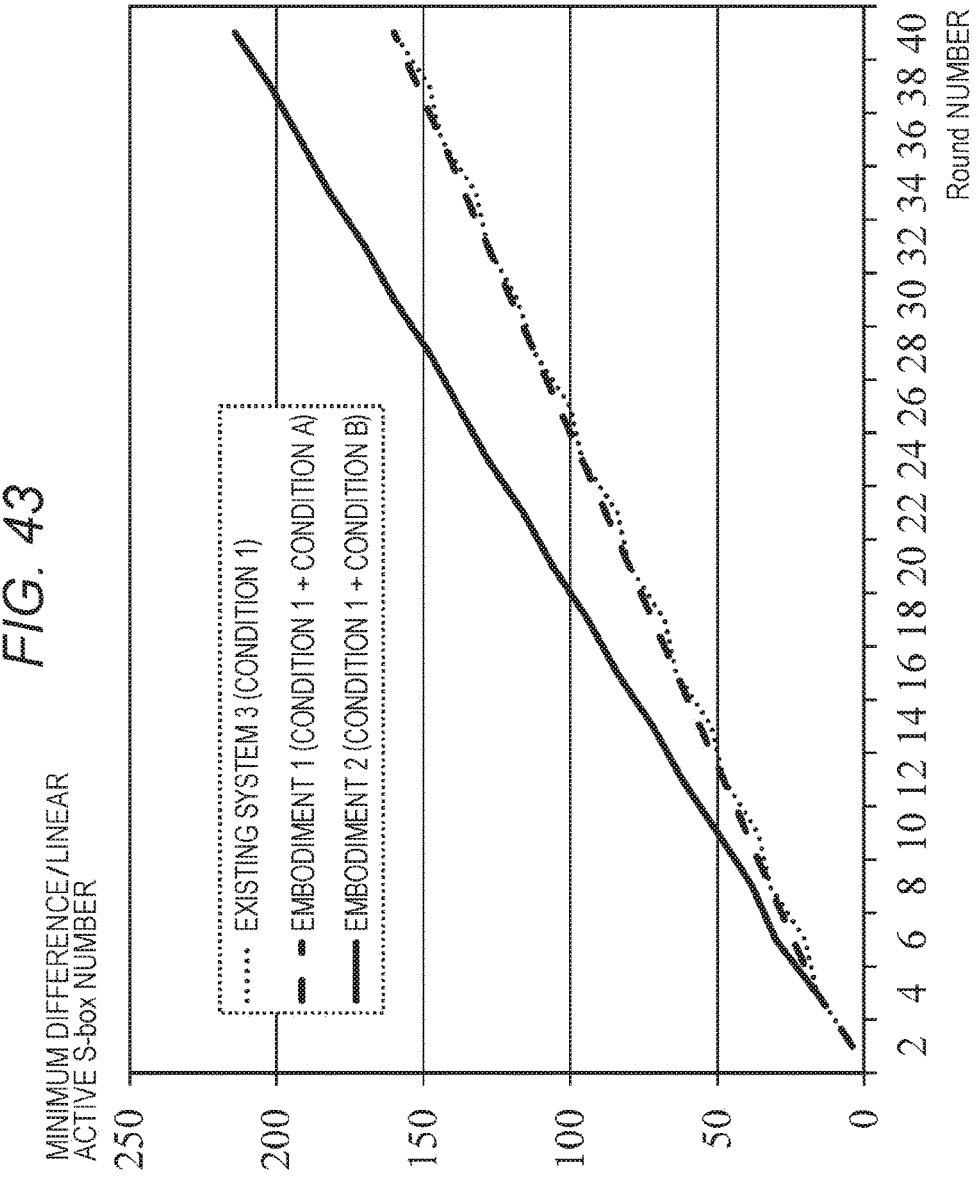
FIG. 43 is a diagram that illustrates comparison data of the numbers of active S boxes of a case where the linear transformation unit is configured according to Embodiment 2, Embodiment 1, or Existing System 3.

FIG. 43 illustrates graphs representing correspondence relations between the number of minimum difference/linear active S-boxes and the round number for (Embodiment 2) and (Embodiment 1) and (Existing System 3) described above.

As described above, as the number of minimum difference/linear active S-boxes increases, the security is regarded to be higher.

The configurations of the linear transformation units of (Existing System 3) and (Embodiment 1) and (Embodiment 2) areas follows.
(Existing System 3)
a substitution unit satisfying (Condition 1 (=see FIG. 25)) and a linear transformation unit configured by a plurality of quasi-MDS (almost-MDS) matrixes (FIG. 26)

Embodiment 1 a substitution unit satisfying (Condition 1 (=see FIG. 25)) and (Condition A (=see FIG. 32) and a linear transformation unit configured by a plurality of quasi-MDS (almost-MDS) matrixes having the configuration of (Equation 5) (FIG. 29)

Embodiment 2 a substitution unit satisfying (Condition 1 (=see FIG. 25)) and (Condition B (=see FIG. 39) and a linear transformation unit configured by a plurality of quasi-MDS (almost-MDS) matrixes having the configuration of (Equation 5) (FIG. 38)

As can be understood from FIGS. 41 and 42, in a case where the linear transformation unit according to this Embodiment 2 is used, the number of minimum difference/linear active S-boxes is larger than that of (Existing System 3) and (Embodiment 1). In other words, a result of improved security is acquired.

In addition, the linear transformation unit 402 described with reference to FIG. 38 performs the following two processes (a) and (b).
(a) a substitution process performed by the substitution unit 321 satisfying (Condition 1) and (Condition B) described above
(b) a matrix operating process performed by the matrix operating unit 322 using the quasi-MDS matrix $M_b$ having the configuration of (Equation 5) described above The substitution unit 421 and the matrix operating unit 422 configuring the linear transformation unit 402 illustrated in FIG. 38 perform the following processes.

The substitution unit 421 performs a state substitution process for changing the row and column positions of the elements of the input state as a substitution process.

In addition, the matrix operating unit 422 performs a matrix operation applying one matrix $M_b$ in units of one column for each column element of the state X', in other words, a column diffusion operation (MixColum).

Figure 44:
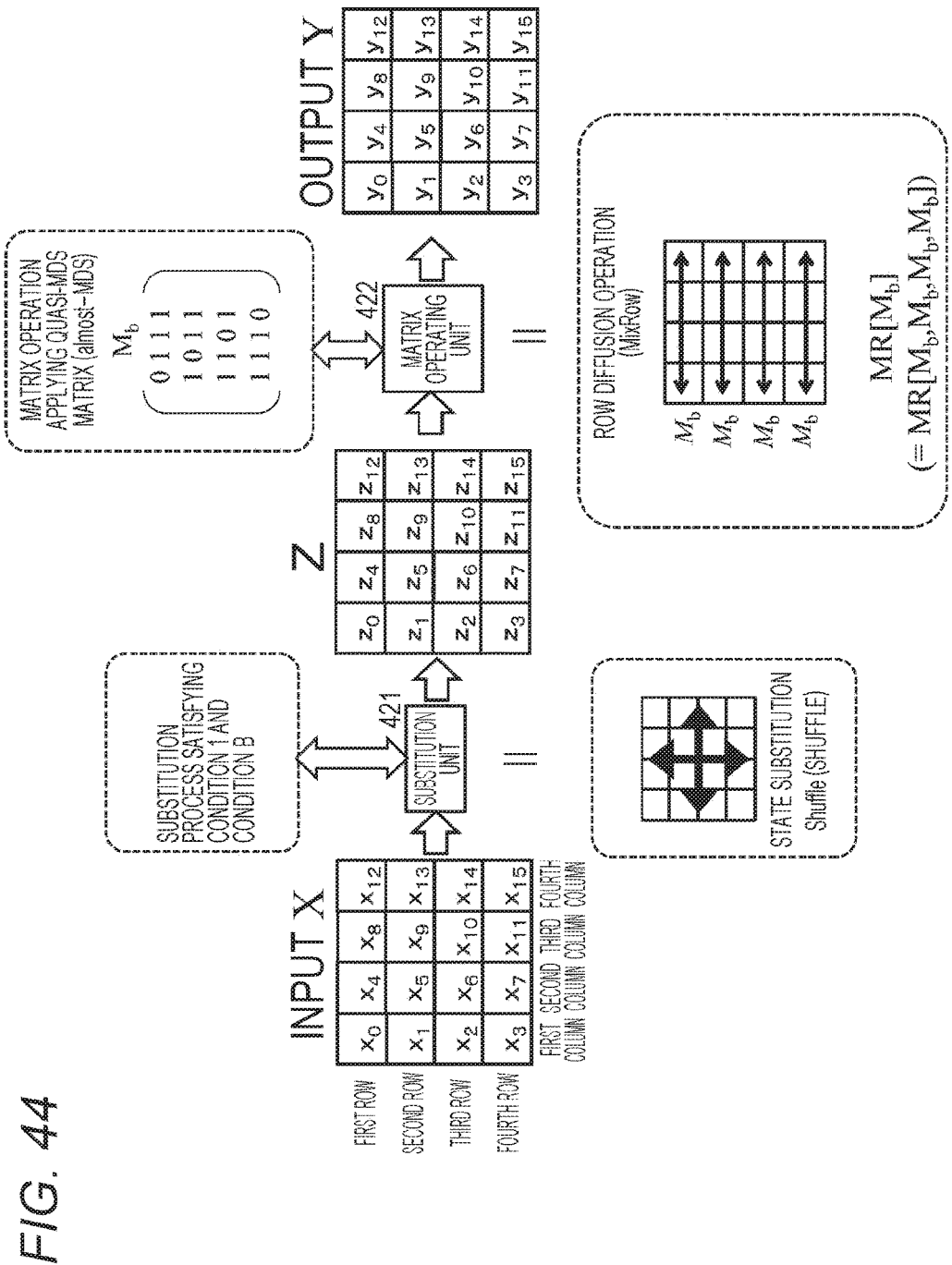
FIG. 44 is a diagram that illustrates the configuration and the process of a linear transformation unit of the cipher processing apparatus of the present disclosure according to a modified example of Embodiment 2.

However, the process forms of the substitution unit 421 and the matrix operating unit are not limited to such process forms. For example, a setting as illustrated in FIG. 44 may be used.

In the example illustrated in FIG. 44, the process of the substitution unit 421 and the process of the matrix operating unit are changed as below.

The substitution unit 421 performs the substitution process as a substitution interchanging the correspondence between the row and the column in the substitution process described in Embodiment 2.

In addition, the matrix operating unit 422, for each row element of the state X', in units of one row, performs a matrix operation applying one matrix $M_b$, in other words, a row diffusion operation (MixRow).

However, in this setting, the substitution unit 421 needs to satisfy the condition of interchanging the relation between the row and the column in (Condition 1) and (Condition B) described above. In other words, substitution unit 421 needs to satisfy the following two conditions of (Condition 1') and (Condition B').
(Condition 1')

According to the substitution process of the substitution unit for the input X, each row element of the output Y is configured by elements of four mutually-different rows of the input X.
(Condition B')

Elements of each row of two outputs Y and Y' are configured by elements of four mutually-different rows of an input X.

Here, Y is a result of repeatedly performing the substitution process (state substitution (shuffle(X)) of the substitution unit continuously twice for the input X.

$Y = \text{shuffle}(\text{shuffle}(X))$

In addition, Y' is a result of repeatedly performing an inverse transformation (inv_shuffle(x)) of the substitution process (state substitution (shuffle(X)) of the substitution unit continuously twice for the input X.

$Y' = \text{inv\_shuffle}(\text{inv\_shuffle}(X))$

According to the configuration of the linear transformation unit having a combination of the substitution unit and the matrix operating unit, advantages similar to those described with reference to FIGS. 42 and 43 are acquired. In other words, the number of minimum difference/linear active S-boxes as an index of security can be increased more than (Existing System 3) and (Embodiment 1).

7. Quasi-MDS Matrix to be Applied

In the embodiments described above, as a matrix applied in the matrix operating unit of the linear transformation unit, a quasi-MDS matrix (Almost-MDS matrix) performing sub optimal diffusion mapping (SODM) having the number of branches=b is described.

However, the matrix applied in the matrix operating unit of the linear transformation unit is not limited to the quasi- MDS matrix (Almost-MDS matrix) having the number of branches=b. For example, a configuration may be employed in which a matrix having the number of branches to be less than b such as b−1, b−2, or the like is regarded as a quasi-MDS matrix, and the quasi-MDS matrix having the number of branches to be less than b is applied.

8. Configuration Example of Cipher Processing Apparatus

Finally, a configuration example of a cipher processing apparatus performing cipher processing according to the embodiment described above will be described.

The cipher processing apparatus performing cipher processing according to the embodiment described above can be mounted in various information processing apparatuses performing cipher processing. More specifically, for example, the cipher processing apparatus can be used for various apparatuses performing cipher processing accompanied in data processing or a communication process such as a PC, a TV set, a recorder, a player, a communication apparatus, an RFID, a smartcard, a sensor network apparatus, a battery authentication module, a health/medical device, a self-supporting type network device, and the like.

Figure 45:
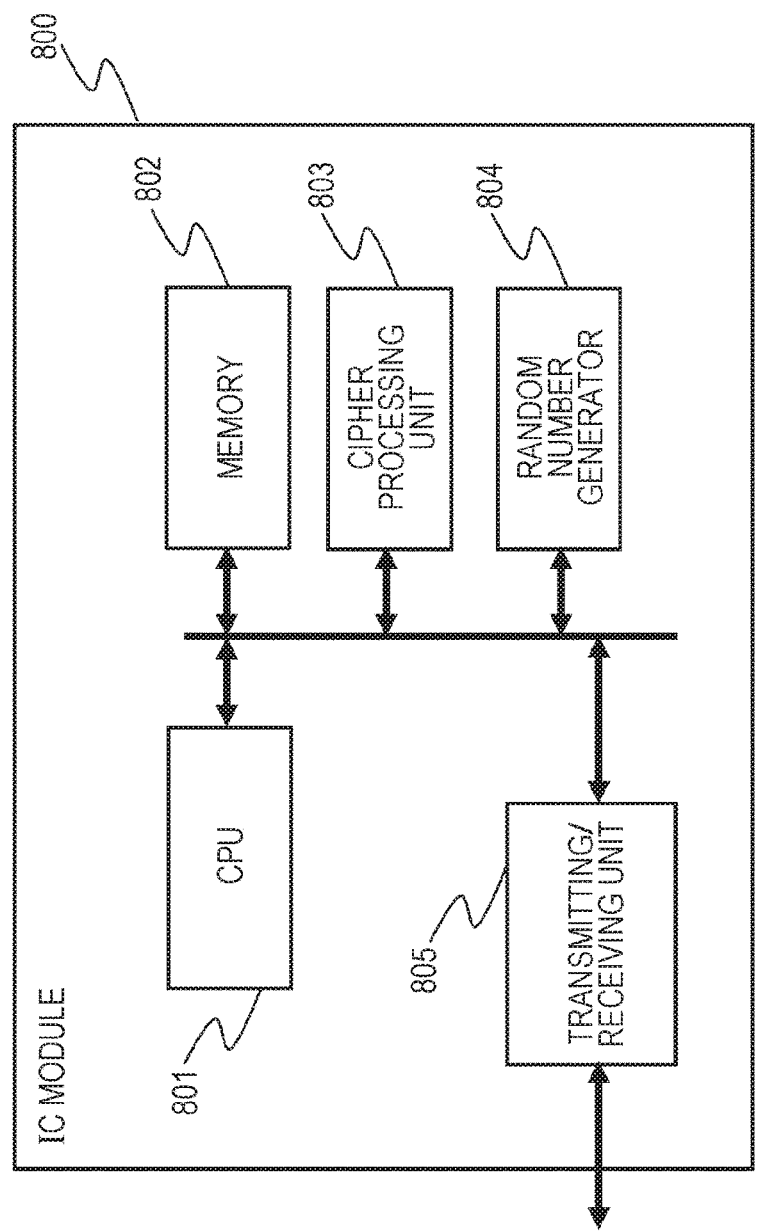
FIG. 45 is a diagram that illustrates an example of the configuration of an IC module 700 as a cipher processing apparatus.

A configuration example of an IC module 800 as an example of an apparatus performing the cipher processing according to the present disclosure is illustrated in FIG. 45. The process described above can be performed in various information processing apparatuses such as a PC, an IC card, a reader/writer, a smartphone, a wearable device, and the like, and the IC module 800 illustrated in FIG. 45 can be configured in such various apparatuses.

A central processing unit (CPU) 801 illustrated in FIG. 45 is a processor that executes starting/ending cipher processing, control of transmission/reception of data, data transmission control between constituent units, and other various programs. A memory 802 is formed by a read-only-memory (ROM) storing a program executed by the CPU 801 or fixed data such as operation parameters or the like, a random access memory (RAM) used as a storage area of a program executed in the process of the CPU 801 and parameters changing appropriately in a program process and a work area, and the like. In addition, the memory 802 can be used as a storage area of key data required for cipher processing, a transformation table (substitution table) applied in the cipher processing, data applied for a transformation matrix, and the like. Furthermore, it is preferable that the data storage area is configured as a memory having a tamper-resistant structure.

A cipher processing unit 803 has the cipher processing configuration described above and performs cipher processing according to a common key block cipher processing algorithm and a decryption process.

In addition, here, while an example in which a cipher processing unit is configured as a separate module is illustrated, instead of disposing such an independent cipher processing module, and, for example, it may be configured such that a cipher processing program is stored in the ROM, and the CPU 801 reads and executes a ROM storage program.

A random number generator 804 performs a random number generating process that is necessary for the generation of a key required for the cipher processing and the like.

A transmission/reception unit 805 is a data communication processing unit performing data communication with the outside and performs data communication with an IC module such as a reader/writer or the like and outputs a cipher text generated inside the IC module or inputs data from an apparatus such as an external reader/writer, and the like.

In addition, the cipher processing apparatus described in the embodiment described above can be applied not only to an encryption process for encrypting a plain text as input data but also to a decryption process for restoring a cipher text as input data into a plain text.

In both the encryption process and the decryption process, the configuration described in the embodiments described above can be applied.

Figure 46:
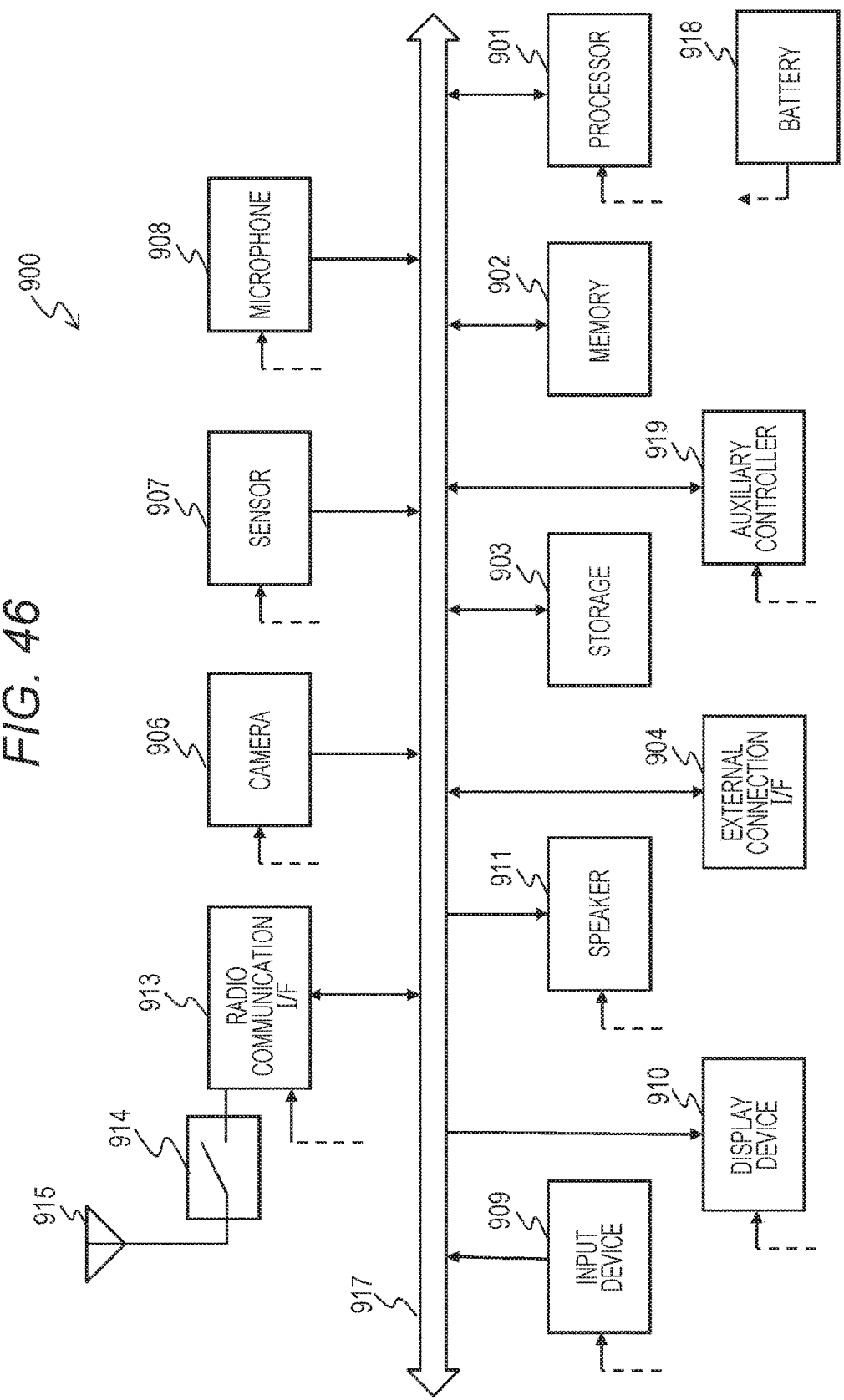
FIG. 46 is a diagram that illustrates an example of the configuration of a smartphone having a cipher processing executing function.

FIG. 46 is a block diagram that illustrates an example of the schematic configuration of a smartphone 900 that performs cipher processing according to the present disclosure. The smartphone 900 includes: a processor 901; a memory 902; a storage 903; an external connection interface 904; a camera 906; a sensor 907; a microphone 908; an input device 909, a display device 910, a speaker 911; a radio communication interface 913; an antenna switch 914; an antenna 915; a bus 917; a battery 918; and an auxiliary controller 919.

The processor 901, for example, may be a central processing unit (CPU) or a system on chip (SoC) and controls the application layer of the smartphone 900 and the other layers and controls cipher processing. The memory 902 includes a random access memory (RAM) and a read only memory (ROM) and stores programs executed by the processor 901 and data. In addition, the memory 902 can be used as a storage area of key data required for the cipher processing, a transformation table (substitution table) applied for the cipher processing, data applied for a transformation matrix and the like. In addition, it is preferable that the storage area of data is configured by a memory having a tamper resistance structure. The storage 903 may include a semiconductor memory or a storage medium such as a hard disk. The external connection interface 904 is an interface used for connecting an externally-attached device such as a memory card or a universal serial bus (USB) device to the smartphone 900.

The camera 906, for example, includes imaging devices such as a charge coupled devices (CCD) or complementary metal oxide semiconductor (CMOS) and generates a captured image. The sensor 907, for example, may include a sensor group such as a positioning sensor, a gyro sensor, a geomagnetic sensor, and an acceleration sensor. The microphone 908 transforms a sound input to the smartphone 900 into an audio signal. An image generated by the camera 906, sensor data acquired by the sensor 907, the audio signal acquired by the microphone 908, and the like may be encrypted by the processor 901 and be transmitted to another device through the radio communication interface 913. The input device 909, for example, includes a touch sensor detecting a touch on a screen of the display device 910, a keypad, a keyboard, buttons, switches, or the like and receives a user's operation or an information input. The display device 910 includes a screen of a liquid crystal display (LCD), an organic light emitting diode (OLED) display, or the like and displays an output image of the smartphone 900. The speaker 911 transforms an audio signal output from the smartphone 900 into a sound.

The radio communication interface 913 performs radio communication and, typically, may include a baseband processor, a radio frequency (RF) circuit, a power amplifier, and the like. The radio communication interface 913 may be a one-chip module in which a memory storing a communication control program, a processor executing the program, and related circuits are integrated. The radio communication interface 913, in addition to a wireless LAN system, may support other types of radio communication system such as a near field radio communication system, a proximity wireless communication system, or a cellular communication system.

The bus 917 interconnects the processor 901, the memory 902, the storage 903, the external connection interface 904, the camera 906, the sensor 907, the microphone 908, the input device 909, the display device 910, the speaker 911, the radio communication interface 913, and the auxiliary controller 919. The battery 918 supplies power to each block of the smartphone 900 illustrated in FIG. 46 through power supply lines that are partly illustrated using broken lines in the drawing. The auxiliary controller 919, for example, in a sleep mode, operates a minimum necessary function of the smartphone 900.

In addition, the cipher processing in the smartphone described in the embodiments described above can be applied not only to encryption process for encrypting a plain text as input data but also to a decryption process for restoring a cipher text as input data to a plain text.

In both the encryption process and the decryption process, the configuration described in each of the embodiments described above may be applied.

In addition, a configuration may be employed in which the IC module 800 illustrated in FIG. 45 is mounted in the smartphone 900 illustrated in FIG. 46, and the cipher processing according to the embodiment described above is performed by the IC module 800.

9. Summary of Configuration According to Present Disclosure

As above, the embodiments of the present disclosure have been described in detail by referring to specific embodiments. However, it is apparent that a person skilled in the art may make modifications or substitutions for the embodiments in a range not departing from the concept of the present disclosure. In other words, since the present invention has been disclosed in an exemplary form, the disclosure should not be interpreted in a limited manner. In order to determine the concept of the present disclosure, the claims need to be referred to.

In addition, the technologies disclosed in this specification may take the following configurations.

(1) A cipher processing apparatus including:
a cipher processing unit that generates output data by repeatedly performing a round operation in a round operating unit for input data,
wherein the input data is a state including a plurality of elements each formed from data of one or more bits,
the round operating unit includes a nonlinear transformation unit that performs a nonlinear transformation process by inputting the state and a linear transformation unit that performs a linear transformation process by inputting the state,
the linear transformation unit includes
a matrix operating unit that performs a matrix operation in units of elements for the state, and
a substitution unit that performs a substitution process in units of elements for the state,
the matrix operating unit performs a matrix operation applying a quasi-MDS (Almost-Maximum Distance Separable) matrix, and
the substitution unit performs the substitution process applying a substitution unit satisfying the following Condition 1 and Condition A.

(Condition 1)
According to the substitution process of the substitution unit for the input X, each column element of the output Y is configured by elements of four mutually-different columns of the input X.
(Condition A)
In a case where the substitution process performed by the substitution unit for the input X is repeatedly performed continuously twice, each column element of the output Y is configured by elements of three or more mutually-different columns of the input X.

(2) The cipher processing apparatus according to (1), wherein the matrix operating unit performs one of a column diffusion operation applying one quasi-MDS matrix in units of elements of each column of the state and a row diffusion operation applying one quasi-MDS matrix in units of elements of each row of the state.

(3) The cipher processing apparatus according to (1) or (2), wherein the substitution unit performs a substitution process changing only column positions of at least a part of elements configuring the state, and
the matrix operating unit is configured to perform a column diffusion operation applying one quasi-MDS matrix in units of elements of each column.

(4) The cipher processing apparatus according to (1) or (2), wherein the substitution unit performs a substitution process applying a substitution unit satisfying the following condition B.
(Condition B)
Elements of each column of two outputs Y and Y' are configured by elements of four mutually-different columns of an input X,
Y being a result of repeatedly performing the substitution process of the substitution unit continuously twice for the input X,
Y' being a result of repeatedly performing an inverse transformation of the substitution process of the substitution unit continuously twice for the input X.

(5) The cipher processing apparatus according to (4), wherein the substitution unit performs a state substitution process changing row and column positions of at least apart of elements configuring the state, and
the matrix operating unit is configured to perform a column diffusion operation applying one quasi-MDS matrix in units of elements of each column.

(6) The cipher processing apparatus according to any of (1) to (5),
wherein the state is a state formed by 4×4 elements, and
the matrix operating unit performs one of a column diffusion operation applying one quasi-MDS matrix formed from 4×4 elements in units of elements of each column of the state and a row diffusion operation applying one quasi-MDS matrix formed from 4×4 elements in units of elements of each row of the state.

(7) The cipher processing apparatus according to any of (1) to (6), wherein the nonlinear transformation unit is configured by a plurality of S boxes performing a nonlinear transformation process in units of one element configuring the state.

(8) The cipher processing apparatus according to (7), wherein the linear transformation unit performs a substitution process and a matrix operating process by using outputs of the plurality of S boxes as constituent elements of the state.

(9) A cipher processing apparatus including:
a cipher processing unit that generates output data by repeatedly performing a round operation in a round operating unit for input data,
wherein the input data is a state including a plurality of elements each formed from data of one or more bits,
the round operating unit includes a nonlinear transformation unit that performs a nonlinear transformation process by inputting the state and a linear transformation unit that performs a linear transformation process by inputting the state,
the linear transformation unit includes
a matrix operating unit that performs a matrix operation in units of elements for the state, and
a substitution unit that performs a substitution process in units of elements for the state,
the matrix operating unit performs a matrix operation applying a quasi-MDS (Almost-Maximum Distance Separable) matrix, and
the substitution unit performs the substitution process applying a substitution unit satisfying the following Condition 1' and Condition A'.
(Condition 1')
According to the substitution process of the substitution unit for the input X, each row element of the output Y is configured by elements of four mutually-different rows of the input X.
(Condition A')
In a case where the substitution process performed by the substitution unit for the input X is repeatedly performed continuously twice, each row element of the output Y is configured by elements of three or more mutually-different rows of the input X.
(10) The cipher processing apparatus according to (9),
wherein the substitution unit performs a substitution process changing only row positions of at least a part of elements configuring the state, and
the matrix operating unit is configured to perform a row diffusion operation applying one quasi-MDS matrix in units of elements of each row.
(11) The cipher processing apparatus according to (9) or (10), wherein the substitution unit performs a substitution process applying a substitution unit satisfying the following condition B'.
(Condition B')
Elements of each row of two outputs Y and Y' are configured by elements of four mutually-different rows of an input X,
Y being a result of repeatedly performing the substitution process of the substitution unit continuously twice for the input X,
Y' being a result of repeatedly performing an inverse transformation of the substitution process of the substitution unit continuously twice for the input X.
(12) The cipher processing apparatus according to any of (9) to (11),
wherein the substitution unit performs a state substitution process changing row and column positions of at least apart of elements configuring the state, and
the matrix operating unit is configured to perform a row diffusion operation applying one quasi-MDS matrix in units of elements of each row.
(13) A cipher processing method performed in a cipher processing apparatus including a cipher processing unit that generates output data by repeatedly performing a round operation in a round operating unit for input data,
wherein the input data is a state including a plurality of elements each formed from data of one or more bits,
the round operating unit includes a nonlinear transformation unit that performs a nonlinear transformation process by inputting the state and a linear transformation unit that performs a linear transformation process by inputting the state,
the linear transformation unit includes
a matrix operating unit that performs a matrix operation in units of elements for the state, and
a substitution unit that performs a substitution process in units of elements for the state,
the matrix operating unit performs a matrix operation applying a quasi-MDS (Almost-Maximum Distance Separable) matrix, and
the substitution unit performs the substitution process satisfying the following Condition 1 and Condition A.
(Condition 1)
According to the substitution process of the substitution unit for the input X, each column element of the output Y is configured by elements of four mutually-different columns of the input X.
(Condition A)
In a case where the substitution process performed by the substitution unit for the input X is repeatedly performed continuously twice, each column element of the output Y is configured by elements of three or more mutually-different columns of the input X.
(14) A cipher processing method performed in a cipher processing apparatus including a cipher processing unit that generates output data by repeatedly performing a round operation in a round operating unit for input data,
wherein the input data is a state including a plurality of elements each formed from data of one or more bits,
the round operating unit includes a nonlinear transformation unit that performs a nonlinear transformation process by inputting the state and a linear transformation unit that performs a linear transformation process by inputting the state,
the linear transformation unit includes
a matrix operating unit that performs a matrix operation in units of elements for the state, and
a substitution unit that performs a substitution process in units of elements for the state,
the matrix operating unit performs a matrix operation applying a quasi-MDS (Almost-Maximum Distance Separable) matrix, and
the substitution unit performs the substitution process applying a substitution unit satisfying the following Condition 1' and Condition A'.
(Condition 1')
According to the substitution process of the substitution unit for the input X, each row element of the output Y is configured by elements of four mutually-different rows of the input X.
(Condition A')
In a case where the substitution process performed by the substitution unit for the input X is repeatedly performed continuously twice, each row element of the output Y is configured by elements of three or more mutually-different rows of the input X.
(15) A program executing cipher processing in a cipher processing apparatus including a cipher processing unit that generates output data by repeatedly performing a round operation in a round operating unit for input data,
wherein the input data is a state including a plurality of elements each formed from data of one or more bits, the round operating unit includes a nonlinear transformation unit that performs a nonlinear transformation process by inputting the state and a linear transformation unit that performs a linear transformation process by inputting the state, and the linear transformation unit includes a matrix operating unit that performs a matrix operation in units of elements for the state, and a substitution unit that performs a substitution process in units of elements for the state, the program causing the matrix operating unit to perform a matrix operation applying a quasi-MDS (Almost-Maximum Distance Separable) matrix and the substitution unit to perform the substitution process satisfying the following Condition 1 and Condition A.

(Condition 1)

According to the substitution process of the substitution unit for the input X, each column element of the output Y is configured by elements of four mutually-different columns of the input X.

(Condition A)

In a case where the substitution process performed by the substitution unit for the input X is repeatedly performed continuously twice, each column element of the output Y is configured by elements of three or more mutually-different columns of the input X.

(16) A program executing cipher processing in a cipher processing apparatus including a cipher processing unit that generates output data by repeatedly performing a round operation in a round operating unit for input data, wherein the input data is a state including a plurality of elements each formed from data of one or more bits, the round operating unit includes a nonlinear transformation unit that performs a nonlinear transformation process by inputting the state and a linear transformation unit that performs a linear transformation process by inputting the state, and the linear transformation unit includes a matrix operating unit that performs a matrix operation in units of elements for the state, and a substitution unit that performs a substitution process in units of elements for the state, the program causing the matrix operating unit to perform a matrix operation applying a quasi-MDS (Almost-Maximum Distance Separable) matrix and the substitution unit to perform the substitution process applying a substitution unit satisfying the following Condition 1' and Condition A'.

(Condition 1')

According to the substitution process of the substitution unit for the input X, each row element of the output Y is configured by elements of four mutually-different rows of the input X.

(Condition A')

In a case where the substitution process performed by the substitution unit for the input X is repeatedly performed continuously twice, each row element of the output Y is configured by elements of three or more mutually-different rows of the input X.

In addition, a series of the processes described in the specification can be executed by hardware, software, or a combined configuration of both the hardware and software. In a case where the process is executed by software, a program recording a processing sequence can be installed to a memory arranged inside a computer built in dedicated hardware and executed, or the program can be installed to a general-purpose computer that can execute various processes and be executed. For example, the program may be recorded on a recording medium in advance. In addition to the installation of the program to a computer from a recording medium, the program can be received through a network such as local area network (LAN) or the Internet and be installed to a recording medium such as a built-in hard disk.

In addition, various processes described in this specification may be not only executed in a time series according to the description but also executed in a parallel or individual manner depending on the processing capacity of an apparatus executing the process or as is necessary. Further, in this specification, a system is a logical aggregated configuration of a plurality of apparatuses, and the apparatuses of the configuration are not limited to be arranged inside the same casing.

INDUSTRIAL APPLICABILITY

As described above, according to the configuration of one embodiment of the present disclosure, a cipher processing configuration, of which the resistance against various attacks is improved, having a high security level is realized.

More specifically, in a cipher processing configuration in which a nonlinear transformation process and a linear transformation process are repeatedly performed for state data formed by a plurality of elements, the linear transformation unit performs a matrix operation and a substitution process in which quasi-MDS matrixes are applied.

As the substitution process, the following conditions, in other words, a substitution process satisfying (Condition 1) and (Condition A) is performed.

(Condition 1)

According to the substitution process of the substitution unit for the input X, each column element of the output Y is configured by elements of four mutually-different columns of the input X.

(Condition A)

In a case where the substitution process performed by the substitution unit for the input X is repeatedly performed continuously twice, each column element of the output Y is configured by elements of three or more mutually-different columns of the input X.

Alternatively, as the substitution process, a substitution process satisfying the following conditions, in other words, (Condition 1) and (Condition B) is performed.

(Condition 1)

According to the substitution process of the substitution unit for the input X, each column element of the output Y is configured by elements of four mutually-different columns of the input X.

(Condition B)

Elements of each column of two outputs Y and Y' are configured by elements of four mutually-different columns of an input X. Here, Y is a result of repeatedly performing the substitution process of the substitution unit continuously twice for the input X. In addition, Y' is a result of repeatedly performing an inverse transformation of the substitution process of the substitution unit continuously twice for the input X.

According to the present configuration, a cipher processing configuration, of which the resistance against various attacks is improved, having a high security level is realized.

REFERENCE SIGNS LIST

100 Cipher processing apparatus
110 Key scheduling unit

120 Cipher processing unit
121 Exclusive OR unit
122 Nonlinear transformation unit
123 Linear transformation unit
201 Nonlinear transformation unit
202 Linear transformation unit
211 Matrix operating unit
212 Substitution unit
213 Matrix operating unit
214 Substitution unit
215 Matrix operating unit
301 Nonlinear transformation unit
302 Linear transformation unit
321 Substitution unit
322 Matrix operating unit
401 Nonlinear transformation unit
402 Linear transformation unit
421 Substitution unit
422 Matrix operating unit
700 Cipher processing apparatus
720 Key scheduling unit
721 Round key supplying unit
722 Key register
723 Key transformation unit
725 Constant supplying unit
750 Cipher processing unit
751 Exclusive OR unit
752 Nonlinear transformation unit
753 Linear transformation unit
800 IC module
801 Central processing unit (CPU)
802 Memory
803 Cipher processing unit
804 Random number generator
805 Transmission/reception unit
900 Smartphone
901 Processor
902 Memory
903 Storage
904 External connection interface
906 Camera
907 Sensor
908 Microphone
909 Input device
910 Display device
911 Speaker
913 Radio communication interface
914 Antenna switch
915 Antenna
917 Bus
918 Battery
919 Auxiliary controller

The invention claimed is:
1. A cipher processing apparatus, comprising:
a Central Processing Unit (CPU) configured to:
generate output data Y based on repeated round operations on input data X,
wherein the input data X is a state including a plurality of elements each formed from data of one or more bits;
perform a nonlinear transformation process based on an input of the state; and
perform a linear transformation process based on the input of the state,
wherein to perform the linear transformation process, the CPU is further configured to:
perform a matrix operation in units of elements for the state, wherein
the matrix operation applies a quasi-MDS (Almost-Maximum Distance Separable) matrix; and
perform a substitution process in the units of elements for the state, wherein
the substitution process satisfies a Condition 1 and a Condition A, wherein the Condition 1 includes that
each column element of the output data Y is configured by elements of four mutually-different columns of the input data X, and
wherein the Condition A includes that
each column element of the output data Y is configured by elements of three or more mutually-different columns of the input data X, based on the substitution process repeated for two times.
2. The cipher processing apparatus according to claim 1, wherein the CPU is further configured to perform one of a column diffusion operation or a row diffusion operation,
wherein the column diffusion operation applies the quasi-MDS matrix in units of elements of each column of the state, and
wherein the row diffusion operation applies the quasi-MDS matrix in units of elements of each row of the state.
3. The cipher processing apparatus according to claim 1, wherein the CPU is further configured to:
perform the substitution process that changes only column positions of at least a part of the plurality of elements configuring the state; and
perform a column diffusion operation that applies the quasi-MDS matrix in units of elements of each column.
4. The cipher processing apparatus according to claim 1, wherein the CPU is further configured to perform the substitution process that satisfies a condition B,
wherein the Condition B includes that elements of each column of the output data Y and output data Y' are configured by the elements of the four mutually-different columns of the input data X,
wherein the output data Y is a result of the substitution process for the input data X repeated for two times, and
wherein the output data Y' is a result of an inverse transformation of the substitution process for the input data X repeated for two times.
5. The cipher processing apparatus according to claim 4, wherein the CPU is further configured to:
perform the substitution process that changes row and column positions of at least a part of the plurality of elements configuring the state, and
perform a column diffusion operation that applies the quasi-MDS matrix in units of elements of each column.
6. The cipher processing apparatus according to claim 1, wherein the state is formed by 4×4 elements, and
the CPU is further configured to perform one of a column diffusion operation that applies the quasi-MDS matrix formed from 4×4 elements in units of elements of each column of the state or a row diffusion operation that applies the quasi-MDS matrix formed from 4×4 elements in units of elements of each row of the state.
7. The cipher processing apparatus according to claim 1, wherein the CPU is further configured to perform the nonlinear transformation process based on a plurality of S boxes, and wherein the plurality of S boxes perform the nonlinear transformation process in units of one element of the plurality of elements configuring the state.

8. The cipher processing apparatus according to claim 7, wherein the CPU is further configured to perform the linear transformation process based on the substitution process and the matrix operation, and
wherein the substitution process and the matrix operation use outputs of the plurality of S boxes as constituent elements of the state.

9. A cipher processing apparatus, comprising:
a Central Processing Unit (CPU) configured to:
    generate output data Y based on repeated round operations on input data X,
wherein the input data X is a state including a plurality of elements each formed from data of one or more bits;
perform a nonlinear transformation process based on an input of the state; and
perform a linear transformation process based on the input of the state,
wherein to perform the linear transformation process, the CPU is further configured to:
    perform a matrix operation in units of elements for the state, wherein
    the matrix operation applies a quasi-MDS (Almost-Maximum Distance Separable) matrix; and
    perform a substitution process in the units of elements for the state, wherein
    the substitution process satisfies a Condition 1' and a Condition A', wherein the Condition 1' includes that
each row element of the output data Y is configured by elements of four mutually-different rows of the input data X, and
wherein the Condition A' includes that
each row element of the output data Y is configured by elements of three or more mutually-different rows of the input data X, based on the substitution process repeated for two times.

10. The cipher processing apparatus according to claim 9, wherein the CPU is further configured to:
    perform the substitution process that changes only row positions of at least a part of the plurality of elements configuring the state; and
    perform a row diffusion operation that applies the quasi-MDS matrix in units of elements of each row.

11. The cipher processing apparatus according to claim 9, wherein the CPU is further configured to perform the substitution process that satisfies a condition B',
    wherein the Condition B' includes that elements of each row of the output data Y and output data Y' are configured by the elements of the four mutually-different rows of the input data X,
    wherein the output data Y is a result of the substitution process for the input data X repeated for two times, and
    wherein the output data Y' is a result of an inverse transformation of the substitution process for the input data X repeated for two times.

12. The cipher processing apparatus according to claim 11, wherein the CPU is further configured to:
    perform the substitution process that changes row and column positions of at least a part of the plurality of elements configuring the state, and
    perform a row diffusion operation that applies the quasi-MDS matrix in units of elements of each row.

13. A cipher processing method performed in a cipher processing apparatus comprising a Central Processing Unit (CPU), the method comprising:
    generating output data Y based on repeated round operations on input data X,
    wherein the input data X is a state including a plurality of elements each formed from data of one or more bits;
    performing a nonlinear transformation process based on an input of the state; and
    performing a linear transformation process based on the input of the state,
    wherein performing the linear transformation process comprises:
        performing a matrix operation in units of elements for the state, wherein
        the matrix operation applies a quasi-MDS (Almost-Maximum Distance Separable) matrix; and
        performing a substitution process in the units of elements for the state, wherein
        the substitution process satisfies a Condition 1 and a Condition A, wherein the Condition 1 includes that
    each column element of the output data Y is configured by elements of four mutually-different columns of the input data X, and
    wherein the Condition A includes that
    each column element of the output data Y is configured by elements of three or more mutually-different columns of the input data X, based on the substitution process repeated for two times.

14. A cipher processing method performed in a cipher processing apparatus comprising a Central Processing Unit (CPU), the method comprising:
    generating output data Y based on repeated round operations on input data X,
    wherein the input data X is a state including a plurality of elements each formed from data of one or more bits;
    performing a nonlinear transformation process based on an input of the state; and
    performing a linear transformation process based on the input of the state,
    wherein performing the linear transformation process comprises:
        performing a matrix operation in units of elements for the state, wherein
        the matrix operation applies a quasi-MDS (Almost-Maximum Distance Separable) matrix; and
        performing a substitution process in the units of elements for the state, wherein
        the substitution process satisfies a Condition 1' and a Condition A', wherein the Condition 1' includes that
    each row element of the output data Y is configured by elements of four mutually-different rows of the input data X, and
    wherein the Condition A' includes that
    each row element of the output data Y is configured by elements of three or more mutually-different rows of the input data X, based on the substitution process repeated for two times.

15. A non-transitory computer-readable medium having stored thereon computer-executable instructions which, when executed by a computer, cause the computer to perform operations, the operations comprising:
    generating output data Y based on repeated round operations on input data X,
    wherein the input data X is a state including a plurality of elements each formed from data of one or more bits;
    performing a nonlinear transformation process based on an input of the state; and
    performing a linear transformation process based on the input of the state, wherein performing the linear transformation process comprises:
  performing a matrix operation in units of elements for the state, wherein
    the matrix operation applies a quasi-MDS (Almost-Maximum Distance Separable) matrix; and
  performing a substitution process in the units of elements for the state, wherein
    the substitution process satisfies a Condition 1 and a Condition A, and wherein the Condition 1 includes that
  each column element of the output data Y is configured by elements of four mutually-different columns of the input data X, and
  wherein the Condition A includes that
  each column element of the output data Y is configured by elements of three or more mutually-different columns of the input data X based on the substitution process repeated for two times.

16. A non-transitory computer-readable medium having stored thereon computer-executable instructions which, when executed by a computer, cause the computer to perform operations, the operations comprising:
  generating output data Y based on repeated round operations on input data X,
  wherein the input data X is a state including a plurality of elements each formed from data of one or more bits;
  performing a nonlinear transformation process based on an input of the state; and
  performing a linear transformation process based on the input of the state,
  wherein performing the linear transformation process comprises:
    performing a matrix operation in units of elements for the state, wherein
      the matrix operation applies a quasi-MDS (Almost-Maximum Distance Separable) matrix; and
    performing a substitution process in the units of elements for the state, wherein
      satisfies a Condition 1' and a Condition A', wherein the Condition 1' includes that
    each row element of the output data Y is configured by elements of four mutually-different rows of the input data X, and
    wherein the Condition A' includes that
    each row element of the output data Y is configured by elements of three or more mutually-different rows of the input data X based on the substitution process repeated for two times.

* * * * *